United States Patent
Choi et al.

(10) Patent No.: US 11,876,627 B2
(45) Date of Patent: Jan. 16, 2024

(54) METHOD, APPARATUS, AND SYSTEM FOR GENERATING HARQ-ACK CODEBOOK IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Geunyoung Seok, Seoul (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/126,311

(22) Filed: Mar. 24, 2023

(65) Prior Publication Data

US 2023/0239082 A1   Jul. 27, 2023

Related U.S. Application Data

(63) Continuation of application No. PCT/KR2021/013164, filed on Sep. 27, 2021.

(30) Foreign Application Priority Data

Sep. 25, 2020 (KR) .................. 10-2020-0124463
Jan. 6, 2021 (KR) .................. 10-2021-0001659

(51) Int. Cl.
*H04L 1/1867* (2023.01)
*H04W 72/232* (2023.01)
*H04W 72/1273* (2023.01)

(52) U.S. Cl.
CPC ....... *H04L 1/1893* (2013.01); *H04W 72/1273* (2013.01); *H04W 72/232* (2023.01)

(58) Field of Classification Search
CPC .......... H04W 72/232; H04W 72/1273; H04W 72/23; H04L 1/1893
See application file for complete search history.

(56) References Cited

U.S. PATENT DOCUMENTS

2020/0213046 A1*  7/2020  Wang .................... H04L 1/1854
2021/0297191 A1*  9/2021  Takeda .................. H04L 1/1858
(Continued)

FOREIGN PATENT DOCUMENTS

KR   10-2019-0104985    9/2019
KR   10-2020-0018141    2/2020
(Continued)

OTHER PUBLICATIONS

International Search Report for PCT/KR2021/013164 dated Jan. 19, 2022 and its English translation from WIPO (now published as WO 2022/065963).

(Continued)

*Primary Examiner* — Chi Ho A Lee
(74) *Attorney, Agent, or Firm* — Ladas & Parry, LLP

(57) ABSTRACT

A terminal of a wireless communication system comprises a communication module and a processor for controlling the communication module. The processor generates a hybrid automatic repeat request (HARQ)-ACK codebook including one or more bits indicating whether reception of a channel or signal is successful, and transmits the HARQ-ACK codebook to a base station of the wireless communication system. The HARQ-ACK codebook is generated on the basis of a slot corresponding to a value of an HARQ-ACK feedback timing parameter (K1) set in a sub-slot level, and each of bits configuring the HARQ-ACK codebook corre- (Continued)

sponds to at least one sub-slot form among a plurality of sub-slots included in the slot.

20 Claims, 33 Drawing Sheets

(56) References Cited

U.S. PATENT DOCUMENTS

| | | | | |
|---|---|---|---|---|
| 2022/0200743 | A1* | 6/2022 | Yoshioka | H04L 1/1887 |
| 2022/0201724 | A1* | 6/2022 | Zhang | H04L 1/1896 |
| 2022/0217678 | A1* | 7/2022 | Yoshioka | H04W 72/02 |
| 2022/0255682 | A1* | 8/2022 | Gao | H04W 72/0446 |
| 2022/0338226 | A1* | 10/2022 | Nemeth | H04L 5/001 |
| 2022/0361210 | A1 | 11/2022 | Yang et al. | |
| 2022/0399979 | A1* | 12/2022 | Gao | H04L 5/0055 |
| 2022/0407632 | A1* | 12/2022 | Khoshnevisan | H04L 1/1864 |
| 2023/0134784 | A1* | 5/2023 | Xu | H04L 5/00 |
| | | | | 370/336 |
| 2023/0198683 | A1* | 6/2023 | Gao | H04L 1/1861 |
| | | | | 370/280 |

FOREIGN PATENT DOCUMENTS

| | | |
|---|---|---|
| KR | 10-2020-0035790 | 4/2020 |
| WO | 2020/032779 | 2/2020 |
| WO | 2022/065963 | 3/2022 |
| WO | 2022/084894 | 4/2022 |
| WO | 2023/279339 | 1/2023 |

OTHER PUBLICATIONS

Written Opinion of the International Searching Authority for PCT/KR2021/013164 dated Jan. 19, 2022 and its English translation by Google Translate (now published as WO 2022/065963).

"3rd Generation Partnership Project; Technical Specification Group Radio Access Network; NR; Physical layer procedures for data (Release 16)", 3GPP TS 38.214 V16.2.0 (Jun. 2020), Jul. 20, 2020, Sophia Antipolis Valbonne, France, pp. 1-163.

* cited by examiner

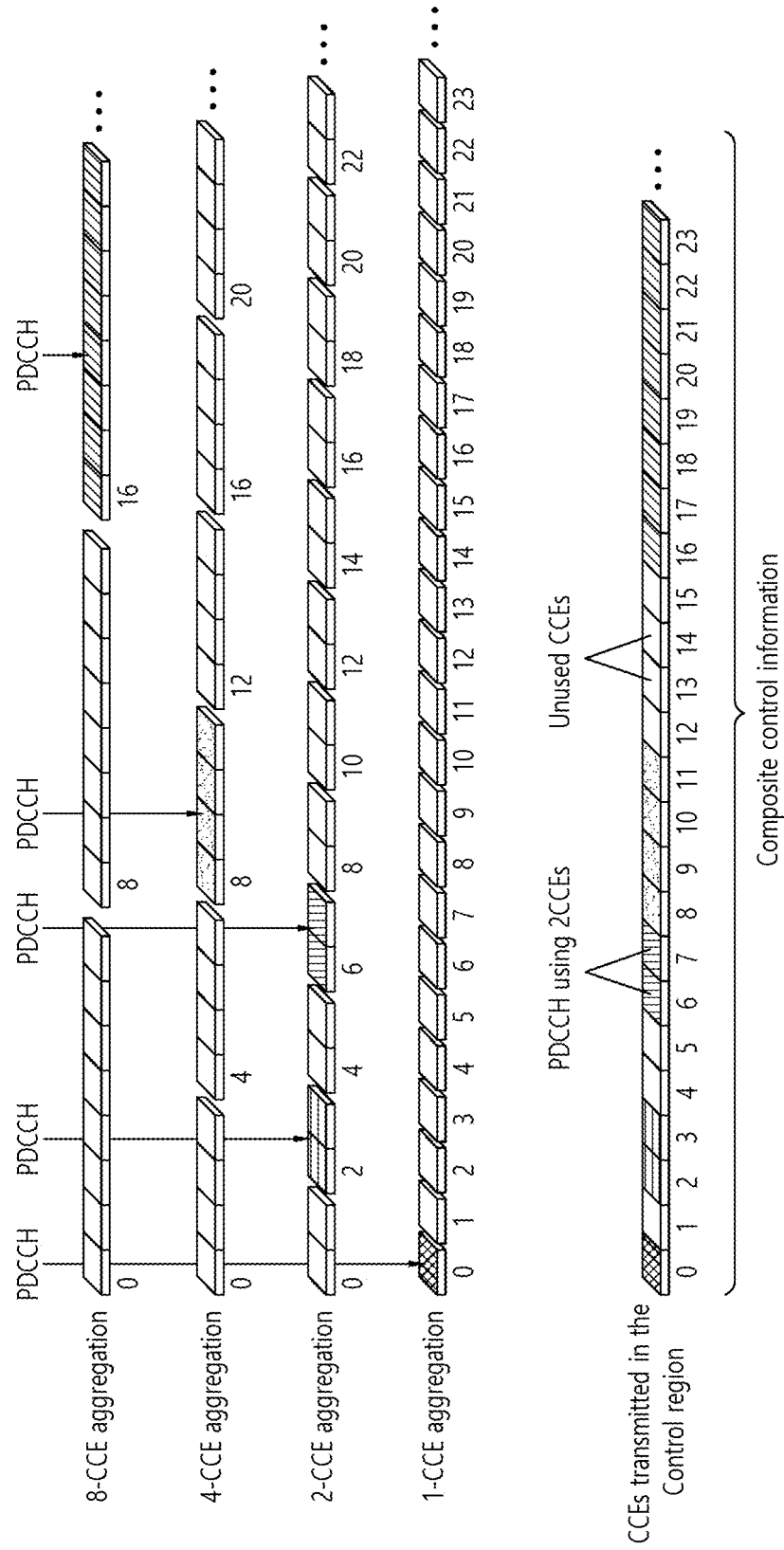

Step 1) for a given ($K_{1,k}$, $K_{0,1}$, $SLIV_1$), check that ($K_{1,k}$, $K_{0,1}$, $SLIV_1$) is valid PDSCH allocation Step 2) for a given ($K_{1,k}$, $K_{0,1}$, $SLIV_1$), check that PDSCH allocation from ($K_{1,k}$, $K_{0,1}$, $SLIV_1$) is overlapped with other PDSCH allocations

FIG. 23

*Example)*
$K_1 = (8, 7, 4, 3)$
$n_U = 12$

UL slot index: $\lfloor n_U/N \rfloor - 1 = 0$ , $n_{U,slot} = \lfloor n_U/N \rfloor = 1$ UL (15k)
N=7 sub-slots
UL sub-slot index: 0 1 2 3 4 5 6 7 8 9 10 11 12 13

$n_U - K_{1,0}$, $n_U - K_{1,1}$, $n_U - K_{1,2}$, $n_U - K_{1,3}$, $n_U$

DL (30k)
DL slot index: 0 1 2 3

| | K1(1) | K1(2) | K1(3) | K1(4) |
|---|---|---|---|---|
| CC#2 | $M_{21}$ bits (CBG-based) | $M_{22}$ bits (CBG-based) | $M_{23}$ bits (CBG-based) | $M_{24}$ bits (CBG-based) |
| CC#1 | $L_{11}$ bits (2 TBs per PDSCH) | $L_{12}$ bits (2 TBs per PDSCH) | $L_{13}$ bits (2 TBs per PDSCH) | $L_{14}$ bits (2 TBs per PDSCH) |
| CC#0 | $N_{01}$ bits | $N_{02}$ bits | $N_{03}$ bits | $N_{04}$ bits |

(a) original semi-static HARQ-ACK codebook

| | K1(1) | K1(2) | K1(3) | K1(4) |
|---|---|---|---|---|
| CC#2 | $N_{21}$ bits (TB-based) | $N_{22}$ bits (TB-based) | $N_{23}$ bits (TB-based) | $N_{24}$ bits (TB-based) |
| CC#1 | $L_{11}$ bits (2 TBs per PDSCH) | $L_{12}$ bits (2 TBs per PDSCH) | $L_{13}$ bits (2 TBs per PDSCH) | $L_{14}$ bits (2 TBs per PDSCH) |
| CC#0 | $N_{01}$ bits | $N_{02}$ bits | $N_{03}$ bits | $N_{04}$ bits |

(b) CBG-based -> TB-based

| | K1(1) | K1(2) | K1(3) | K1(4) |
|---|---|---|---|---|
| CC#2 | $M_{21}$ bits (CBG-based) | $M_{22}$ bits (CBG-based) | $M_{23}$ bits (CBG-based) | $M_{24}$ bits (CBG-based) |
| CC#1 | $N_{11}$ bits (spatial bundling) | $N_{12}$ bits (spatial bundling) | $N_{13}$ bits (spatial bundling) | $N_{14}$ bits (spatial bundling) |
| CC#0 | $N_{01}$ bits | $N_{02}$ bits | $N_{03}$ bits | $N_{04}$ bits |

(c) spatial bundling

| | K1(1) | K1(2) | K1(3) | K1(4) |
|---|---|---|---|---|
| CC#2 | $N_{21}$ bits (TB-based) | $N_{22}$ bits (TB-based) | $N_{23}$ bits (TB-based) | $N_{24}$ bits (TB-based) |
| CC#1 | $N_{11}$ bits (spatial bundling) | $N_{12}$ bits (spatial bundling) | $N_{13}$ bits (spatial bundling) | $N_{14}$ bits (spatial bundling) |
| CC#0 | $N_{01}$ bits | $N_{02}$ bits | $N_{03}$ bits | $N_{04}$ bits |

(d) CBG-based -> TB-based & spatial bundling

METHOD, APPARATUS, AND SYSTEM FOR GENERATING HARQ-ACK CODEBOOK IN WIRELESS COMMUNICATION SYSTEM

CROSS-REFERENCE TO RELATED APPLICATIONS

This application is a continuation of International Patent Application No. PCT/KR2021/013164 filed on Sep. 27, 2021, which claims the priority to Korean Patent Application No. 10-2020-0124463 filed in the Korean Intellectual Property Office on Sep. 25, 2020, and Korean Patent Application No. 10-2021-0001659 filed in the Korean Intellectual Property Office on Jan. 6, 2021, the entire contents of which are incorporated herein by reference.

TECHNICAL FIELD

The present invention relates to a wireless communication system, and more particularly, to a method of generating a HARQ-ACK codebook of a wireless communication system and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the area of a mobile communication system is expanding to not only a voice service but also a data service, and has been so developed as to provide a high-speed data service at the present time. However, in a mobile communication system which is currently being used to provide a service, a resource shortage phenomenon occurs and users require higher-speed services, and thus, a more developed wireless communication system is required.

DISCLOSURE OF THE INVENTION

Technical Problem

An object of an embodiment of the present invention is to provide a method for efficiently generating a HARQ-ACK codebook in a wireless communication system, and a device therefor.

Technical Solution

A user equipment (UE) of a wireless communication system, according to an aspect of the present invention for achieving the above object, includes: a communication module; and a processor that controls the communication module, wherein the processor may generate a hybrid automatic repeat request (HARQ)-ACK codebook including at least one bit indicating whether a channel or signal has been successfully received, and transmit the HARQ-ACK codebook to a base station of the wireless communication system, wherein the HARQ-ACK codebook may be generated based on a slot corresponding to a HARQ-ACK feedback timing parameter (K1) value configured in sub-slot level, and each of bits constituting the HARQ-ACK codebook may correspond to at least one sub-slot among a plurality of sub-slots included in the slot.

The processor may convert the K1 value configured in sub-slot level into a K1 value configured in slot level, wherein the slot may be determined by the slot-level HARQ-ACK feedback timing value.

The K1 value configured in sub-slot level may be converted into a K1 value $K_{1,k,slot}$ configured in slot level through the equation below, wherein $K_{1,k}$ may denote the K1 value configured in sub-slot level, k may denote an index of the K1 value configured in sub-slot level, $K_{1,k,slot}$ may denote the K1 value configured in slot level, $n_U$ may denote an index of a sub-slot in which a physical uplink control channel (PUCCH) is transmitted, N may denote the number of sub-slots in the slot, and $\lfloor x \rfloor$ may denote a largest integer among numbers equal to or less than x.

$$K_{1,k,slot} = \lfloor n_U/N \rfloor - \lfloor (n_U - K_{1,k})/N \rfloor$$

The processor may determine validity of at least one physical downlink shared channel (PDSCH) candidate for an individual slot using the $K_{1,k,slot}$.

The processor may determine validity of an individual PDSCH candidate by determining the at least one PDSCH candidate for each start and length indicator value (SLIV).

The processor may determine validity of a PDSCH candidate of a corresponding downlink slot according to a descending order of the $K_{1,k}$.

The processor, with regard to each of the at least one PDSCH candidate, may determine validity of the at least one PDSCH candidate based on whether a last symbol is included in a first sub-slot.

(i) a PDSCH candidate may be determined to be valid according to a last symbol of the PDSCH candidate being included in the first sub-slot, and (ii) a PDSCH candidate may be determined not to be valid according to a last symbol of the PDSCH candidate not being included in the first sub-slot.

The first sub-slot may correspond to a value obtained by subtracting the K1 value $K_{1,k}$ of the sub-slot level from the sub-slot $n_U$ in which the PUCCH is transmitted.

The processor, when having no capability to receive a plurality of PDSCHs in one slot, may include one HARQ-ACK bit in the HARQ-ACK codebook for a first downlink slot corresponding to the $K_{1,k}$.

When a first PDSCH candidate and a second PDSCH candidate following the first PDSCH candidate are valid in the first downlink slot, a HARQ-ACK bit for the second PDSCH candidate may be determined not to be included in the HARQ-ACK codebook according to a HARQ-ACK bit for the first downlink slot being included in the HARQ-ACK codebook by the first PDSCH candidate.

Upon receiving a PDSCH in one of the first PDSCH candidate and the second PDSCH candidate, the processor may transmit HARQ-ACK information of the PDSCH at a HARQ-ACK bit of a position corresponding to the first downlink slot in the HARQ-ACK codebook.

The processor may calculate all K1 values configured in sub-slot level corresponding to the K1 value converted into slot level, and determine validity of at least one PDSCH candidate based on all of the calculated K1 values configured in sub-slot level.

The processor may calculate a set of K1 values of slot level based on a set of a plurality of K1 values configured in sub-slot level, and generate the HARQ-ACK codebook by determining validity of the at least one PDSCH candidate of a corresponding downlink slot according to a descending order of the K1 values configured in slot level of the calculated set of K1 values configured in slot level.

The processor (i) may determine validity of a PDSCH candidate of a downlink slot corresponding to a first slot-level K1 value, and (ii) subsequently, may determine validity of a PDSCH candidate of a DL slot corresponding to a second slot-level K1 value smaller than the first slot-level K1 value.

Based on whether a last symbol of a first PDSCH candidate in a first downlink slot corresponding to a first slot-level K1 value is included in second sub-slots calculated using the first slot-level K1 value, the processor may determine validity of the first PDSCH candidate.

The processor may determine that a PDSCH candidate is valid according to a last symbol of the PDSCH candidate being included in at least one of the second sub-sots, and determine that the PDSCH candidate is not valid according to the last symbol of the PDSCH candidate not being included in the second sub-slots.

The second sub-slots may correspond to values obtained by subtracting at least one K1 value configured in sub-slot level corresponding to the first slot-level K1 value from the sub-slot $n_U$ in which the PUCCH is transmitted.

The HARQ-ACK codebook may be a semi-static HARQ-ACK codebook, which is configured based on radio resource control (RRC) signalling so as to indicate the number of bits of the HARQ-ACK codebook and a channel or signal for which each bit of the HARQ-ACK codebook indicates reception success/failure.

A method for operating a user equipment (UE) of a wireless communication system, according to another aspect of the present invention for achieving the above object, includes: a step of generating a hybrid automatic repeat request (HARQ)-ACK codebook including at least one bit indicating whether a channel or signal has been successfully received; and a step of transmitting the HARQ-ACK codebook to a base station of the wireless communication system, wherein the step of generating the HARQ-ACK codebook includes a step of generating the HARQ-ACK codebook based on a slot corresponding to a HARQ-ACK feedback timing parameter (K1) value configured in sub-slot level.

The step of generating the HARQ-ACK codebook may include a step of converting the HARQ-ACK feedback timing parameter (K1) value configured in sub-slot level into a slot-level HARQ-ACK feedback timing value, and determining the slot by the slot-level HARQ-ACK feedback timing value.

The step of generating the HARQ-ACK codebook may include determining validity of at least one physical downlink shared channel (PDSCH) candidate for an individual slot using the K1 value $K_{1,k,slot}$ converted in slot level.

The step of generating the HARQ-ACK codebook may include a step of determining, with regard to each of the at least one PDSCH candidate, validity of the at least one PDSCH candidate based on whether a last symbol is included in a first sub-slot.

Advantageous Effects

According to an embodiment of the present invention, a UE may transmit a PUCCH including two or more HARQ-ACKs in one slot, and at this time, may increase the coverage of PUCCH by reducing the amount of HARQ-ACK that each PUCCH may have.

BRIEF DESCRIPTION OF THE DRAWINGS

FIGS. 5A and 5B illustrates a procedure for transmitting control information and a control channel in a 3GPP NR system.

FIG. 23 is a diagram illustrating a process of generating type-1 HARQ-ACK according to an embodiment of the present invention.

FIG. 28 is a diagram illustrating a method of reducing the HARQ-ACK size in a carrier aggregation situation according to an embodiment of the present invention.

FIG. 29 is a diagram illustrating a method of reducing a HARQ-ACK size in a carrier aggregation situation according to an embodiment of the present invention.

FIG. 30 is a diagram illustrating a method of reducing a HARQ-ACK size within one slot according to an embodiment of the present invention.

FIG. 31 is a diagram illustrating a method of reducing a HARQ-ACK size within one slot according to an embodiment of the present invention.

MODE FOR CARRYING OUT THE INVENTION

Figure 1:
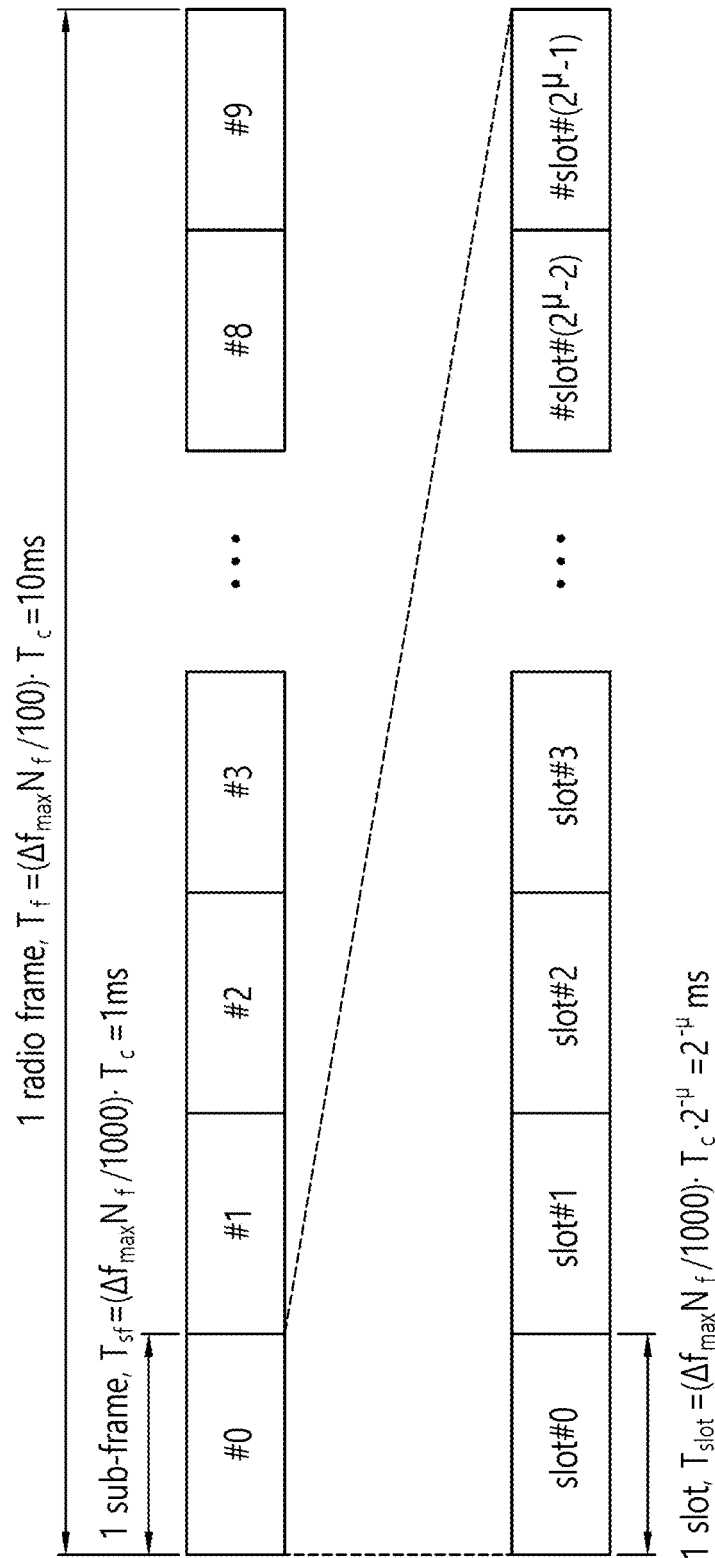
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^\mu$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
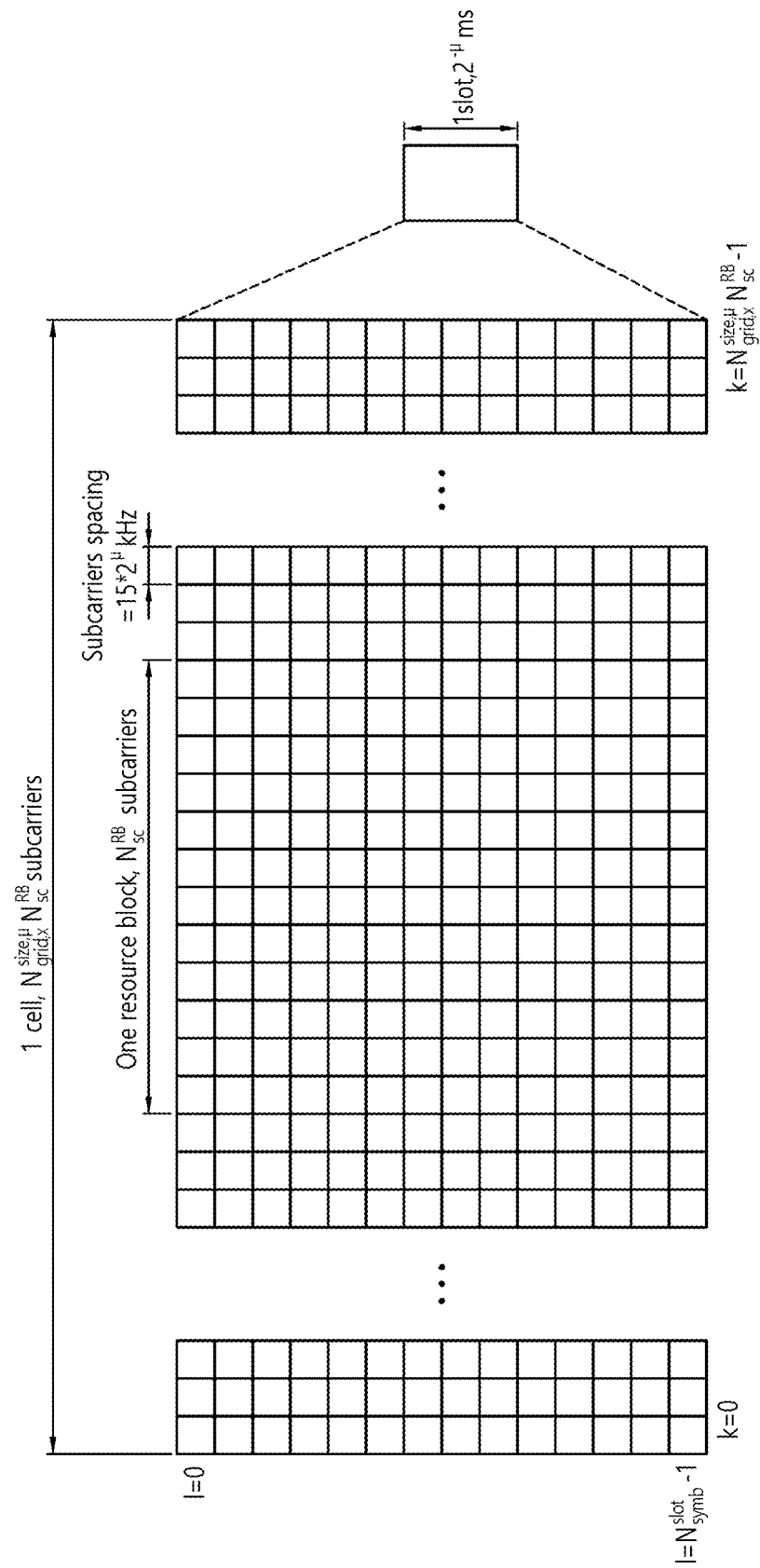
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | \multicolumn{14}{c}{Symbol number in a slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |

TABLE 1-continued

| index | \multicolumn{14}{c}{Symbol number in a slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | U | D | D | D | D | D | X | U | U |
| 47 | D | D | K | U | U | U | D | D | X | U | U | U | U | U |
| 48 | D | X | U | U | U | U | D | X | U | U | U | U | U | U |
| 49 | D | D | D | D | X | X | U | D | D | D | X | X | X | U |
| 50 | D | X | X | U | U | U | D | D | X | X | U | U | U | U |
| 51 | D | X | U | U | U | U | D | X | U | U | U | U | U | U |
| 52 | D | X | X | X | X | U | D | X | X | X | X | X | X | U |
| 53 | D | X | X | X | X | U | D | X | X | X | X | X | X | U |
| 54 | X | X | X | X | X | X | D | D | D | D | D | D | D | D |
| 55 | D | D | X | X | X | U | U | U | D | D | D | D | D | D |
| 56-255 | \multicolumn{14}{c}{Reserved} |

In Table 1, D denotes a DL symbol, U denotes a UL symbol, and X denotes a flexible symbol. As shown in Table 1, up to two DL/UL switching in one slot may be allowed.

Figure 3:
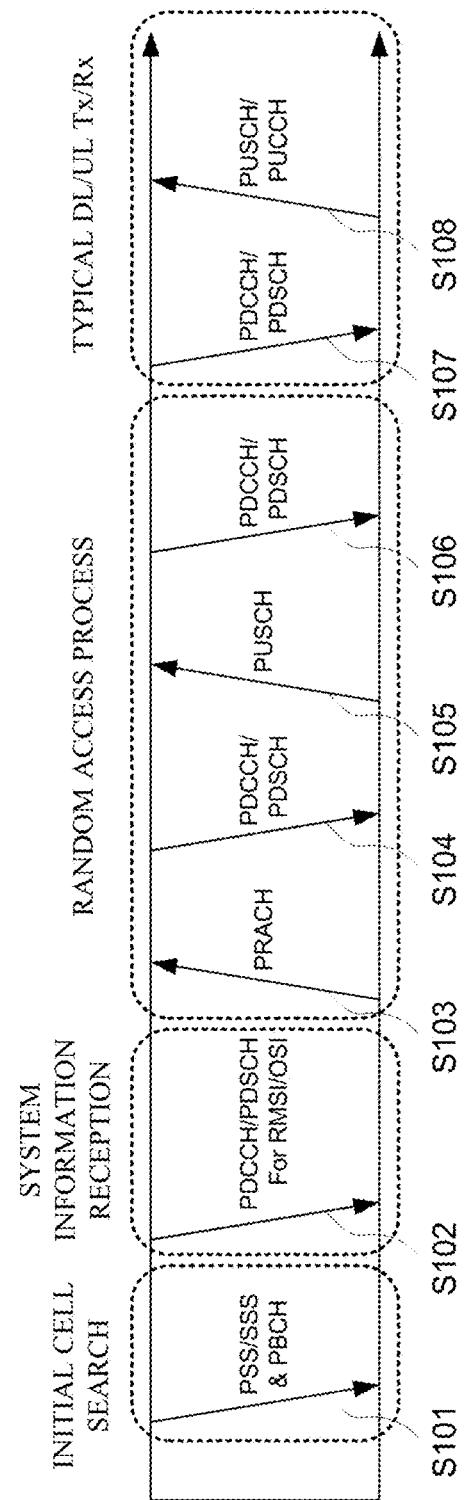
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
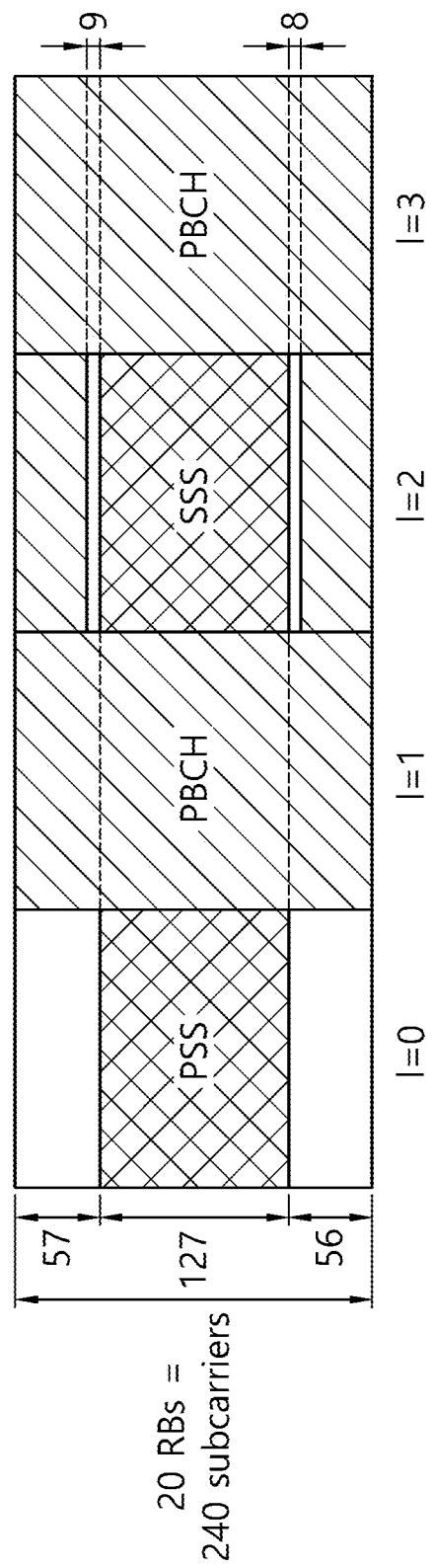
FIGS. 4A and 4B illustrate a synchronization signal/physical broadcast signal (SS/PBCH) block for initial cell access in a 3GPP NR system.
Figure 4B:
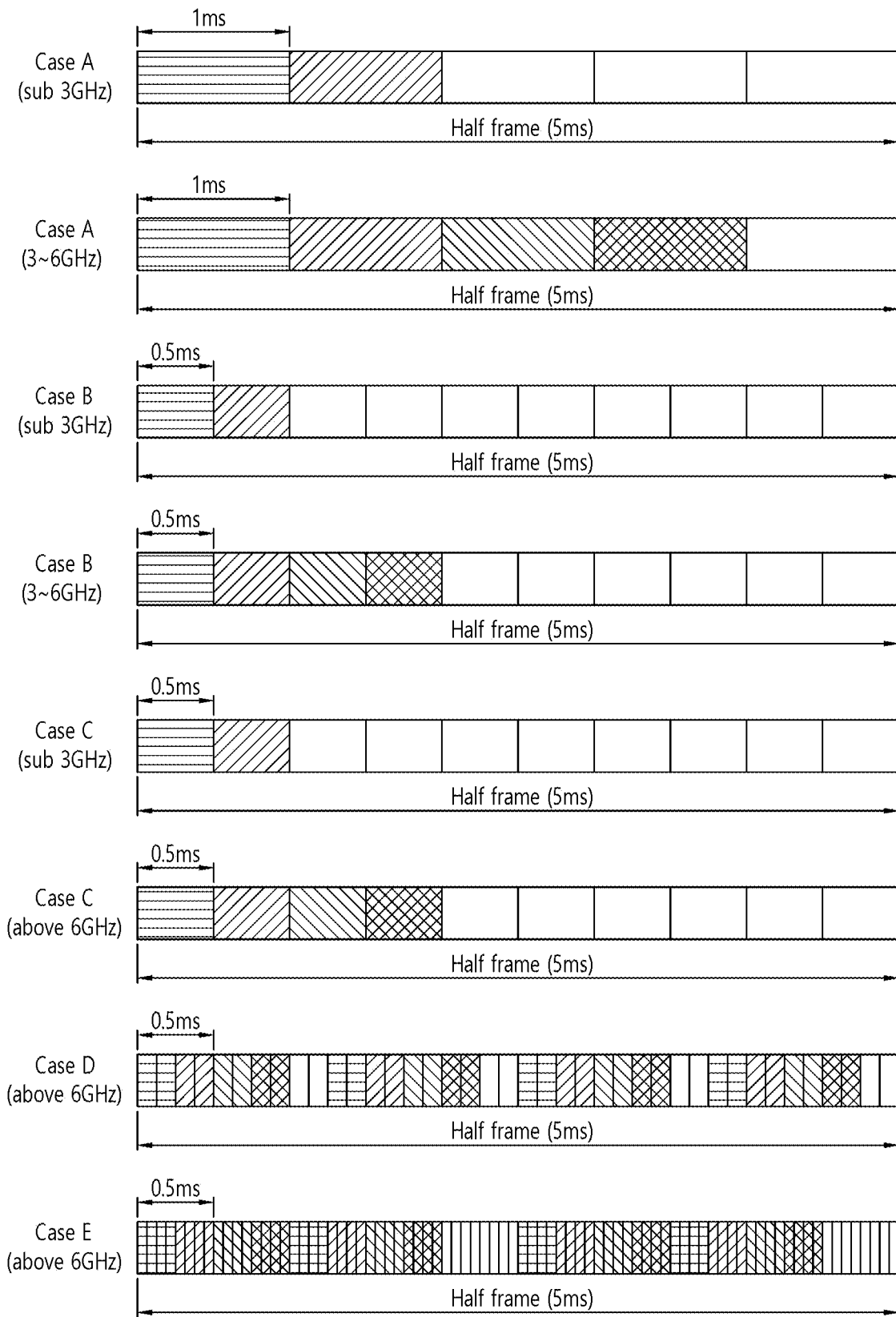

FIGS. 4A and 4B illustrate an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 84 + v, . . . , 236 + v |
|  | 2 | 0 + v, 4 + v, 8 + v, . . . , 44 + v  192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$d_{PSS}(n)=1-2\times(m)$
$m=(n+43N^{(2)}_{ID})$ mod 127
$0 \leq n < 127$
Here, $x(i+7)=(x(i+4)+x(i))$ mod 2 and is given as
[x(6) x(5) x(4) x(3) x(2) x(1) x(0)]=[1 1 1 0 1 1 0]
Further, the sequence $d_{SSS}(n)$ of the SSS is as follows.
$d_{SSS}(n)=[1-2x_0((n+m_0)$ mod $127)][1-2x_1((n+m_1)$ mod $127)]$
$m_0=15$ floor $(N^{(1)}_{ID}/112)+5N^{(2)}_{ID}$
$m1=N^{(1)}_{ID}$ mod 112
$0 \leq n < 127$
Here, $x_0(i+7)=(x_0(i+4)+x_0(i))$ mod 2
$x_1(i+7)=(x_1(i+1)+x_1(i))$ mod 2 and is given as
$[x_0(6) x_0(5) x_0(4) x_0(3) x_0(2) x_0(1) x_0(0)]=[0 0 0 0 0 0 1]$
$[x_1(6) x_1(5) x_1(4) x_1(3) x_1(2) x_1(1) x_1(0)]=[0 0 0 0 0 0 1]$ A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
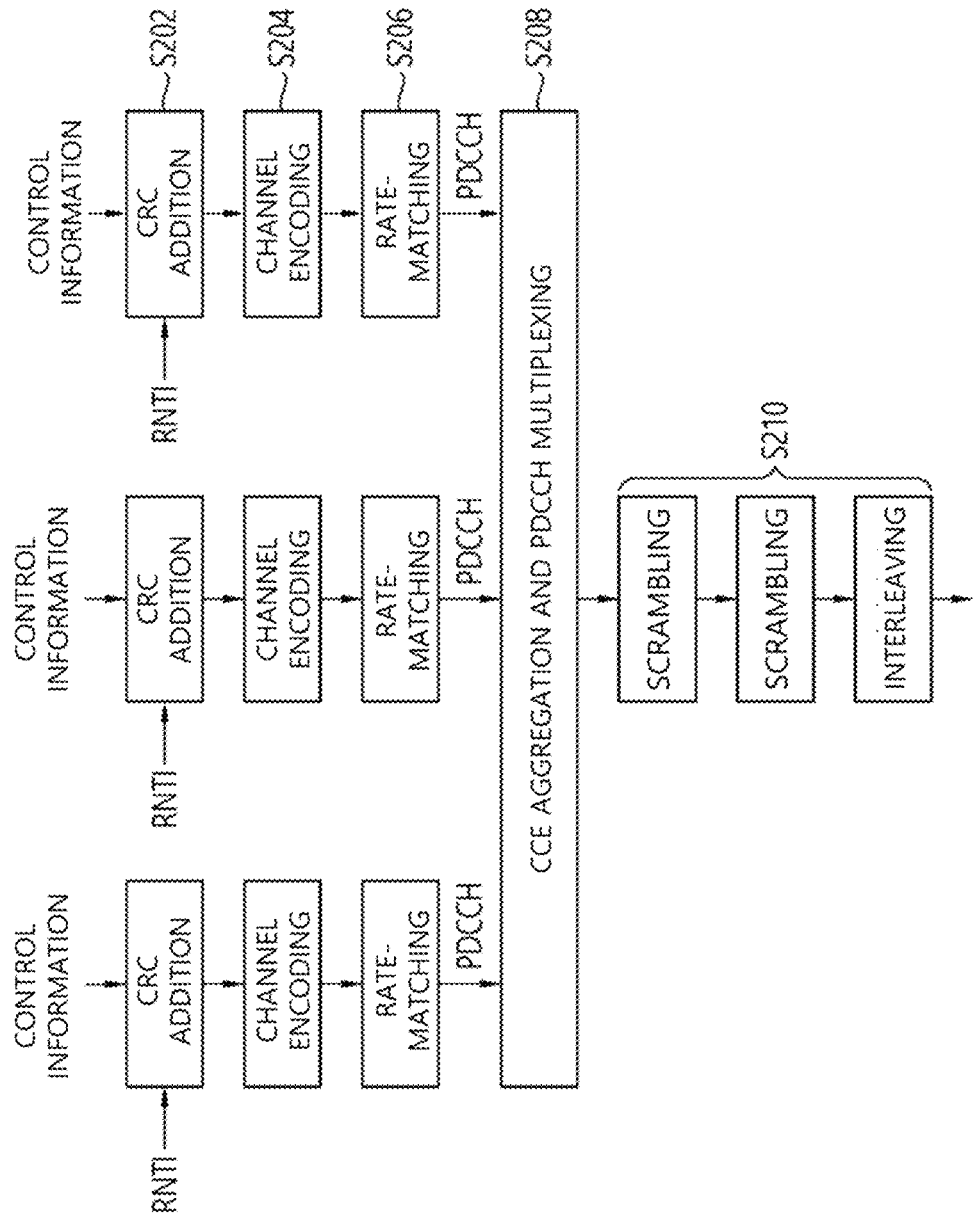

FIGS. 5A and 5B illustrate a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
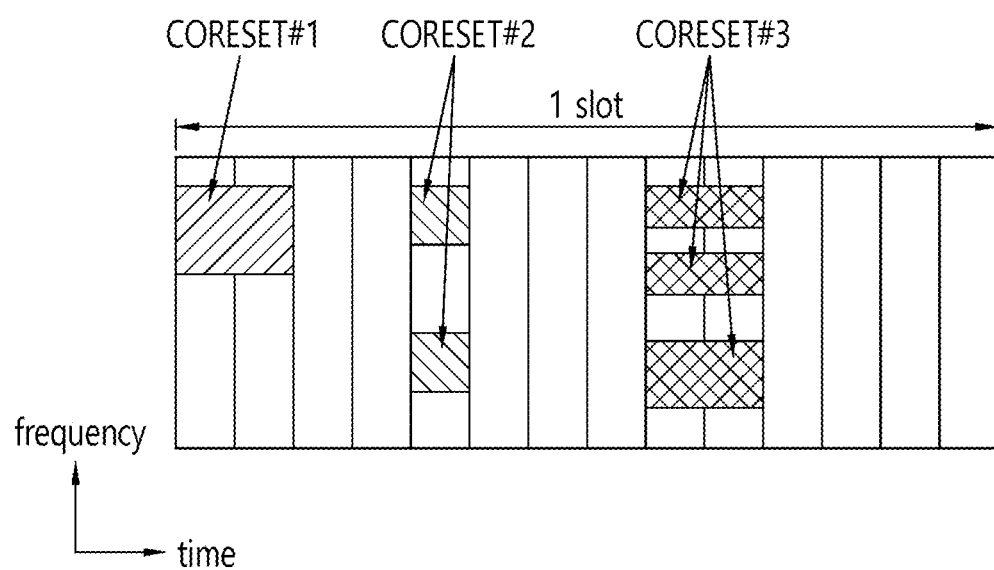
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
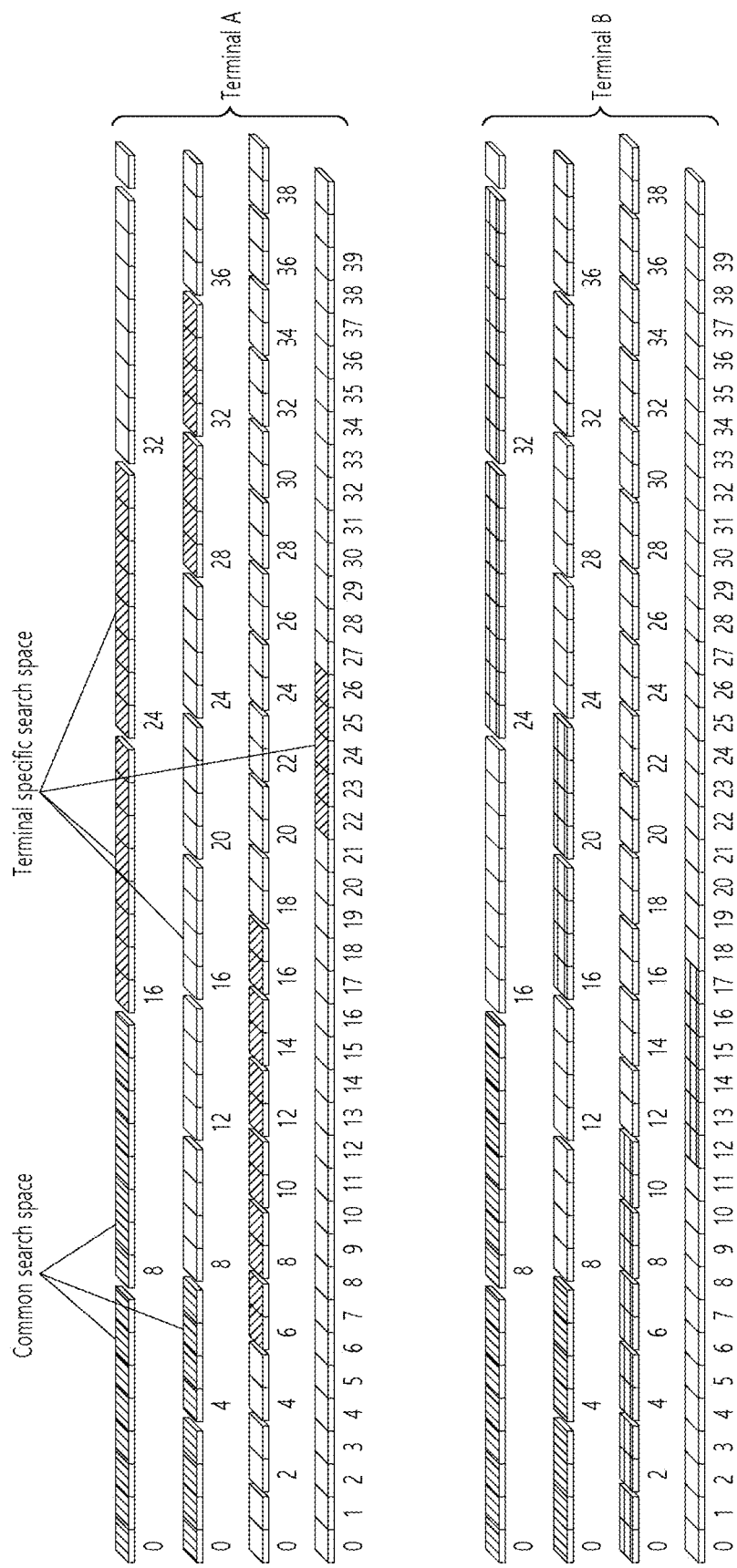
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARM). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$–1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}-1$). Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
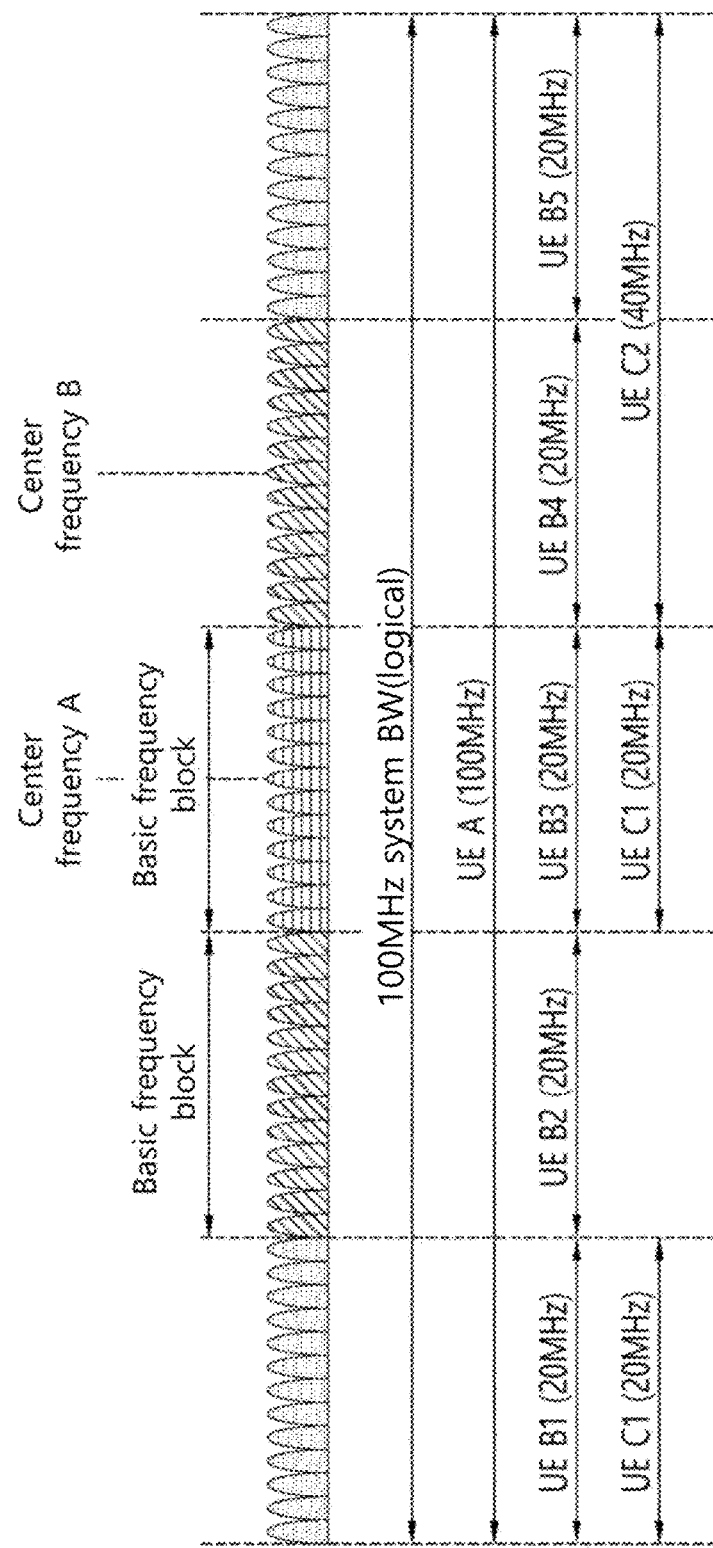
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
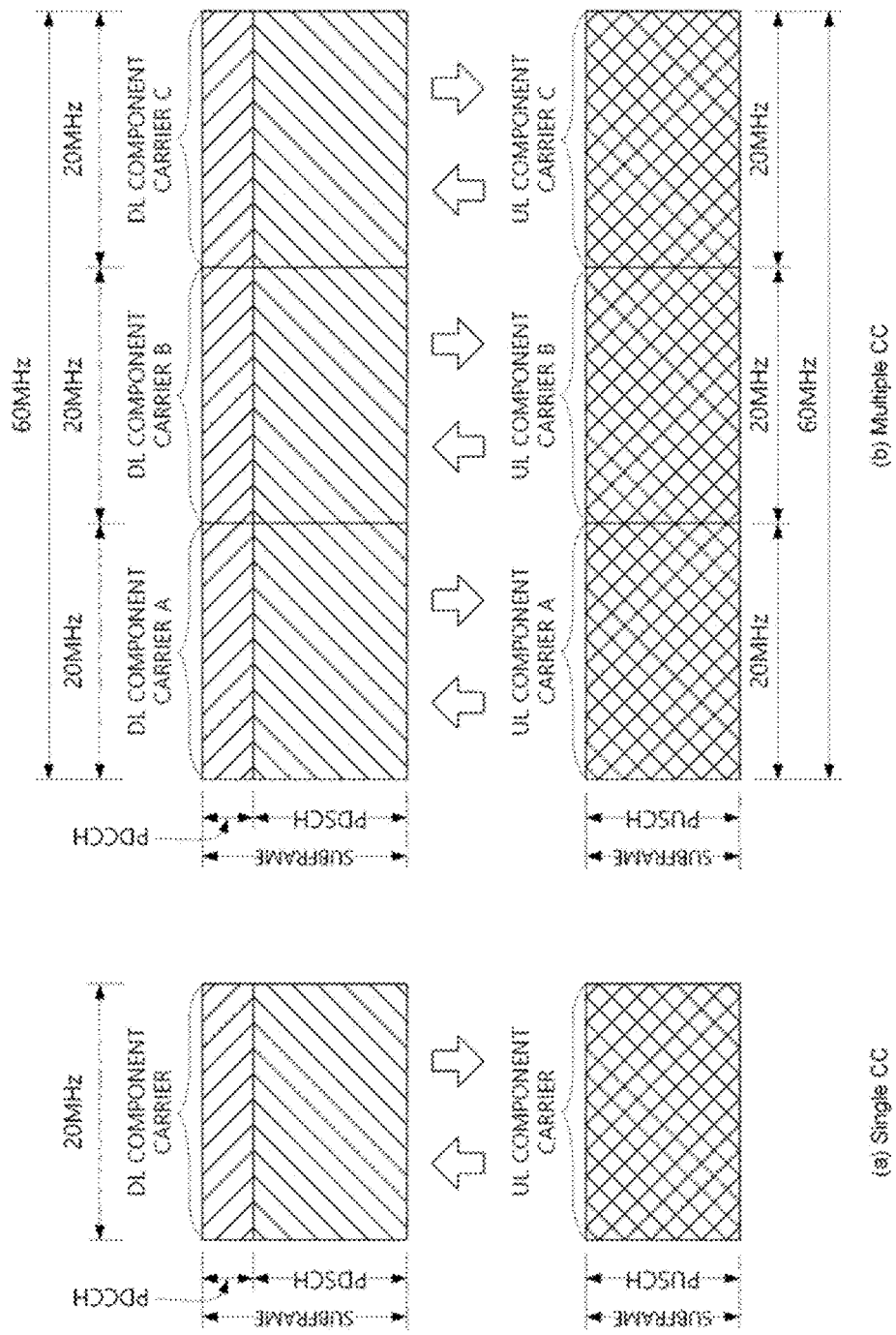
FIG. 9 is a diagram for explaining single carrier communication and multiple carrier communication.

FIG. 9 is a drawing for explaining single carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
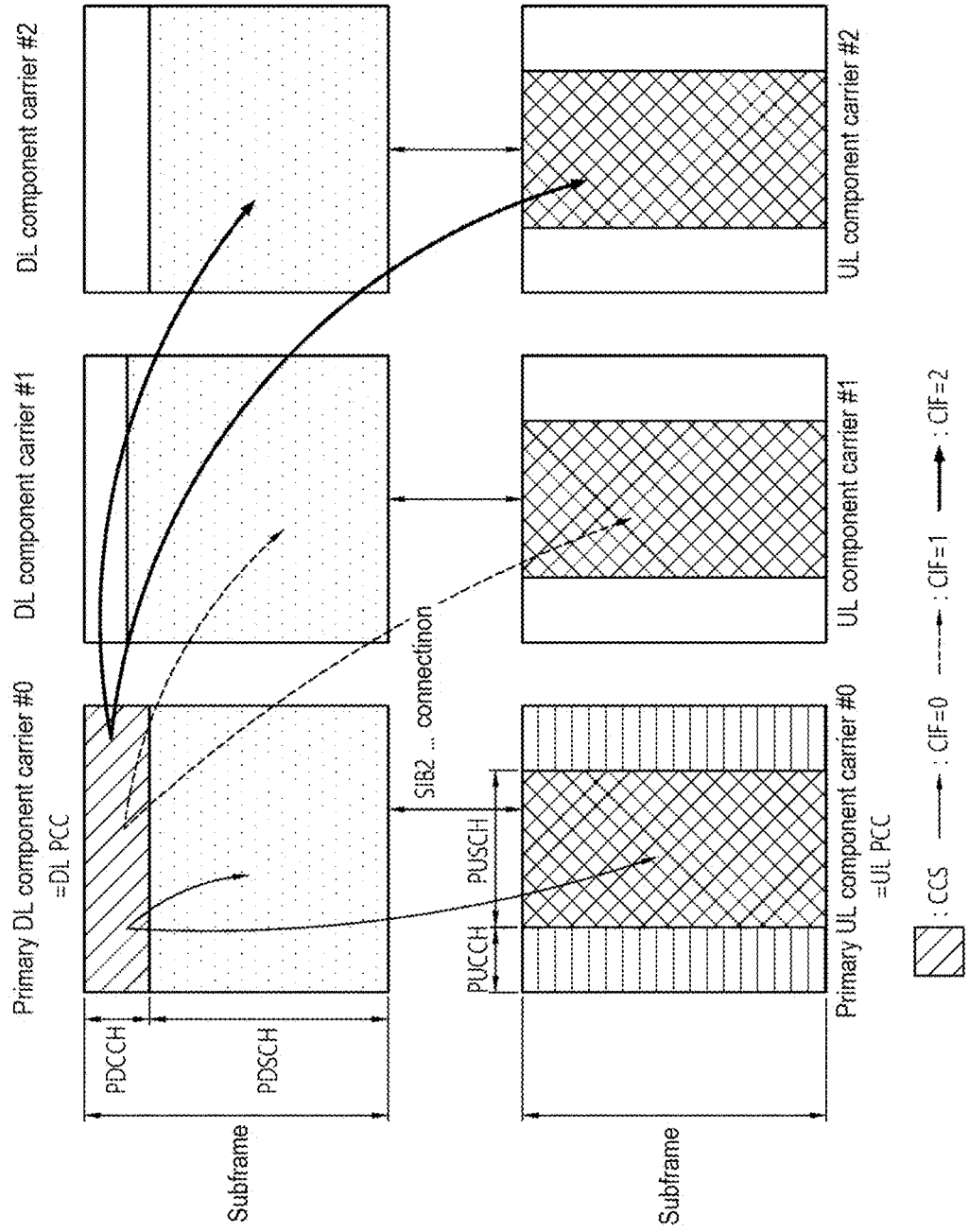
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
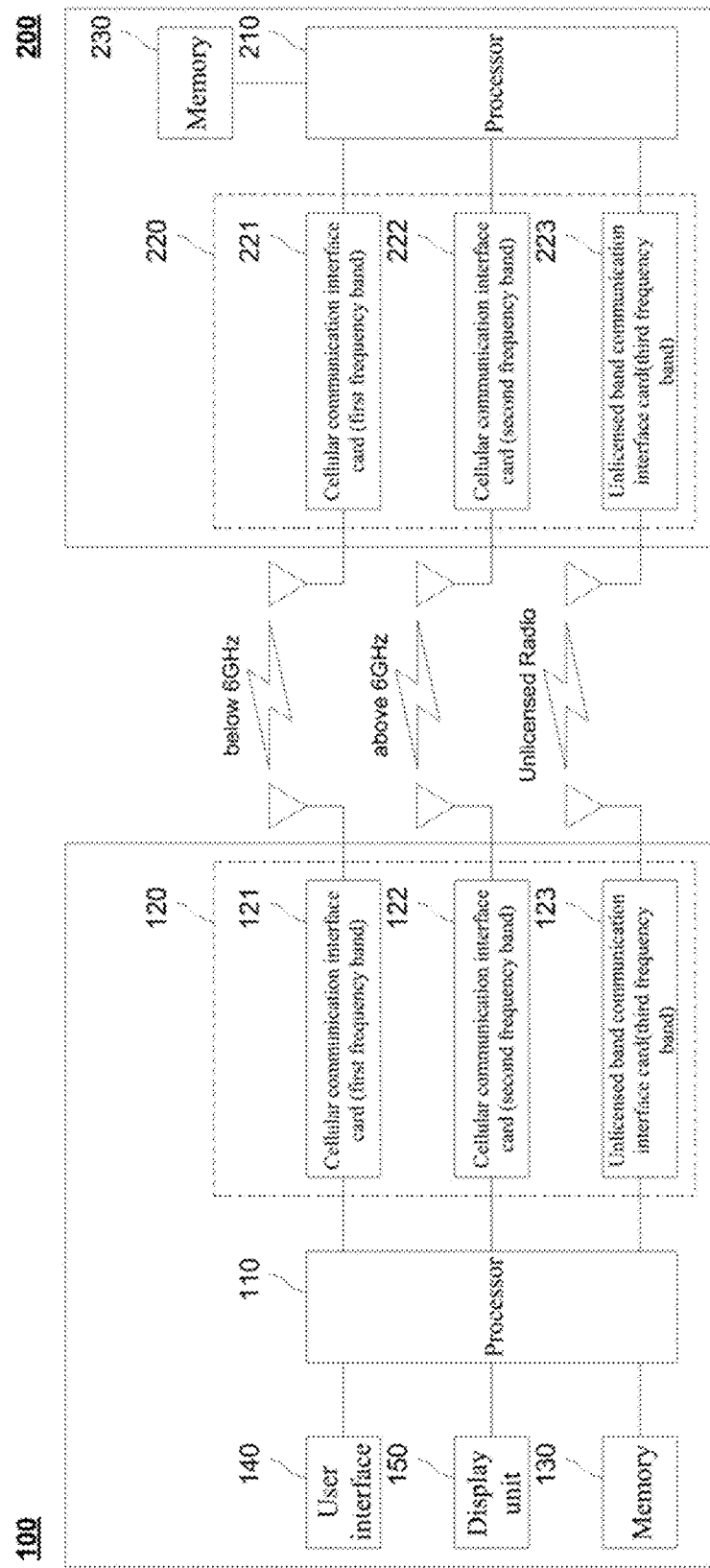
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Meanwhile, with regard to a configuration for delivering HARQ-ACK, the UE may transmit HARQ-ACK bits of received PDSCHs on an uplink control channel (e.g., PUCCH) or uplink data channel (e.g., PUSCH). For example, the UE may schedule 1 transport block (TB) or 2 TBs for a downlink control channel (e.g., PDCCH) for the base station to schedule PDSCH for the UE. When only 1 TB is scheduled, the UE should feed back 1 bit HARQ-ACK bit of the corresponding TB. When 2 TBs are scheduled, the UE should feed back 2 bits HARQ-ACK bits of each of the two TBs. There may be a determined order between 2 bits HARQ-ACK bits and 2 TBs to avoid a misunderstanding between the base station and the UE. For reference, 1 TB is transmitted when a multiple-input multiple-output (MIMO) transmission rank or layer is low, and 2 TBs are transmitted when the MIMO transmission rank or layer is high.

The component carrier described in an embodiment of the present invention may be used together with the term "cell". Although descriptions are provided with a focus on the carrier aggregation in an embodiment of the present invention, component carriers may be considered to correspond to all component carriers of a subframe (or slot) that is HARQ-ACK multiplexed in the case of a system using a TDD scheme.

When the UE uses the carrier aggregation in which a plurality of carriers are aggregated and transmitted, each component carrier may be configured with a different transmission scheme. That is, component carrier #0 may be configured with 1 TB transmission, and component carrier #1 may be configured with 2 TBs transmission. When one of self-carrier scheduling or cross-carrier scheduling is configured for the UE, the UE should decode a PDCCH by monitoring a component carrier for which the UE should monitor a PDCCH according to a scheme set for the UE, and should collect HARQ-ACK for TBs transmitted through a PDSCH in each component carrier and transmit the same on a PUCCH (or PUSCH). However, the UE may fail to decode a PDCCH scheduled for some component carriers among component carriers configured by the base station (this is referred to as occurrence of discontinuous transmission (DTX)), and may collect only HARQ-ACK(s) of component carriers for which decoding has succeeded, except for HARQ-ACK(s) of said some component carriers, and transmit the same on a PUCCH (or PUSCH). In this case, there may occur a misunderstanding in interpreting HARQ-ACK feedback between the base station and the UE.

To resolve this issue, 3GPP new radio (NR) supports semi-static HARQ-ACK codebook (type-1 HARQ-ACK codebook) and dynamic HARQ-ACK codebook (type-2 HARQ-ACK codebook).

Figure 12:
FIG. 12 is a diagram showing a procedure for generating a semi-static HARQ-ACK codebook according to an embodiment of the present invention.

FIG. 12 is a diagram pertaining to a procedure of generating a semi-static HARQ-ACK codebook according to an embodiment of the present invention.

As described above, the semi-static HARQ-ACK codebook indicates that the UE and the base station agree, in advance, about a length of a HARQ-ACK codebook and for which PDSCH each bit is used as ACK/NACK information, and does not require additional signaling. Here, a set of PDSCH candidates included in the semi-static HARQ-ACK codebook is referred to as a DL association set (or PDSCH candidate set). An embodiment of the present invention relates to a method of determining the DL association set (or PDSCH candidate set) in the semi-static HARQ-ACK codebook.

As an embodiment of the present invention, the UE uses the following information when determining the DL association set (or PDSCH candidate set). First, the above information includes all K1 values that may be indicated to the UE. Here, the K1 value indicates a difference between a last slot in which a PDSCH is transmitted (or scheduled) and a slot in which a PUCCH is transmitted. Fallback DCI (or DCI format 1_0) may have one value among {1, 2, 3, 4, 5, 6, 7, 8} as the K1 value, and non-fallback DCI (or DCI format 1_1 or DCI format 1_2) may be configured with up to eight K1 values through an RRC signal. Second, the above information includes all K0 values that may be indicated to the UE and combinations of PDSCH start symbol and length within a slot. Here, the PDSCH start symbol and length are joint encoded and indicated by a start and length indicator value (SLIV). Here, the K0 value indicates a difference between a slot in which a PDCCH is transmitted and a slot in which a PDSCH scheduled by the PDCCH is transmitted. Third, the above information includes semi-static DL/UL configuration information. The semi-static DL/UL configuration is configuration information of a slot configured with a cell-specific RRC signal or UE-specific RRC signal, and may indicate whether each symbol is a DL symbol, UL symbol, or flexible symbol. Fourth, the above information includes CORESET and search space configuration information. The CORESET and search space configuration information informs of at which position of which slot a PDCCH can be transmitted. Fifth, the above information includes PDSCH repetition information. The PDSCH repetition information may be configured with one value among 1, 2, 4, and 8 through an RRC signal, and according to a configured value, the same PDSCH is repeatedly transmitted in slots. Here, start symbols and length of PDSCH are the same in each slot. For reference, when the PDSCH repetition information is larger than 1, this may be expressed as reception by slot aggregation.

Referring to FIG. 12, as an embodiment of the present invention, when the UE is configured to receive by slot aggregation, a step of determining a DL association set (or PDSCH candidate set) may be configured as below. Here, it is assumed that a PUCCH is positioned in slot n. Furthermore, a PDSCH repetition value is $N_{rep}$.

First, in a first step, the UE may confirm the following for one K1 value (expressed as $K_{1,k}$) and for one K0 and SLIV values ($K_{0,1}$, $SLIV_1$). A PDSCH allocated to corresponding ($K_{1,k}, K_{0,1}, SLIV_1$) can be assumed to be able to be transmitted and included in a DL association set (or PDSCH candidate set) if a UL symbol is not present in locations of symbols indicated by $SLIV_1$ in at least one slot among slot $n-K_{1,k}$, slot $n-K_{1,k}-1$, . . . , slot $n-K_{1,k}-(N_{rep}-1)$ and CORESET and search space for monitoring PDCCH are present in slot $n-K_{1,k}-(N_{rep}-1)-K_0$. Otherwise, the PDSCH allocated to $(K_{1,k}, K0, 1, SLIV_1)$ is assumed to be unable to be transmitted, and the UE cannot include the PDSCH in a DL association set (or PDSCH candidate set). For example, the PDSCH cannot be transmitted when at least one UL symbol overlaps a symbol to which a PDSCH symbol is allocated in all slots.

In a second step, in combinations that may be included in the DL association set (or PDSCH candidate set) in the first step, the UE may confirm the following in relation to a plurality of K0 and SLIV values $(K_{0,1}, SLIV_1)$ with regard to a plurality of K1 values expressed as $(K_{1,k})$.

Here, for convenience in expression, indices of the combinations that may be included in the DL association set (or PDSCH candidate set) in the first step are numbered n=1, 2, . . . .

If, with regard to combination n that may be included in the DL association set (or PDSCH candidate set) in the first step, PDSCH allocation of other combination m=n+1, . . . overlaps, in terms of at least one symbol, PDSCH allocation of the combination n in at least one slot, the combination m is combined with the combination n as one, and the combination m is excluded. The above scheme may be sequentially performed for n=1, 2, . . . .

The dynamic HARQ-ACK codebook (type-2 HARQ-ACK codebook) is a scheme in which DTX is detected according to downlink assignment index (DAI). A PDCCH for scheduling each PDSCH includes a counter-DAI and total-DAI. The counter-DAI indicates the number of scheduled PDSCHs from component carrier #0 to a current component carrier. The total-DAI indicates the number of PDSCHs scheduled for all component carriers. By successfully decoding a PDCCH, the UE may identify the number of transmissions of a PDSCH scheduled by the PDCCH, and may transmit HARQ-ACK in the corresponding order.

Figure 15:
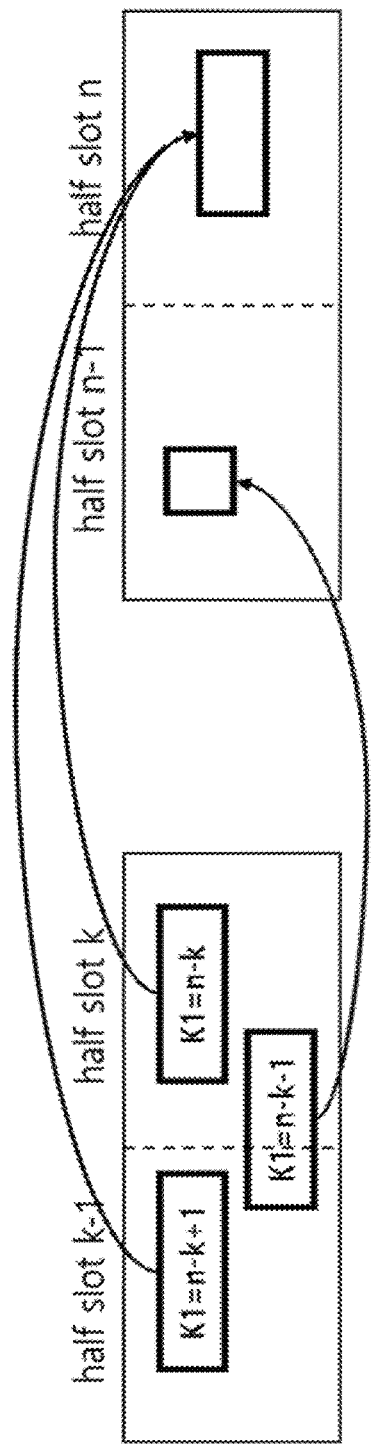
FIG. 15 is a diagram illustrating a method of transmitting a PUCCH when a unit of K1 is a half slot according to an embodiment of the present invention.

Referring to FIG. 15, when PDSCH is transmitted on component carriers #0, #1, #3, #4, #5, and #7 from the base station to the UE that may use up to eight component carriers in combination, (counter-DAI, total-DAI) value of the component carrier #0 is (0, 5), the (counter-DAI, total-DAI) value of the component carrier #1 is (1, 5), the (counter-DAI, total-DAI) value of the component carrier #3 is (2, 5), the (counter-DAI, total-DAI) value of the component carrier #4 is (3, 5), the (counter-DAI, total-DAI) value of the component carrier #5 is (4, 5), and the (counter-DAI, total-DAI) value of the component carrier #1 is (5, 5). When the UE fails to decode a PDCCH corresponding to the component carrier #3, the UE may recognize that reception of one PDSCH has failed through the counter-DAI value of a PDCCH corresponding to the component carrier #4. When the UE fails to decode a PDCCH corresponding to the component carrier #7, the UE may recognize that one PDSCH has been scheduled after the component carrier #5 but has failed to be received through the counter-DAI value and the total-DAI value of a PDCCH corresponding to the component carrier #5.

A problem to be solved by the present invention is to provide a method for transmitting a PUCCH including at least two pieces of HARQ-ACK information in one slot. This operation is necessary for quickly receiving retransmission from the base station by transmitting HARQ-ACK as quickly as possible in order to support a service requiring low latency and high reliability, such as URLLC service. In 3GPP NR Rel-15, only a PUCCH including up to one piece of HARQ-ACK information can be transmitted in one slot. Therefore, the UE should transmit HARQ-ACK responses of different PDSCHs in different slots or should multiplex the HARQ-ACK responses in one PUCCH to transmit the same. As mentioned above, it is not appropriate to send HARQ-ACK with different slots in order to reduce latency, and, when transmitting by multiplexing with the same PUCCH, a problem may occur in the coverage, i.e., the reliability, of the PUCCH. Therefore, a method for transmitting a PUCCH including a plurality of pieces of HARQ-ACK information in one slot is under discussion in 3GPP NR Rel-16. The present invention discloses the method.

1. PDSCH Group Indicator

The UE may receive an indication of information about a group indicator (or group ID) of a PDSCH on a PDCCH (or DCI) scheduling the PDSCH, or may infer the information from a value composed of RRC or a value of another field transmitted on DCI. A specific indication and inference method will be described later. The above indicator is referred to as a PDSCH group indicator for convenience. The UE may generate a HARQ-ACK codebook by multiplexing HARQ-ACKs of PDSCHs indicated by the same PDSCH group indicator, and then may transmit always on the same PUCCH. That is, if different PDSCH group indicators are used, different PUCCHs may be transmitted in one slot.

Figure 13:
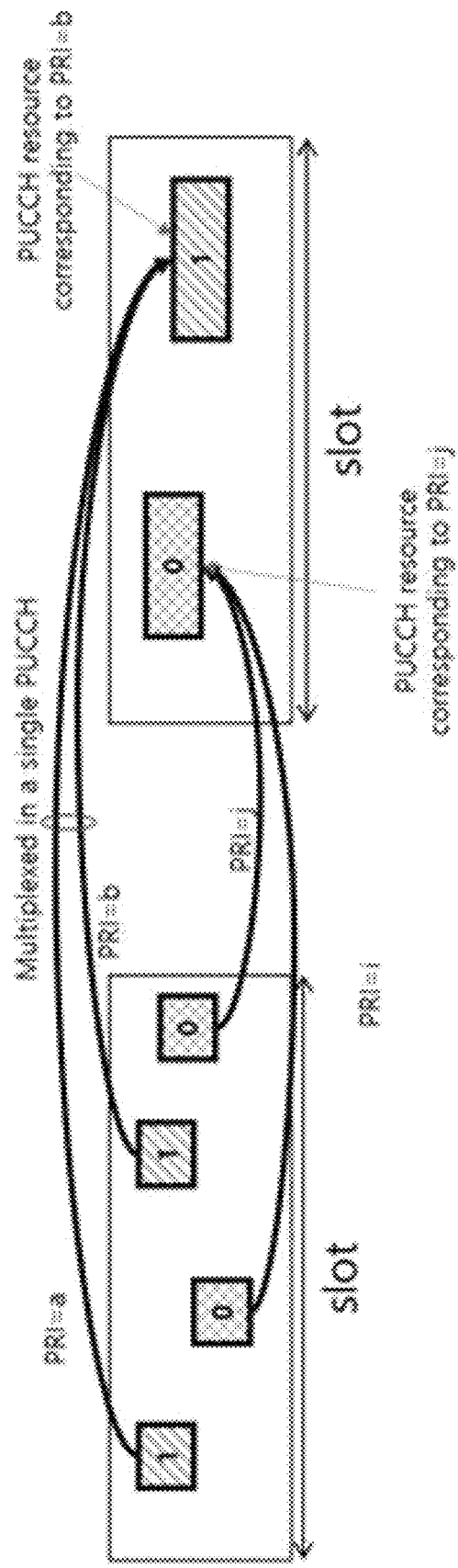
FIG. 13 is a diagram illustrating a method of transmitting a PUCCH according to a PDSCH group indicator according to an embodiment of the present invention.

FIG. 13 is a diagram illustrating a method for transmitting a PUCCH according to a PDSCH group indicator according to an embodiment of the present invention.

Referring to FIG. 13, the PDSCH group indicator may have two values, i.e., 0 or 1, and, in this case, up to two different PUCCH may be transmitted in one slot. In the embodiment of FIG. 13, a PUCCH for transmitting HARQ-ACK of two PDSCHs having the value of 0 of the PDSCH group indicator may be determined according to a PUCCH resource indicator (PRI) indicated by a PDCCH (or DCI) scheduled later among the two PDSCHs having the value of 0 of the PDSCH group indicator. Furthermore, in the embodiment of FIG. 13, a PUCCH for transmitting HARQ-ACK of two PDSCHs having the value of 1 of the PDSCH group indicator may be determined according to a PUCCH resource indicator (PRI) indicated by a PDCCH (or DCI) scheduled later among the two PDSCHs having the value of 1 of the PDSCH group indicator. If PUCCH resources indicated by two PRI values do not overlap, the UE may transmit two PUCCHs in one slot.

In order to transmit X number of PUCCHs in one slot, the PUCCH group indicator should indicate one value among 0, 1, . . . , X−1. Therefore, B=ceil(log 2(X)) bits are necessary. This B bits may be explicitly indicated by a PDCCH (or DCI) or may be determined depending on others. An implicitly determining scheme may be similar to a scheme for implicitly determining a HARQ-ACK multiplexing indicator value, described below.

When a plurality of PUCCHs are configured to be transmitted in one slot using the PDSCH group indicator, the UE should determine HARQ-ACK bits to be included in each PUCCH, i.e., HARQ-ACK codebook. In particular, if the UE is configured to use a HARQ-ACK codebook (type-1 HARQ-ACK codebook according to 3GPP TS38.213), the UE should generate a semi-static HARQ-ACK codebook to be transmitted on PUCCH corresponding to the corresponding PDSCH group indicator. If the semi-static HARQ-ACK codebook corresponding to each PDSCH group indicator is independently generated without additional definition, each PUCCH transmits the semi-static HARQ-ACK codebook of the same size in the same slot, and thus the coverage of an uplink PUCCH is limited. Therefore, the present invention proposes the followings with regard to a method for reducing the size of the semi-static HARQ-ACK codebook transmitted on PUCCH corresponding to different PDSCH group indicators in one slot.

- As a first method, the UE may divide a slot in half, and may include, in the semi-static HARQ-ACK codebook corresponding to PDSCH_group_indicator 0, PDSCH candidates that are likely to be transmitted in the former half, and may include, in the semi-static HARQ-ACK codebook corresponding to PDSCH_group_indicator 1, PDSCH candidates that are likely to be transmitted in the latter half. In other words, by using time domain information occupied by a PDSCH candidate, it may be determined which PDSCH_group_indicator corresponds to the semi-static HARQ-ACK codebook in which the PDSCH is to be included.
- As a second method, the UE may determine which PDSCH_group_indicator corresponds to the semi-static HARQ-ACK codebook in which HARQ-ACK of PDSCH is to be included according to K1 values indicated by a PDCCH (or DCI). For example, HARQ-ACKs of PDSCHs indicated by four smaller K1 values among eight K1 values may be included in the semi-static HARQ-ACK codebook corresponding to PDSCH_group_indicator 0, and HARQ-ACKs of PDSCHs indicated by the other four larger K1 values may be included in the semi-static HARQ-ACK codebook corresponding to PDSCH_group_indicator 0.
- As a third method, the UE may determine which PDSCH_group_indicator corresponds to the semi-static HARQ-ACK codebook in which HARQ-ACK of PDSCH is to be included according to length (occupied symbol) values of PDSCH indicated by a PDCCH (or DCI). For example, when the length of a PDSCH is 2 or 4, HARQ-ACK of the PDSCH may be included in the semi-static HARQ-ACK codebook corresponding to PDSCH_group_indicator 0, and HARQ-ACK of the PDSCH of at least 7 may be included in the semi-static HARQ-ACK codebook corresponding to PDSCH_group_indicator 0.
- As a fourth method, the UE may determine which PDSCH_group_indicator corresponds to the semi-static HARQ-ACK codebook in which HARQ-ACK of PDSCH is to be included according to a PDSCH mapping type indicated by a PDCCH (or DCI). For example, HARQ-ACK of the PDSCH may be included in the semi-static HARQ-ACK codebook corresponding to PDSCH_group_indicator 0 if PDSCH mapping type A is indicated, and HARQ-ACK of the PDSCH may be included in the semi-static HARQ-ACK codebook corresponding to PDSCH_group_indicator 1 if PDSCH mapping type B is indicated.
- As a fifth method, the UE may determine which PDSCH_group_indicator corresponds to the semi-static HARQ-ACK codebook in which HARQ-ACK of PDSCH is to be included according to an index of a time domain resource allocation field indicated by a PDCCH (or DCI). For example, HARQ-ACKs of PDSCHs having the indicated index of 0 to 7 (bit is 0000 to 0111) may be included in the semi-static HARQ-ACK codebook corresponding to PDSCH_group_indicator 0, and HARQ-ACKs of PDSCHs having the indicated index of 8 to 15 (bit is 1000 to 1111) may be included in the semi-static HARQ-ACK codebook corresponding to PDSCH_group_indicator 1.
- As another method, when the base station configures the semi-static HARQ-ACK codebook of a specific PDSCH_group_indicator for the UE, the base station may configure the number of HARQ-ACKs (or PDSCHs) required per slot. For example, when two HARQ-ACK bits are configured per slot, the UE may generate the semi-static HARQ-ACK codebook in which up to 2 bits are included per slot when generating the semi-static HARQ-ACK codebook of a specific PDSCH_group_indicator. In other words, the UE expects to receive up to two PDSCHs (1 bit per PDSCH) indicated by a specific PDSCH_group_indicator in one slot. The number of HARQ-ACKs (or PDSCHs) required per slot may be configured as different values in the semi-static HARQ-ACK codebooks corresponding to different PDSCH_group_indicators.
- As another method, the UE may configure a HARQ-ACK codebook of a specific PDSCH_group_indicator in a semi-static HARQ-ACK codebook scheme, and may configure a HARQ-ACK codebook of another specific PDSCH_group_indicator in a dynamic HARQ-ACK codebook scheme.
- As another method, when the UE receives only one PDSCH having a specific PDSCH group indicator value (i.e., when there is no HARQ-ACK of another PDSCH to be multiplexed), the UE may transmit only HARQ-ACK for the received one PDSCH on PUCCH.
- As another method, when the UE receives a configuration of a PUCCH resource indicator (PRI) from the base station, the UE may receive a configuration of a PDSCH group indicator corresponding to each PRI value. For example, when the UE receives a configuration of 16 PUCCHs and PRI values (here 0, 1, . . . , 15) when the number of PDSCH group indicators is four (0, 1, 2, 3), the base station may receive a value of 0, 1, 2, or 3 as a PDSCH group indicator value when receiving a configuration of each PUCCH and PRI value. That is, the PDSCH group indicator value 0 may be configured for the PRI values 0, 1, 2, and 3, the PDSCH group indicator value 1 may be configured for the PRI values 4, 5, 6, and 7, the PDSCH group indicator value 2 may be configured for the PRI values 8, 9, 10, and 11, and the PDSCH group indicator value 3 may be configured for the PRI values 12, 13, 14, and 16. The UE may recognize the PDSCH group indicator value through a PRI value of DCI that schedules PDSCH. In the above embodiment, when the PRI value of DCI is 10, the UE may recognize 2 as the PDSCH group indicator value.

Another problem to be addressed by the present invention relates to a scheme for transmitting a PUCCH when PUCCH resources indicated by different PDSCH group indicators overlap.

Figure 14:
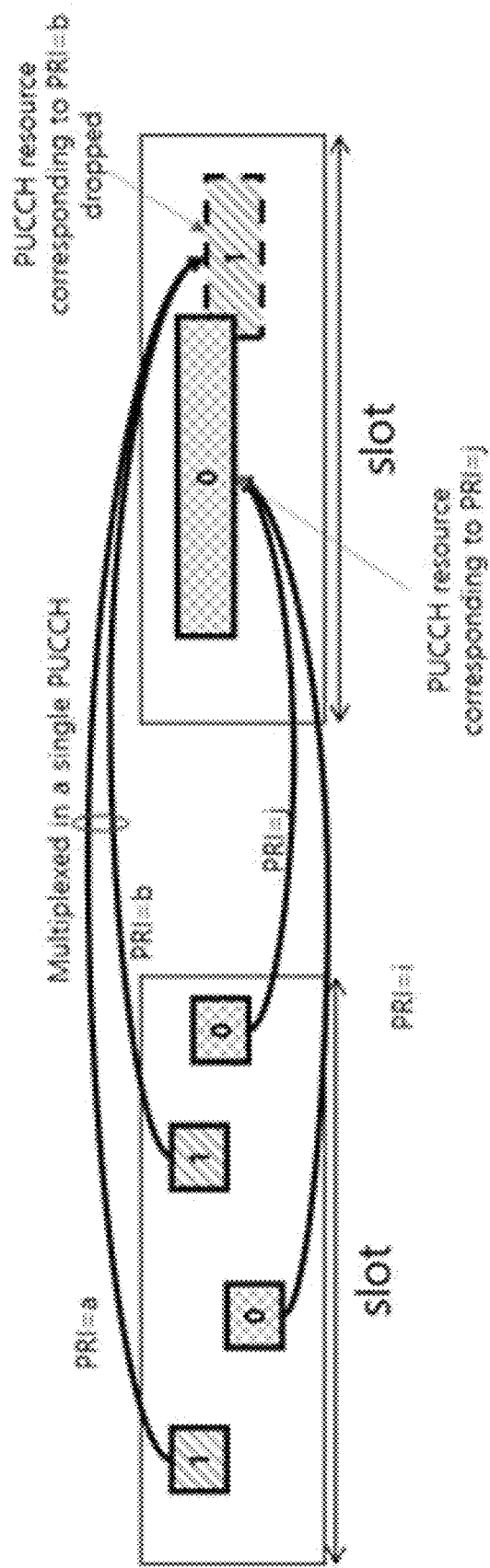
FIG. 14 is a diagram illustrating a situation in which collision occurs when transmitting a PUCCH according to a PDSCH group indicator according to an embodiment of the present invention.

FIG. 14 is a diagram illustrating a situation in which a collision occurs when transmitting a PUCCH according to a PDSCH group indicator according to an embodiment of the present invention.

Referring to FIG. 14, when a PUCCH resource corresponding to the PDSCH group indicator 0 of one UE and a PUCCH resource corresponding to the PDSCH group indicator 1 overlap, the UE cannot simultaneously transmit two PUCCHs. Here, the UE may drop one PUCCH among the two PUCCHs and transmit the other PUCCH, or may transmit HARQ-ACK codebooks of the two PUCCHs on one PUCCH. The present invention specifically proposes the above operation.

In the operation of dropping one PUCCH among the two PUCCHs and transmitting the other PUCCH, which PUCCH should be transmitted is determined as below.

As a first embodiment, the UE transmits a PUCCH corresponding to PDSCH group indicator indicated by a PDCCH (or DCI) that is most recently received, and drops a PUCCH corresponding to PDSCH group indicator that is not the case without transmission.

As a second embodiment, a PUCCH having a lower code rate value (higher reliability) among two overlapping PUCCHs is transmitted, and a PUCCH that is not the case is dropped without being transmitted.

As a third embodiment, a PUCCH of a preceding resource among two overlapping PUCCHs is transmitted, and a PUCCH of a following resource is dropped without being transmitted. Determination on whether a resource precedes or follows may be based on a last symbol of the resource, and, if resources have the same last symbol, a resource having a preceding start symbol may be determined to be a preceding resource.

As a fourth embodiment, a PUCCH occupying a longer symbol among two overlapping PUCCHs may be transmitted, and a PUCCH occupying a smaller symbol may be dropped without being transmitted.

As another embodiment, a PUCCH having a smaller PUCCH resource indicator (PRI) value among two overlapping PUCCHs may be transmitted, and a PUCCH having a larger value may be dropped.

In the operation of transmitting HARQ-ACK codebooks of two PUCCHs on one PUCCH, the HARQ-ACK codebooks may be made as below.

As a first embodiment, the UE may generate one large codebook by continuously connecting HARQ-ACK codebooks according to an order of PDSCH_group_indicator values, and may transmit the codebook on one PUCCH resource.

As a second embodiment, the UE may newly generate a codebook for PDSCH candidates included in overlapping PUCCHs (i.e., generate semi-static HARQ-ACK codebook for all PDSCH candidates), and may transmit the HARQ-ACK codebook on one PUCCH resource. Alternatively, when generating one large codebook by continuously connecting HARQ-ACK codebooks according to an order of PDSCH_group_indicator values, the UE may exclude HARQ-ACK bits included in a preceding codebook from a following HARQ-ACK codebook. An advantage of the second embodiment is that when there are HARQ-ACK bits for one PDSCH candidate in both of two overlapping PUCCHs in the first embodiment, these bits are not sent in duplication.

The PDSCH group indicator may be included in DCI that schedules a PDSCH with 1 bit, and, if the PDSCH is included in a PDSCH group other than a previously transmitted PDSCH group, the 1 bit may be toggled. When the value of the PDSCH group indicator is toggled, the UE may determine that the PDSCH is included in a new PDSCH group. That is, this PDSCH may not be multiplexed with HARQ-ACK of a previous PDSCH group but may be multiplexed with HARQ-ACK of a new PDSCH group. When the value of the PDSCH group indicator is not toggled, the UE may determine that the PDSCH is included in a previous PDSCH group. That is, this PDSCH may be multiplexed with HARQ-ACK of a previous PDSCH group.

2. Finer K1 Granularity

A PDCCH (or DCI) scheduling a PDSCH may indicate a K1 value (PDSCH-to-HARQ_feedback timing indicator) in order to indicate in which slot HARQ-ACK of the PDSCh is to be transmitted. The K1 value is the number of slots between a slot in which a scheduled PDSCH ends and a slot in which a PUCCH on which HARQ-ACK is transmitted is transmitted. Since the unit of the K1 value is slot, two or more PUCCHs cannot be transmitted within one slot. The unit (or granularity) of the K1 value indicated by DCI may be determined as a unit smaller than a slot in order to transmit a PUCCH including one or more HARQ-ACK in one slot.

FIG. 15 is a diagram illustrating a method for transmitting a PUCCH when the unit of K1 is set to a half slot according to an embodiment of the present invention.

Referring to FIG. 15, the unit of K1 may be determined as a half slot. That is, the K1 value is the number of half slots between a half of a slot in which a scheduled PDSCH ends and a half of a slot in which a PUCCH on which HARQ-ACK is transmitted is transmitted.

When the granularity of K1 is given as a sub-slot (or set of symbols), the K1 value indicates the number of sub-slots between a sub-slot in which a last symbol of a PDSCH is included and a sub-slot in which a first symbol of a PUCCH is included. That is, if the K1 value is 0, this value indicates that a sub-slot in which a last symbol of a PDSCH is included and a sub-slot in which a first symbol of a PUCCH is included are the same sub-slot. As another embodiment, when the granularity of K1 is given as a sub-slot (or set of symbols), the K1 value indicates the number of sub-slots between a last sub-slot of a slot in which a last symbol of a PDSCH is included and a sub-slot in which a first symbol of a PUCCH is included. That is, if the K1 value is 0, this value indicates that a last sub-slot of a slot in which a last symbol of a PDSCH is included and a sub-slot in which a first symbol of a PUCCH is included are the same sub-slot. As another embodiment, when the granularity of K1 is given as a sub-slot (or set of symbols), the K1 value indicates the number of sub-slots between a foremost sub-slot among sub-slots $T_{proc,1}$ time after a last symbol of a PDSCH and a sub-slot in which a first symbol of a PUCCH is included. Here, $T_{proc,1}$ indicates a minimum time taken for receiving a PDSCH and transmitting valid HARQ-ACK. This value is indicated in TS38.214.

Another problem to be addressed by the present invention relates to a scheme for transmitting a PUCCH when PUCCH resources indicated by different half slots (or K1 units) overlap in one slot.

Figure 16:
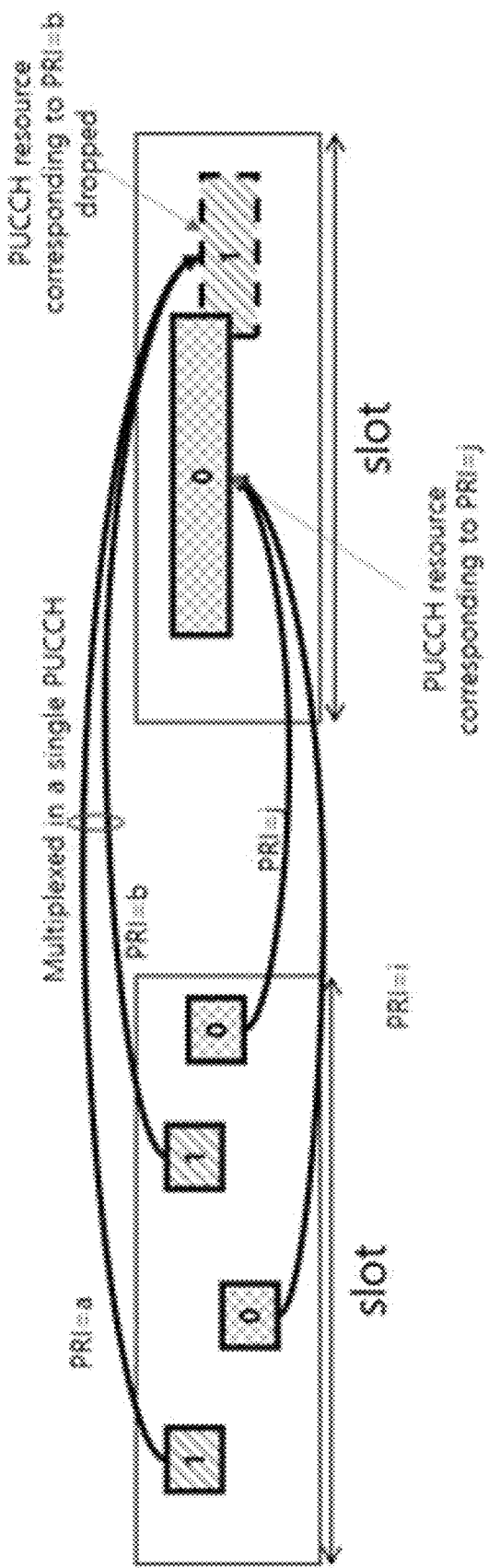
FIG. 16 is a diagram illustrating a situation in which collision occurs when transmitting a PUCCH when a unit of K1 is a half slot according to an embodiment of the present invention.

FIG. 16 is a diagram illustrating a situation in which a collision occurs when transmitting a PUCCH when the unit of K1 is set to a half slot according to an embodiment of the present invention.

Referring to FIG. 16, when a PUCCH resource starting in a preceding half slot of one UE and a PUCCH resource starting in a following half slot overlap, the UE cannot simultaneously transmit two PUCCHs. Here, the UE may drop one PUCCH among the two PUCCHs and transmit the other PUCCH, or may transmit HARQ-ACK codebooks of the two PUCCHs on one PUCCH. An embodiment of the present invention specifically proposes the above operation.

In the operation of dropping one PUCCH among the two PUCCHs and transmitting the other PUCCH, which PUCCH should be transmitted is determined as below.

As a first embodiment, the UE transmits a PUCCH indicated by a PDCCH (or DCI) that is most recently received, and drops a PUCCH that is not the case without transmission.

As a second embodiment, a PUCCH having a lower code rate value (higher reliability) among two overlapping PUCCHs is transmitted, and a PUCCH that is not the case is dropped without being transmitted.

As a third embodiment, a PUCCH of a preceding resource among two overlapping PUCCHs is transmitted, and a PUCCH of a following resource is dropped without being transmitted. Determination on whether a resource precedes or follows may be based on a last symbol of the resource, and, if resources have the same last symbol, a resource having a preceding start symbol may be determined to be a preceding resource.

As a fourth embodiment, a PUCCH occupying a longer symbol among two overlapping PUCCHs may be transmitted, and a PUCCH occupying a smaller symbol may be dropped without being transmitted.

As another embodiment, a PUCCH having a smaller PUCCH resource indicator (PRI) value among two overlapping PUCCHs may be transmitted, and a PUCCH having a larger value may be dropped.

In the operation of transmitting HARQ-ACK codebooks of two PUCCHs on one PUCCH, the HARQ-ACK codebooks may be made as below.

As a first embodiment, the UE may generate one large codebook by continuously connecting HARQ-ACK codebooks in order of time (i.e., a HARQ-ACK codebook instructed to be transmitted with a preceding half slot is positioned before a HARQ-ACK codebook instructed to be transmitted with a following half slot), and may transmit the codebook on one PUCCH resource.

As a second embodiment, the UE may newly generate a codebook for PDSCH candidates included in overlapping PUCCHs (i.e., generate semi-static HARQ-ACK codebook for all PDSCH candidates), and may transmit the HARQ-ACK codebook on one PUCCH resource. Alternatively, when generating one large codebook by continuously connecting HARQ-ACK codebooks in order of time, the UE may exclude HARQ-ACK bits included in a preceding codebook from a following HARQ-ACK codebook. An advantage of the second embodiment is that when there are HARQ-ACK bits for one PDSCH candidate in both of two overlapping PUCCHs in the first embodiment, these bits are not sent in duplication.

3. HARQ-ACK Multiplexing Indicator

As an embodiment of the present invention, the UE may receive, from a PDCCH (or DCI) scheduling a PDSCH, an indication of information about whether to multiplex HARQ-ACK of the PDSCH with other HARQ-ACKs. The above indicator is referred to as a HARQ-ACK multiplexing indicator for convenience. The HARQ-ACK multiplexing indicator may be determined with 1 bit. In the case of 1 bit, 0 may indicate that HARQ-ACK of the PDSCH is not multiplexed with HARQ-ACK of another PDSCH so as to be transmitted, and 1 indicates that HARQ-ACK of the PDSCH is multiplexed with HARQ-ACK of another PDSCH so as to be transmitted. Here, not being multiplexed with HARQ-ACK of another PDSCH so as to be transmitted represents that a PUCCH transmitted by including HARQ-ACK of the PDSCH does not include HARQ-ACK information of another PDSCH. Therefore, the PUCCH includes 2-bit HARQ-ACK when configured to transmit 1 bit (or 2 transport blocks for PDSCH), and the HARQ-ACK may be transmitted in one PUCCH format among PUCCH format 0 and PUCCH format 1 in accordance with a bit size. Being multiplexed with HARQ-ACK of another PDSCH so as to be transmitted represents that a PUCCH transmitted by including HARQ-ACK of the PDSCH may include HARQ-ACK information of another PDSCH. When transmitting by multiplexing with HARQ-ACK of another PDSCH, a HARQ-ACK codebook is generated using a dynamic HARQ-ACK codebook or semi-static HARQ-ACK codebook scheme, and is transmitted on a PUCCH.

Figure 17:
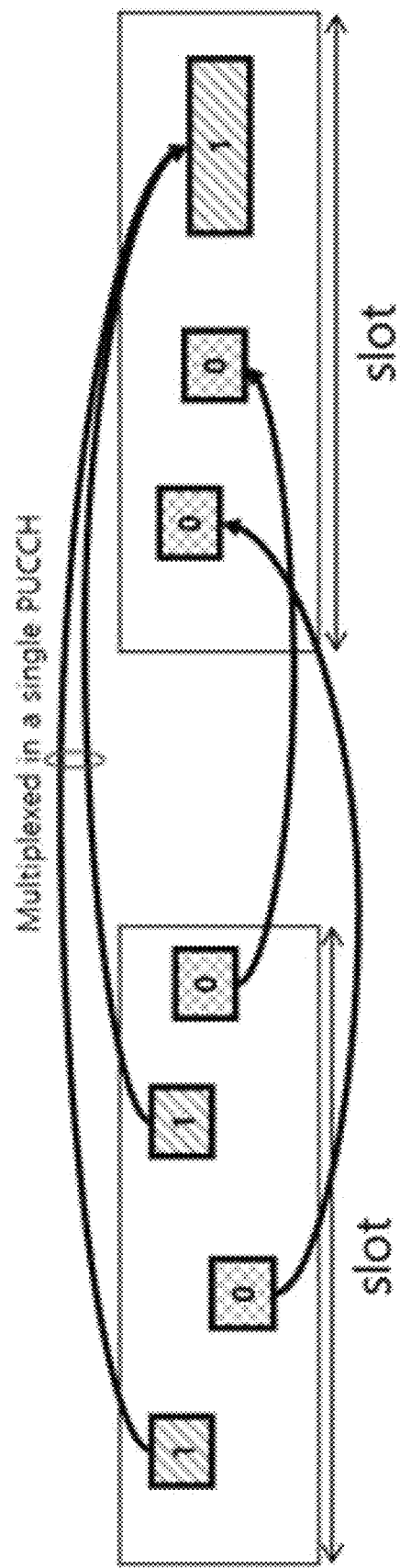
FIG. 17 is a diagram illustrating a method of transmitting a PUCCH according to an HARQ-ACK multiplexing indicator according to an embodiment of the present invention.

FIG. 17 is a diagram illustrating a method for transmitting a PUCCH according to a HARQ-ACK multiplexing indicator according to an embodiment of the present invention.

Referring to FIG. 17, the UE transmits, through one PUCCH, HARQ-ACK information of two PDSCHs having a HARQ-ACK multiplexing indicator value of 1. Furthermore, HARQ-ACK information of two PDSCHs having a HARQ-ACK multiplexing indicator value of 0 is transmitted through respective PUCCH resources. Here, the PUCCH resource of a PDSCH having the HARQ-ACK multiplexing indicator value of 0 is indicated through a PRI value that schedules the PDSCH. Here, when PUCCHs for transmitting HARQ-ACKs of different PDSCHs having the HARQ-ACK multiplexing indicator value of 0 (multiplexing indicator with HARQ-ACK of another PDSCH is impossible) overlap in the same symbol, simultaneous transmission is impossible. In this case, the HARQ-ACK information of two PUCCHs may be multiplexed into one PUCCH so as to be transmitted. As another method, HARQ-ACK of a PDSCH scheduled later (i.e., when a PDCCH scheduling a PDSCH starts later or ends later) may be prioritized so as to transmit a PUCCH of the PDSCH, and another overlapping PUCCH may not be transmitted. As another method, the UE may not expect that the two PUCCHs will overlap in one symbol.

As another embodiment of the present invention, even when 0 is indicated as the HARQ-ACK multiplexing indicator value (multiplexing with HARQ-ACK of another PDSCH is impossible), HARQ-ACK multiplexing may be partially possible. For example, if two PDSCHs, for which 0 is indicated as the HARQ-ACK multiplexing indicator value, are instructed to be transmitted on the same PUCCH resource (or have the same PUCCH resource indicator (PRI) value or overlap in at least one symbol), the HARQ-ACKs of the two PDSCHs may be multiplexed and transmitted. Here, a HARQ-ACK bit of a PDSCH scheduled later is positioned after a HARQ-ACK bit of a PDSCH scheduled earlier.

Figure 18:
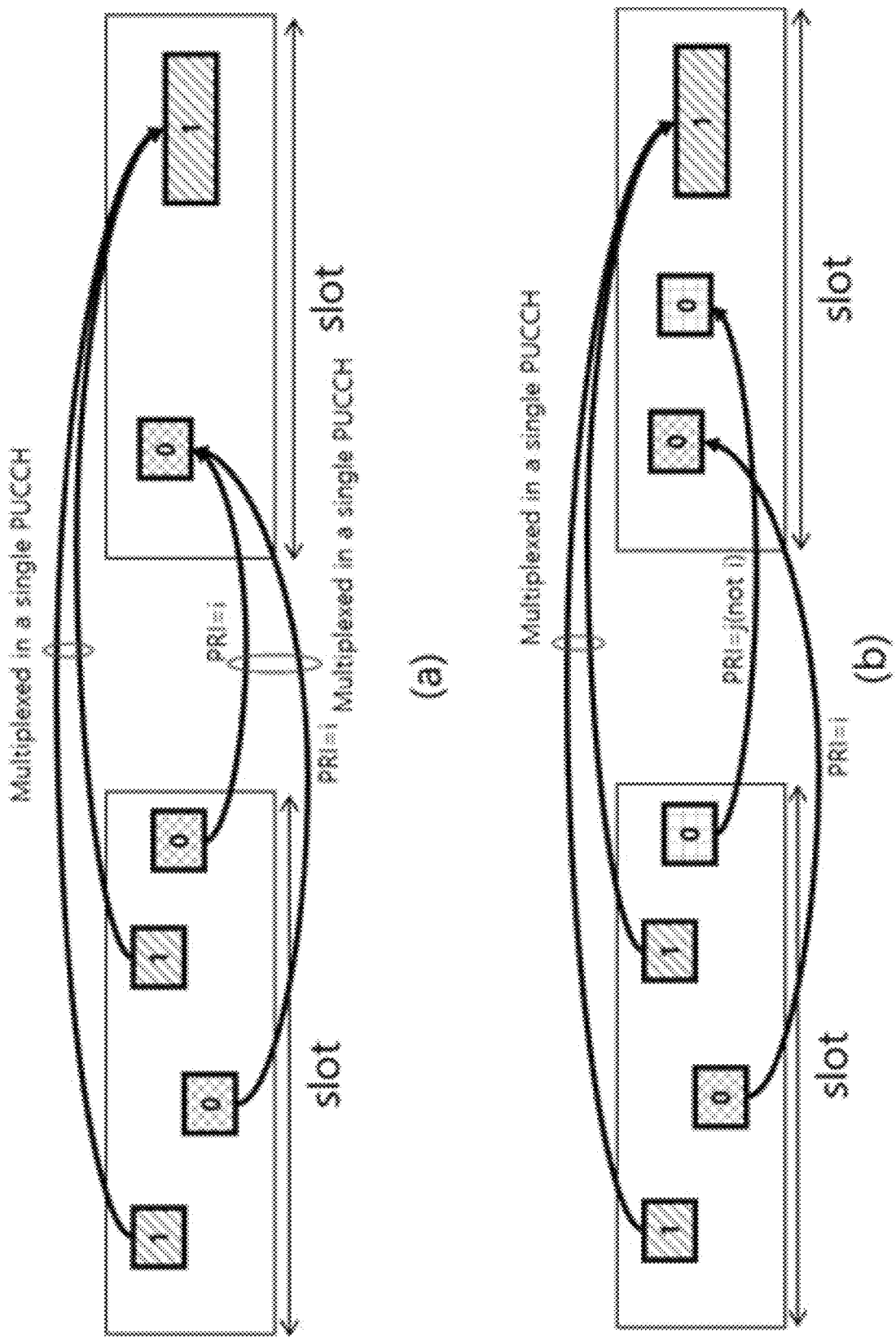
FIG. 18 is a diagram illustrating a HARQ-ACK multiplexing method using PRI when transmitting a PUCCH according to an HARQ-ACK multiplexing indicator according to an embodiment of the present invention.

FIG. 18 is a diagram illustrating a HARQ-ACK multiplexing method using a PRI when transmitting a PUCCH according to a HARQ-ACK multiplexing indicator according to an embodiment of the present invention.

Referring to (a) of FIG. 18, when PDSCHs, for which 0 is indicated as the HARQ-ACK multiplexing indicator value, have the same PRI value of i, the UE may transmit HARQ-ACK of the two PDSCHs on a PUCCH resource corresponding to PRI=i.

Referring to (b) of FIG. 18, when PDSCHs, for which 0 is indicated as the HARQ-ACK multiplexing indicator value, have different PRI values, the UE may transmit each HARQ-ACK information on PUCCH resources corresponding to respective PRI values.

A PUCCH resource for transmitting HARQ-ACK of PDSCHs having the HARQ-ACK multiplexing indicator value of 1 and a PUCCH resource for transmitting HARQ-ACK of PDSCHs having the HARQ-ACK multiplexing indicator value of 0 may overlap. As a PUCCH transmission method for this case, according to an embodiment of the present invention, the UE may always prioritize and transmit a PUCCH for transmitting HARQ-ACK of PDSCHs having the HARQ-ACK multiplexing indicator value of 0, and may drop a PUCCH for transmitting HARQ-ACK of PDSCHs having the HARQ-ACK multiplexing indicator value of 1.

As another embodiment, if a last symbol of a PUCCH for transmitting HARQ-ACK of PDSCHs having the HARQ-ACK multiplexing indicator value of 1 is prior to or ends at the same time as a last symbol of a PUCCH for transmitting HARQ-ACK of PDSCHs having the HARQ-ACK multiplexing indicator value of 0, the UE may attach HARQ-ACK bits of the PDSCHs having the HARQ-ACK multiplexing indicator value of 0 to the HARQ-ACK of the PDSCHs having the HARQ-ACK multiplexing indicator value of 1 and transmit the same on a PUCCH resource of the PDSCHs having the HARQ-ACK multiplexing indicator value of 1.

Although the HARQ-ACK multiplexing indicator is expressed with 1 bit for convenience, this indicator may be implicitly indicated as below.

As a first method, the HARQ-ACK multiplexing indicator may be determined according to RNTI. For example, if a PDCCH (or DCI) scheduling a PDSCH is scrambled with C-RNTI, the HARQ-ACK multiplexing indicator of the PDSCH may be determined to have a value of 1 (i.e., multiplexing with HARQ-ACK information of another PDSCH is possible), and, when a PDCCH (or DCI) scheduling a PDSCH is scrambled with a specific RNTI (e.g., RNTI for URLLC service) other than C-RNTI, the HARQ-ACK multiplexing indicator of the PDSCH may be determined to have a value of 0 (multiplexing with HARQ-ACK of another PDSCH is impossible).

As a second method, the HARQ-ACK multiplexing indicator may be determined according to a K1 value included in a PDCCH (or DCI). Here, the K1 value indicates a time interval between a scheduled PDSCH and HARQ-ACK of the PDSCH. Therefore, in general, it is necessary for a PDSCH for a URLLC service to quickly indicate HARQ-ACK. Therefore, when the K1 value is less than a specific K1 value, the HARQ-ACK multiplexing indicator may be determined as 0. Here, the specific K1 value may be determined as a slot unit (e.g., 1 slot or 2 slots) or an absolute time unit (e.g., 0.5 ms or 0.25 ms). Alternatively, a specific value among the K1 values may be determined, and the HARQ-ACK multiplexing indicator may be always determined as 0 when the value is indicated. That is, when the UE receives an indication of the value, the UE may transmit only HARQ-ACK for one PDSCH without generating the codebook.

As a third method, the HARQ-ACK multiplexing indicator may be determined according to a modulation and coding scheme (MCS) value. Here, the MCS value indicates a code rate of a scheduled PDSCH. In general, it is necessary for a PDSCH for a URLLC service to be reliable. Therefore, when a code rate value is lower than a specific value, the HARQ-ACK multiplexing indicator may be determined as 0. For another example, the HARQ-ACK multiplexing indicator may be determined according to an MCS table used by a PDCCH (or DCI). When a specific PDCCH (or DCI) uses an MCS table that provides higher reliability (lower code rate), the HARQ-ACK multiplexing indicator value of the PDCCH (or DCI) may be determined as 0.

As a fourth method, the HARQ-ACK multiplexing indicator may be determined as 1 with a combination of specific values of other fields transmitted on DCI.

As a fifth method, the HARQ-ACK multiplexing indicator may be determined according to a search space (or CORESET) in which a PDCCH (or DCI) has been detected. For example, the base station may additionally indicate, to the UE, a search space (or CORESET) for URLLC transmission. Upon receiving a PDCCH (or DCI) in the above search space (or CORESET), the UE may determine the HARQ-ACK multiplexing indicator as 0. Upon receiving a PDCCH (or DCI) in another search space (or CORESET), the UE may determine the HARQ-ACK multiplexing indicator as 1. As another method, the UE may distinguish a search space (or CORESET) without an additional explicit indication from the base station. For example, if a monitoring period of a search space (or CORESET) is shorter than a specific period, the search space (or CORESET) may be determined as a search space (or CORESET) for URLLC transmission. As an embodiment, the specific period may be 1 slot.

As a sixth method, the UE may determine the HARQ-ACK multiplexing indicator value through a control channel element (CCE) aggregation level of a received PDCCH. For example, if the CCE aggregation level exceeds a specific value, the UE may determine the HARQ-ACK multiplexing indicator of the PDCCH as 0. Here, the specific CCE aggregation level value may be determined as 8 or 16.

As a seventh method, the HARQ-ACK multiplexing indicator value may be determined by DCI format (or DCI length). For example, if compact DCI is configured for the UE, the UE may determine the HARQ-ACK multiplexing indicator value of a PDSCH scheduled by compact DCI as 0. Here, the compact DCI, which is a DCI format for scheduling URLLC PDSCH, has a smaller payload size than a payload size of fallback DCI (DCI format 0_0/1_0).

As an eighth method, the HARQ-ACK multiplexing indicator value may be determined through a PUCCH resource indicator (PRI) value. Here, the PRI transmitted on a PUCCH (or DCI) indicates which PUCCH resource is used among PUCCH resources configured by the base station for the UE. When the UE receives an indication of specific values among PRI values, the UE may determine the HARQ-ACK multiplexing indicator value as 0. This is because all of configured PUCCH resources are not suitable for transmitting URLLC HARQ-ACK. For example, since a PUCCH resource that exceeds 2 bits among PUCCH resources is not suitable for transmitting the URLLC HARQ-ACK, the UE may determine the HARQ-ACK multiplexing indicator value as 1 for PRI indicating the corresponding PUCCH resource.

As a ninth method, the HARQ-ACK multiplexing indicator value may be determined through a HARQ process number. For example, when a specific value among HARQ process numbers is indicated, the UE may determine the HARQ-ACK multiplexing indicator value as 1 and transmit only HARQ-ACK for one PDSCH.

As a 10th method, the HARQ-ACK multiplexing indicator value may be determined through a PDSCH group indicator value. As described above, the PDSCH group indicator is introduced in order to transmit HARQ-ACK on the same PUCCH resource. When the UE receives a specific value among PDSCH group indicator values, the UE may determine the HARQ-ACK multiplexing indicator value as 1 and transmit only HARQ-ACK for one PDSCH.

Another embodiment of the present invention relates to a method for a UE to interpret a K1 value.

As described above, the K1 value is the number of slots between a slot in which a scheduled PDSCH ends and a slot in which a PUCCH on which HARQ-ACK is transmitted is transmitted (wherein the slot can be replaced with a specific unit smaller than the slot). However, a processing time may occur when the UE actually receives and decodes PDSCH and generates a PUCCH for transmitting HARQ-ACK. Therefore, a specific K1 value, for example, 0, cannot be indicated. A problem to be solved by the present invention is to define the K1 value except for a value that cannot be indicated.

As a first embodiment of the present invention, when determining the K1 value, the UE may exclude slots that are completely included during a PDSCH processing time $T_{proc,1}$ (value defined in TS 38.214) from a last symbol of a PDSCH. That is, when the above slots are referred to as invalid slots, the K1 value may be defined as the number of slots, except for the invalid slots, between a slot in which a scheduled PDSCH ends and a slot in which a PUCCH on which HARQ-ACK is transmitted is transmitted.

As a second embodiment of the present invention, the UE cannot transmit a corresponding PUCCH on a semi-static DL symbol configured from a higher layer. Therefore, the UE may exclude slots configured with only semi-static DL symbols when determining the K1 value. Alternatively, the UE may exclude slots in which transmission of all PUCCHs is impossible due to a semi-static DL symbol when determining the K1 value. That is, when slots in which a PUCCH resource indicated by PRI and a semi-static DL symbol overlap and thus the PUCCH cannot be transmitted are referred to as invalid slots, the UE may define the K1 value as the number of slots, except for the invalid slots, between a slot in which a scheduled PDSCH ends and a slot in which a PUCCH on which HARQ-ACK is transmitted is transmitted.

A K1 or PRI field may not be configured in order to reduce DCI overhead (payload size of DCI) in a PDCCH (or DCI) that schedules URLLC. An embodiment of the present invention describes a method for determining a PUCCH resource when a K1 or PRI field is not configured.

As a first embodiment of the present invention, when a K1 field (PDSCH-to-HARQ feedback timing indicator field) is not configured, a slot in which a PUCCH resource is included may be a slot in which transmission of a next PUCCH (indicated by PRI) is possible, except for slots that are completely included during a PDSCH processing time $T_{proc,1}$ (value defined in TS 38.214) from a last symbol of a PDSCH.

As a second embodiment of the present invention, when a K1 field (PDSCH-to-HARQ feedback timing indicator field) is not configured, a slot in which a PUCCH resource is included may be a slot in which a symbol indicated by PRI and a semi-static DL symbol do not overlap.

As a third embodiment of the present invention, when a PRI field is not configured, a PUCCH resource may be a PUCCH resource that ends earliest among PUCCH resources configured in a slot indicated by K1.

As a fourth embodiment of the present invention, when a PRI field is not configured, a PUCCH resource may be a PUCCH resource that ends earliest among PUCCH resources except for a PUCCH that does not satisfy a PDSCH processing time $T_{proc,1}$ (value defined in TS 38.214) in a slot indicated by K1. Here, a PUCCH resource that overlaps a semi-static DL symbol may be excluded.

Figure 19:
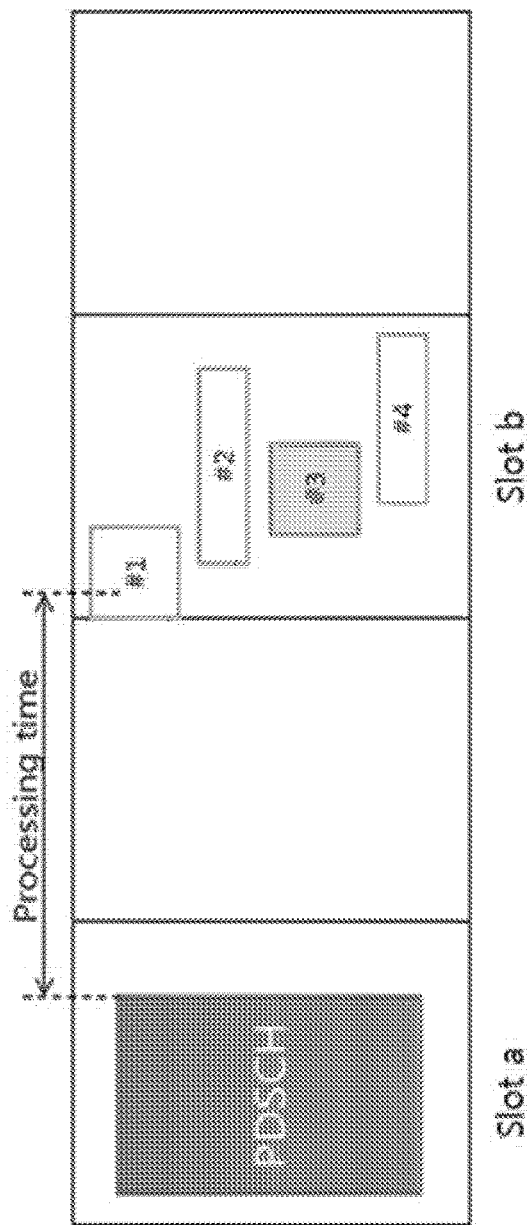
FIG. 19 is a diagram illustrating a method of transmitting a PUCCH when there is no K1 and PRI field according to an embodiment of the present invention.

FIG. 19 is a diagram illustrating a method for transmitting a PUCCH when K1 and PRI fields are not present according to an embodiment of the present invention.

Referring to FIG. 19, when both K1 and PRI fields are not configured in a PDCCH (or DCI), the UE determines a PUCCH resource through the following method. In the embodiment of FIG. 19, total four PUCCH resources are configured. PUCCH resource #1 among the resources does not satisfy a processing time condition and thus may be excluded. A PUCCH resource that ends earliest among the remaining PUCCH resources #2, #3, and #4 is #3, and thus the UE may determine #3 as a PUCCH resource of HARQ-ACK.

Another problem to be solved by the present invention relates to a design method for a dynamic HARQ-ACK codebook (type-2 HARQ-ACK codebook in TS38.213). The base station may be configured to omit some of DCI fields in order to increase a PDCCH reception success probability of the UE. Here, the meaning of the term "omit" includes configuring as 0 bit. For example, the base station may be configured to omit a counter-DAI field among DCI fields for the UE. As described above, in a dynamic HARQ-ACK codebook, the counter-DAI field may be used not only for determining a position of a HARQ-ACK bit in the HARQ-ACK codebook but also for determining a size of the HARQ-ACK codebook. The UE should sort HARQ-ACK bits of a plurality of PDSCHs in ascending order of a value of the counter-DAI field in order to transmit the bits with a HARQ-ACK codebook. However, since the counter-DAI field is omitted, a method for determining an order of HARQ-ACK bits in a HARQ-ACK codebook is required.

As a first embodiment of the present invention, the UE may determine the order of HARQ-ACK bits of a PDSCH in a HARQ-ACK codebook according to reception time information of a PDCCH scheduling the PDSCH. In more detail, when a start symbol of a CORESET or search space in which a PDCCH scheduling a first PDSCH is included precedes a start symbol of a CORESET or search space in which a PDCCH scheduling a second PDSCH is included, a HARQ-ACK bit of the first PDSCH is positioned before a HARQ-ACK bit of the second PDSCH in the HARQ-ACK codebook. If the start symbols of a CORESET or search space are the same, a HARQ-ACK bit is positioned before a HARQ-ACK bit of a PDSCH scheduled by a PDCCH having a preceding last symbol of a CORESET or search space.

As a second embodiment of the present invention, the UE may determine the order of HARQ-ACK bit of a PDSCH in a HARQ-ACK codebook according to time information of the PDSCH. In more detail, when a start symbol of a first PDSCH precedes a start symbol of a second PDSCH, a HARQ-ACK bit of the first PDSCH is positioned before a HARQ-ACK bit of the second PDSCH in the HARQ-ACK codebook. Here, information about a start symbol may be recognized through a time domain resource assignment (TDRA) field of a PDCCH scheduling a PDSCH. If the start symbols of PDSCHs are the same, a HARQ-ACK bit of a PDSCH having a preceding last symbol of PDSCH is arranged at a preceding position. If the start symbols and last symbols are the same, the order of HARQ-ACK bit in a HARQ-ACK codebook may be determined through another embodiment.

As a third embodiment of the present invention, the UE may determine the order of HARQ-ACK bit in a HARQ-ACK codebook according to a HARQ process ID (or HARQ process number) of a PDCCH scheduling a PDSCH. In more detail, when a HARQ process ID of a first PDSCH is referred to as A in a PDCCH scheduling the first PDSCH, and a HARQ process ID of a second PDSCH is referred to as B in a PDCCH scheduling the second PDSCH, a HARQ-ACK bit of a PDSCH having a smaller value among A and B may be positioned before a HARQ-ACK bit of a PDSCH having a larger value in a HARQ-ACK codebook. That is, the position of a HARQ-ACK bit may be determined according to an ascending order of HARQ process ID. Here, the UE assumes that HARQ process IDs of HARQ-ACKs transmitted with one HARQ-ACK codebook have different values. That is, the UE does not expect that HARQ-ACK bits of PDSCHs having the same HARQ process ID will be generated in one HARQ-ACK codebook.

As a fourth embodiment of the present invention, the UE may determine the order of HARQ-ACK bit of a PDSCH in a HARQ-ACK codebook using information of a cell from which a PDCCH scheduling the PDSCH has been received. Here, the cell information may be a cell index (or ID). The UE may be configured to monitor a PDCCH in a plurality of cells. In this case, the UE may receive different PDCCHs from different cells. Here, the UE may arrange HARQ-ACK bits of PDSCHs received from different cells in a HARQ-ACK codebook, according to an ascending order of indices of cells from which PDCCHs scheduling the PDSCHs have been received.

As a fourth embodiment of the present invention, the UE may determine the order of HARQ-ACK bit of a PDSCH in a HARQ-ACK codebook using information of a CORESET (or search space) from which a PDCCH scheduling the PDSCH has been received. Here, the information of a CORESET (or search space) may be an index (or ID) of the CORESET (or search space). The UE may be configured to monitor a PDCCH in a plurality of CORESETs (or search spaces). In this case, the UE may receive different PDCCHs from different CORESETs (or search spaces). Here, the UE may arrange HARQ-ACK bits of PDSCHs received from different CORESETs (or search spaces) in a HARQ-ACK codebook, according to an ascending order of indices of CORESETs (or search spaces) from which PDCCHs scheduling the PDSCHs have been received.

As a sixth embodiment of the present invention, the UE may determine the order of HARQ-ACK bit of a PDSCH in a HARQ-ACK codebook using frequency domain information of a PDCCH scheduling the PDSCH. Here, the frequency domain information may be a lowest PRB index among PRBs to which a PDCCH is allocated. Here, the index represents a common PRB index, and this index indicates a distance from Point A in a frequency domain. Point A represents a reference frequency in an initial access process of the UE. According to TS38.211, Point A is as below.

offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2;

absoluteFrequencyPointA for all other cases where absoluteFrequencyPointA represents the frequency-location of point A expressed as in ARFCN.

The UE may be configured to monitor a plurality of PDCCHs. In this case, the UE may receive different PDCCHs in different frequency domains. Here, the UE may arrange HARQ-ACK bits of PDSCHs received in different frequency domains in a HARQ-ACK codebook, according to an ascending order of lowest PRB indices of PDCCHs scheduling the PDSCHs. According to this scheme, when a plurality of PDCCHs are received from one CORESET (or search space) in the fifth embodiment, the order of HARQ-ACK bit may be determined in a HARQ-ACK codebook.

The above first to sixth embodiments may be combined so as to determine the order of HARQ-ACK bit in a HARQ-ACK codebook. As a preferred combination of the present invention, the first embodiment and the third embodiment may be combined. By means of this combination, the order of HARQ-ACK bit may be first determined according to time domain information of a PDCCH in a HARQ-ACK codebook, and, when the order cannot be determined according to time domain information, the order may be determined according to HARQ process ID according to the third embodiment. As a preferred combination of the present invention, the first embodiment, the fourth embodiment, the fifth embodiment, and the sixth embodiment may be combined. By means of this combination, the order of HARQ-ACK bit may be first determined according to time domain information of a PDCCH in a HARQ-ACK codebook, and, when the order cannot be determined according to time domain information, the order may be determined according to cell information, and, when the order cannot be determined according to cell information, the order may be determined according to information of a CORESET (or search space, and, when the order cannot be determined according to the information of a CORESET (or a search space), the order may be determined according to frequency domain allocation information of a PDCCH.

Another problem to be solved by the present invention relates to the case where a PDCCH corresponding to HARQ-ACK of one HARQ-ACK codebook is included as two types, i.e., DCI with a counter-DAI field and DCI without a counter-DAI field. In this case, in a HARQ-ACK codebook, the UE should determine positions of HARQ-ACK of a PDSCH scheduled by DCI with a counter-DAI field and HARQ-ACK of a PDSCH scheduled by DCI without a counter-DAI field.

As an embodiment of the present invention, in the above situation, the UE generates a first sub-HARQ-ACK codebook by collecting only HARQ-ACKs of PDSCHs scheduled by DCI with a counter-DAI field. Here, the position of HARQ-ACK in the first sub-HARQ-ACK codebook is determined using a value of a counter-DAI field (i.e., position is determined according to an ascending order of counter-DAI). Furthermore, the UE generates a second sub-HARQ-ACK codebook by collecting only HARQ-ACKs of PDSCHs scheduled by DCI without a counter-DAI field. Here, the position of HARQ-ACK in the second sub-HARQ-ACK codebook may be determined using a combination of the first to sixth embodiments. The UE may generate a HARQ-ACK codebook by continuously combining the first sub-HARQ-ACK codebook and the second sub-HARQ-ACK codebook (i.e., the first bit of the second sub-HARQ-ACK codebook is made to follow the last bit of the first sub-HARQ-ACK codebook). This scheme may increase complexity of the UE since two sub-HARQ-ACK codebooks should be generated in different manners.

As another embodiment of the present invention, in the above situation, the UE may disregard a counter-DAI field even for DCI with a counter-DAI field. That is, all of pieces of DCI may be assumed to be DCI without a counter-DAI field, and the position of HARQ-ACK bit may be determined in a HARQ-ACK codebook using a combination of the first to sixth embodiments.

Another invention to be solved by the present invention relates to a method for reducing a payload size of DCI. Similarly to the above method of not including a K1 or PRI field in order to reduce DCI overhead, another DCI field may also not be included or only some of options that may be indicated by a DCI field may be included. Here, when only some of the options (e.g., N number of options) that may be indicated by a DCI field are included, a bit size of the DCI field is ceil(log 2(N)). However, if N is not shown as the power of 2, 2^X−N number of code points of the corresponding DCI field cannot be used. Here, X is a smallest value among integers that satisfy the condition that 2^X be equal to or larger than N. Therefore, in order to more efficiently use this, it is necessary to joint encode different DCI fields.

As an embodiment of the present invention, it is assumed that j-th DCI field includes Y(j) number of options (0-th option, first option, . . . -th option). Upon receiving DCI from the base station, the UE may obtain the order of an option in the j-th DCI field from the following equation. Here, the order starts from 0-th (i.e., the foremost option is 0-th).

Field($j$)=floor($X/Z(j)$)mod $Y(j)$ where $X=\Sigma_{k=0}^{DCI\_length-1} 2^b$, and $Z(i)=\Pi_{n=0}^{f-1} Y(j)$ for j>1, and Z(1)=1 for j=1. Furthermore, DCI_length is a length of DCI, and $b_k$ expresses received DCI in a binary system. That is, from the above equation, an option corresponding to Field(j) (Field(j)-th option) may be selected from j-th DCI.

For example, the following table pertains to the case where DCI includes three fields, each of which includes three options. When bits are calculated for each DCI field, 6 bits are required since each of three fields occupies 2 bits. However, 5 bits are enough when a proposed scheme is used. In following Table 4, 11011 to 11111 may be reserved.

TABLE 4

| X (binary) | X (decimal) | First field<br>Y(1) = 3,<br>Z(1) = 1<br>floor(X/Z(1))<br>mod Y(1) =<br>floor(X/1) mod 3 | Second field<br>Y(2) = 3,<br>Z(2) = 3<br>floor(X/Z(2))<br>mod Y(2) =<br>floor(X/3) mod 3 | Third field<br>Y(3) = 3,<br>Z³ = 9<br>floor(X/Z(3))<br>mod Y(3) =<br>floor(X/9) mod 3 |
|---|---|---|---|---|
| 00000 | 0 | 0 | 0 | 0 |
| 00001 | 1 | 1 | 0 | 0 |
| 00010 | 2 | 2 | 0 | 0 |
| 00011 | 3 | 0 | 1 | 0 |
| 00100 | 4 | 1 | 1 | 0 |
| 00101 | 5 | 2 | 1 | 0 |
| 00110 | 6 | 0 | 2 | 0 |
| 00111 | 7 | 1 | 2 | 0 |
| 01000 | 8 | 2 | 2 | 0 |
| 01001 | 9 | 0 | 0 | 1 |
| 01010 | 10 | 1 | 0 | 1 |
| 01011 | 11 | 2 | 0 | 1 |
| 01100 | 12 | 0 | 1 | 1 |
| 01101 | 13 | 1 | 1 | 1 |
| 01110 | 14 | 2 | 1 | 1 |
| 01111 | 15 | 0 | 2 | 1 |
| 10000 | 16 | 1 | 2 | 1 |
| 10001 | 17 | 2 | 2 | 1 |
| 10010 | 18 | 0 | 0 | 2 |
| 10011 | 19 | 1 | 0 | 2 |
| 10100 | 20 | 2 | 0 | 2 |
| 10101 | 21 | 0 | 1 | 2 |
| 10110 | 22 | 1 | 1 | 2 |
| 10111 | 23 | 2 | 1 | 2 |
| 11000 | 24 | 0 | 2 | 2 |
| 11001 | 25 | 1 | 2 | 2 |
| 11010 | 26 | 2 | 2 | 2 |
| 11011 | 27 | — | — | — |
| 11100 | 28 | — | — | — |
| 11101 | 29 | — | — | — |
| 11110 | 30 | — | — | — |
| 11111 | 31 | — | — | — |

For example, when the UE receives an indication of 01100 as DCI, the UE may obtain Field(1)=0, Field(2)=1, Field(3)=1. That is, it may be understood that Field(1)=0-th option is indicated in a first DCI field, Field(2)=1-st option is indicated in a second DCI field, and Field(3)=1-st option is indicated in a third DCI field.

Another problem to be addressed by the present invention relates to a method for dividing a slot into sub-slots. For example, when dividing a slot configured with 14 symbols into two sub-slots, each sub-slot may be configured with 7 consecutive symbols. A first sub-slot may be configured with first 7 symbols of the slot, and a second sub-slot may be configured with last 7 symbols of the slot. As another example of the present invention, when dividing a slot configured with 14 symbols into two sub-slots, a first sub-slot may be configured with odd-numbered symbols of the slot, and a second sub-slot may be configured with even-numbered symbols of the slot. To generalize, by using a first method for dividing a slot configured with K number of symbols into N number of sub-slots, (K mod N) number of sub-slots may be configured with floor(K/N)+1 number of consecutive symbols, and N−(K mod N) number of sub-slots may be configured with floor(K/N) number of consecutive symbols. Among N number of sub-slots, (K mod N) number of sub-slots having one more symbol may be positioned at a front of the slot, and N−(K mod N) number of sub-slots having one less symbol may be positioned at a rear of the slot. Among N number of sub-slots, N−(K mod N) number of sub-slots having one less symbol may be positioned at a front of the slot, and (K mod N) number of sub-slots having one more symbol may be positioned at a rear of the slot. Among N number of sub-slots, (K mod N) number of sub-slots having one more symbol and N−(K mod N) number of sub-slots having one less symbol may be alternately positioned. To generalize, by using a second method for dividing a slot configured with K number of symbols into N number of sub-slots, an n-th sub-slot may be configured with floor(K/N)*i+n-th symbols (i=0, 1, . . . ).

As another method, the UE may divide sub-slots through time domain resource assignment information of a configured PDSCH. For example, sub-slots may be divided according to the order of a position of a last symbol of a PDSCH in the time domain resource assignment information of a PDSCH. Up to a last symbol of last symbols of A number of PDSCHs that are foremost in order may be divided as a first sub-slot. Continuously, the remainder may be divided using the above scheme.

According to another method, the UE may divide sub-slots through information of symbols occupied by a configured PUCCH. For example, sub-slots may be divided according to the order of a position of a last symbol of a PUCCH in the information of symbols occupied by a PUCCH. Up to a last symbol of last symbols of A number of PUCCHs that are foremost in order may be divided as a first sub-slot. Continuously, the remainder may be divided using the above scheme.

Another problem to be solved by the present invention relates to a method for generating a semi-static HARQ-ACK codebook when K1 granularity is configured as a sub-slot. A problem to be solved more specifically is as below.

Figure 20:
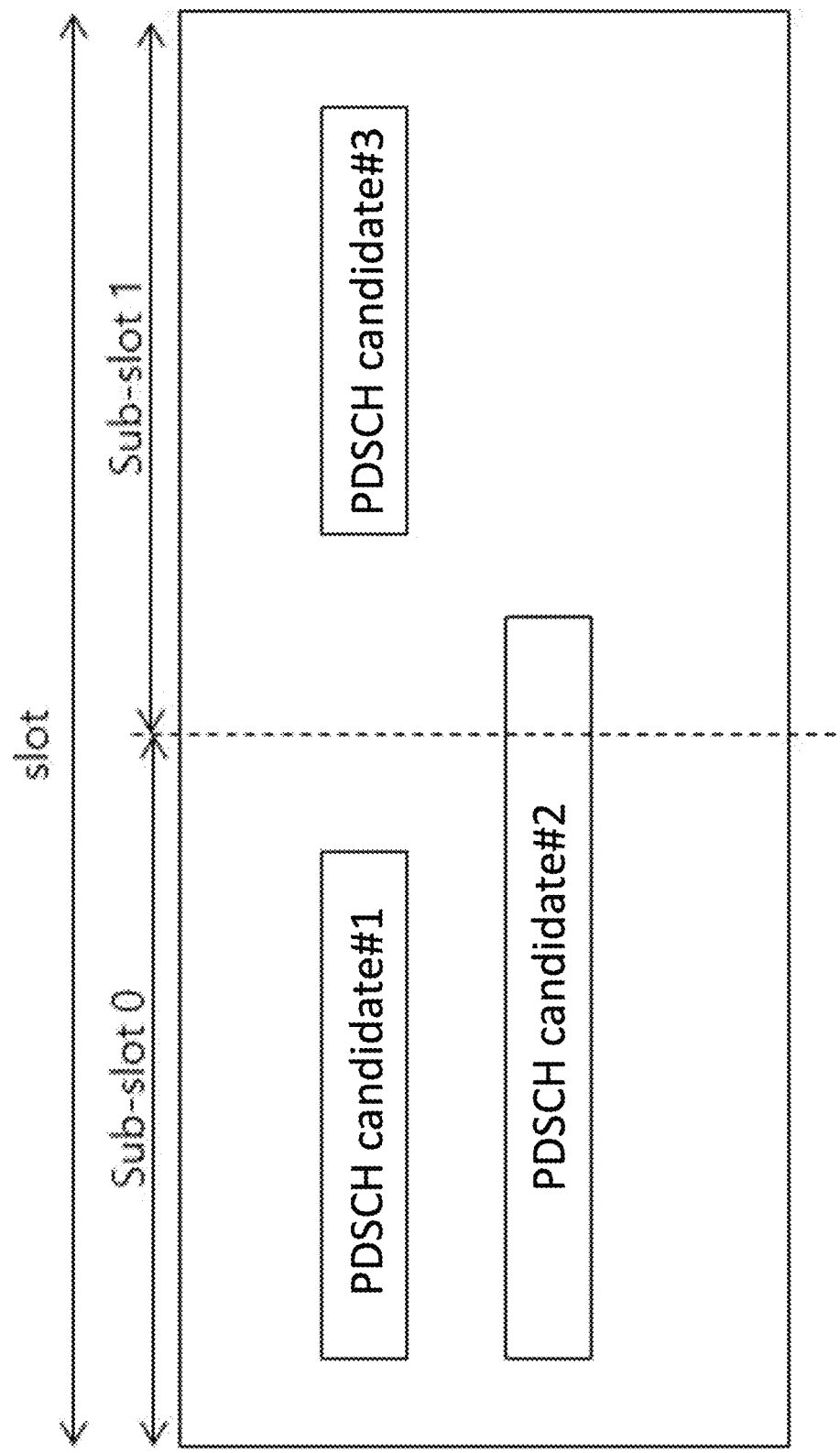
FIG. 20 is a diagram showing that PDSCH candidates are configured in a slot.

FIG. 20 is a diagram illustrating that PDSCH candidates are configured for a slot.

Referring to FIG. 20, it is assumed that three PDSCH candidates are present in one slot. PDSCH candidate #1 is included in a first sub-slot (here, whether a PDSCH candidate is included is determined according to whether a last symbol of the PDSCH candidate is included). PDSCH candidate #2 and PDSCH candidate #3 are included in a second sub-slot. Furthermore, PDSCH candidate #1 and PDSCH candidate #2 overlap in the same symbol, and PDSCH candidate #3 does not overlap other PDSCH candidates. When only one PDSCH can be received in the same symbol, the number of PDSCH candidates that one UE can simultaneously receive in the corresponding slot is at most two. For example, the cases that can be received are {PDSCH candidate #1}, {PDSCH candidate #2}, {PDSCH candidate #3} {PDSCH candidate #1, PDSCH candidate #3}, and {PDSCH candidate #2, PDSCH candidate #3}. On the basis of this, the number of HARQ-ACK bits that the UE should include in a semi-static HARQ-ACK codebook for PDSCH candidates of the corresponding slot is two. (Here, it is assumed that one PDSCH candidate transmits 1-bit HARQ-ACK) When the granularity of K1 is given as half-slot, generation of a semi-static HARQ-ACK codebook for each half-slot is described below. Since a combination of PDSCHs that can be received in a first half-slot is {PDSCH candidate #1}, up to one PDSCH can be received. Therefore, for this half-slot, 1-bit HARQ-ACK should be included in a semi-static HARQ-ACK codebook. Since a combination of PDSCHs that can be received in a second half-slot is {PDSCH candidate #2}, {PDSCH candidate #3}, and {PDSCH candidate #2, PDSCH candidate #3}, up to two PDSCHs can be received. Therefore, for this half-slot, 2-bit HARQ-ACK should be included in a semi-static HARQ-ACK codebook. Therefore, for one slot, HARQ-ACK of total 3 bits is included in a semi-static HARQ-ACK codebook. It may be understood that unnecessary 1 bit overhead occurs compared to the above case where the maximum number of PDSCHs that can be transmitted in one slot is two and 2-bit HARQ-ACK is included in a semi-static HARQ-ACK codebook. The present invention proposes a method for reducing such overhead.

As an embodiment of the present invention, when the K1 granularity is a sub-slot, the UE generates a semi-static HARQ-ACK codebook by combining all sub-slots included in one slot and using PDSCH candidates included in the sub-slots. A semi-static HARQ-ACK codebook to be transmitted in sub-slot n may be generated as below.

Figure 21:
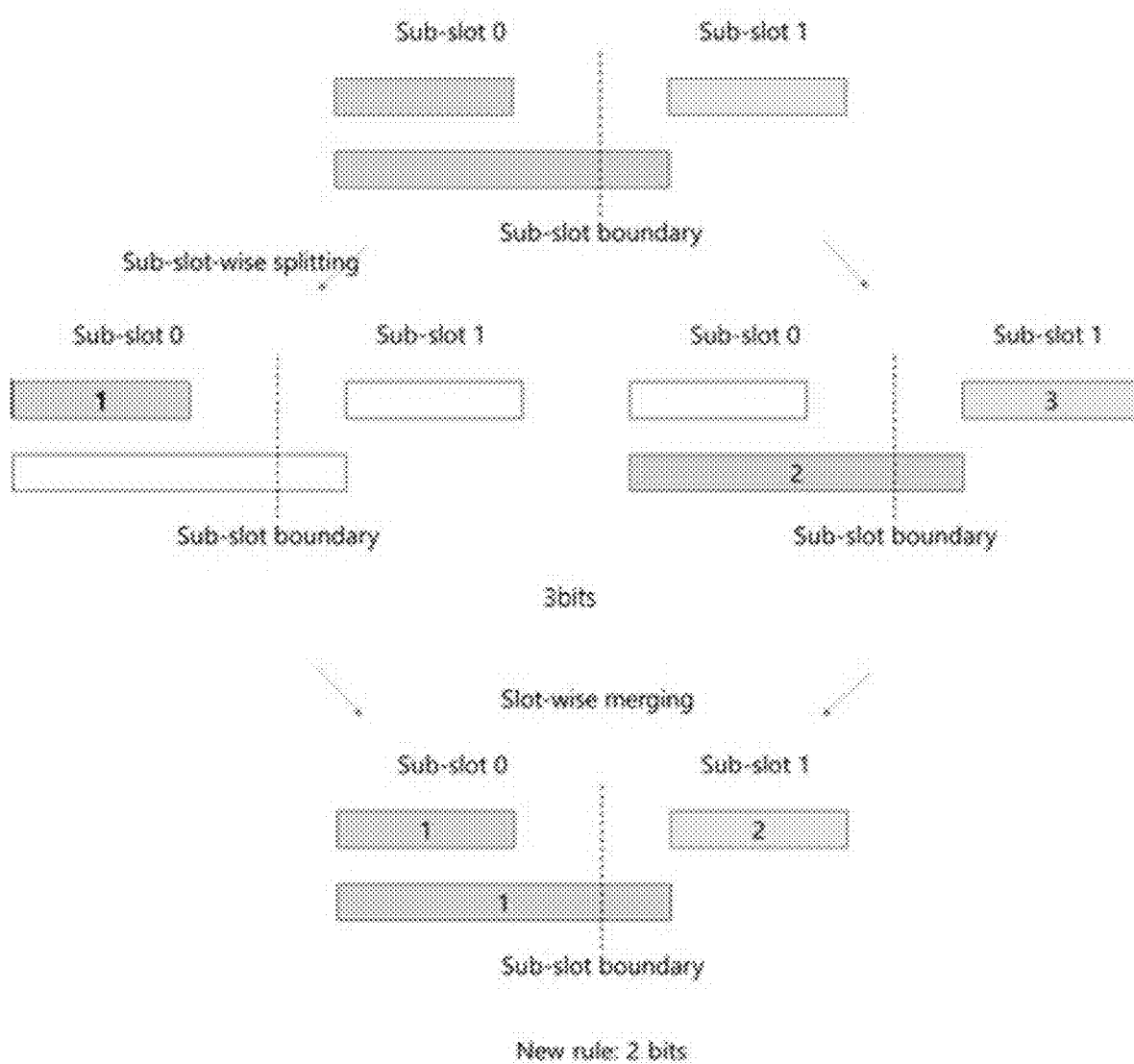
FIG. 21 is a diagram illustrating a process of excluding overlapping PDSCH candidates according to an embodiment of the present invention.

FIG. 21 is a diagram illustrating a process of excluding an overlapping PDSCH candidate according to an embodiment of the present invention.

Referring to FIG. 21, 1) a set of K1 values that may be indicated is referred to as K1_set. A largest K1 value is taken from K1_set. This is referred to as K1_max. An index of a slot in which a sub-slot corresponding to n−K1_max is included is referred to as X. N subslot number of sub-slots are configured in one slot, and X is such that X=floor((n−K1_max)/N_subslot). K1 values indicating a sub-slot included in slot X are taken from K1_set. That is, when an element of the K1_set is referred to as K1 value, all K1 value satisfying X=floor((n−K1 value)/N_subslot) are taken. A set of K1 values (including K1_max) taken during the above process is referred to as K1_max_set. The taken K1 values are excluded from K1_set.

2) A set of PDSCH candidates that may be received in a slot is referred to as R. If a last sub-slot among sub-slots overlapping with a DL slot of a PDSCH candidate included in the set R is included in sub-slots included in K1_max set, the PDSCH candidate is kept in the set R, or otherwise the PDSCH candidate is excluded from the set R. Furthermore, if a symbol of a PDSCH candidate included in the set R overlaps with a symbol configured as an uplink in a semi-static UL/DL configuration, the PDSCH candidate is excluded from the set R.

3) The UE performs the following steps A and B on PDSCH candidates included in R.

A. A new 1 bit is allocated to a PDSCH candidate having a foremost last symbol. Furthermore, if there is a PDSCH candidate overlapping, in terms of at least one symbol, with the above PDSCH candidate in the set R, the PDSCH candidate is allocated the same bit position as the PDSCH candidate having a foremost last symbol. The above PDSCH candidates (including the PDSCH candidate having a foremost last symbol) are excluded from the set R.

B. The above step 3-A is repeated until the set R becomes an empty set.

4) The above process of 1), 2), and 3) are repeated until K1_set becomes an empty set.

Another problem of the present invention is to provide a specific design method for a type-1 HARQ-ACK codebook when a sub-slot is configured.

According to an embodiment of the present invention, the UE includes a process of converting a K1 value (hereinafter $K_{1,k}$) configured in sub-slot granularity into K1 value (hereinafter $K_{1,k,slot}$) of slot-level. In more detail, the K1 value of slot-level may be determined as below.

$$K_{1,k,slot} = \lfloor n_U/N \rfloor - \lfloor (n_U - K_{1,k})/N \rfloor$$

Here, $n_U$ denotes an index of a sub-slot in which a PUCCH is transmitted, and N denotes the number of sub-slots in a slot. For example, N is one of values of 2 to 7 when 14 symbols are configured in one slot, and N is one of values of 2 to 7 when 12 symbols are configured in one slot. Here, $\lfloor x \rfloor$ denotes a largest integer among numbers that are equal to or less than x.

Figure 22:
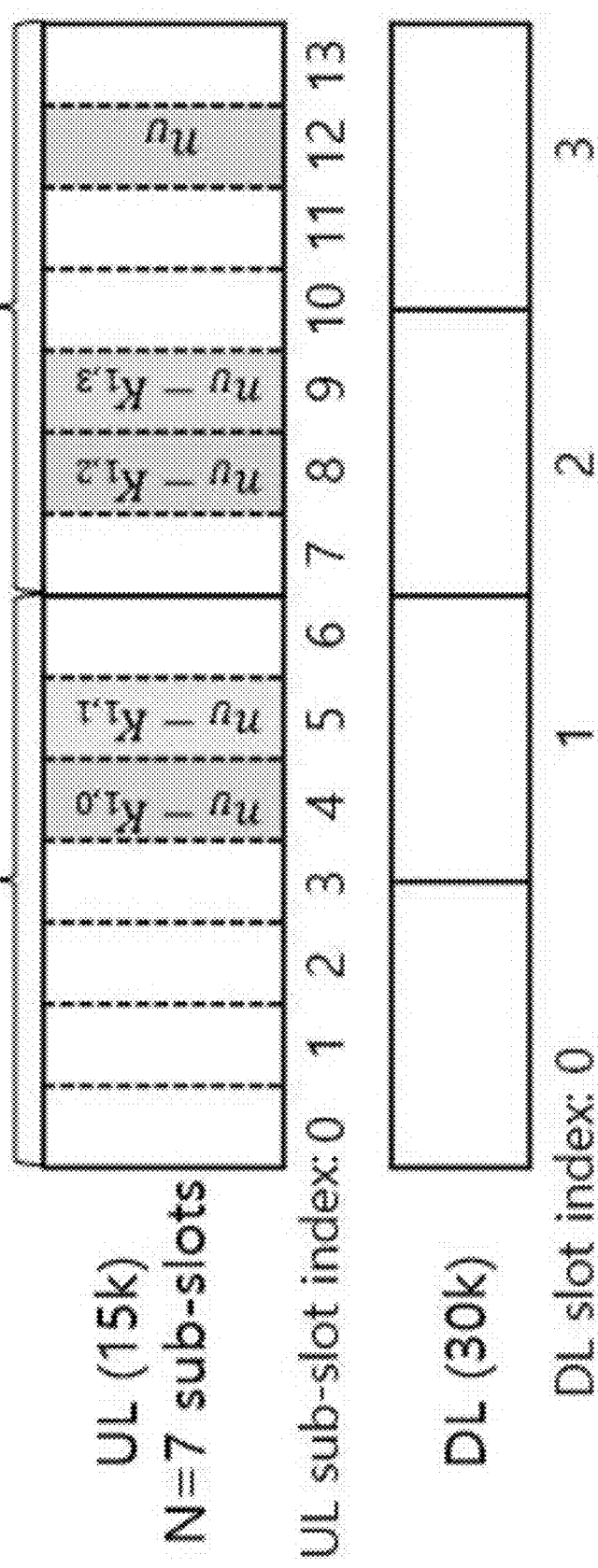
FIG. 22 is a diagram illustrating a procedure of generating type-1 HARQ-ACK according to an embodiment of the present invention.

FIG. 22 is a diagram illustrating a process of generating type-1 HARQ-ACK according to an embodiment of the present invention.

Referring to FIG. 22, a subcarrier spacing of a downlink cell of the UE is 30 kHz, and a subcarrier spacing of an uplink cell is 15 kHz. A slot of an uplink cell is divided into seven sub-slots by combining every two consecutive symbols. That is, N=7. In order to transmit a PUCCH in sub-slot 12 ($n_U=12$) of an uplink cell, the UE should generate a type-1 HARQ-ACK codebook to be included in the PUCCH. K1 values configured in sub-slot granularity are K1={8, 7, 4, 3}.

Referring to FIG. 22, according to an embodiment of the present invention, K1 values configured in sub-slot granularity may be converted into K1 value $K_{1,k,slot}$ of slot granularity. This conversion is performed as below.

$$K_{1,0,slot} = \left\lfloor \frac{n_U}{N} \right\rfloor - \left\lceil \frac{n_U - K_{1,0}}{N} \right\rceil = \left\lfloor \frac{12}{7} \right\rfloor - \left\lceil \frac{12-8}{7} \right\rceil = 1$$

$$K_{1,1,slot} = \left\lfloor \frac{n_U}{N} \right\rfloor - \left\lceil \frac{n_U - K_{1,1}}{N} \right\rceil = \left\lfloor \frac{12}{7} \right\rfloor - \left\lceil \frac{12-7}{7} \right\rceil = 1$$

$$K_{1,2,slot} = \left\lfloor \frac{n_U}{N} \right\rfloor - \left\lceil \frac{n_U - K_{1,2}}{N} \right\rceil = \left\lfloor \frac{12}{7} \right\rfloor - \left\lceil \frac{12-4}{7} \right\rceil = 0$$

$$K_{1,3,slot} = \left\lfloor \frac{n_U}{N} \right\rfloor - \left\lceil \frac{n_U - K_{1,3}}{N} \right\rceil = \left\lfloor \frac{12}{7} \right\rfloor - \left\lceil \frac{12-3}{7} \right\rceil = 0$$

The UE may use the $K_{1,k,slot}$ value obtained in this manner to determine PDSCH candidates in each slot. In more detail, when pseudo-code for generating a type-1 HARQ-ACK codebook is executed in descending order of $K_{1,k}$, $K_{1,k,slot}$ may be obtained according to each $K_{1,k}$ value. The type-1 HARQ-ACK codebook may be generated on the basis of the obtained $K_{1,k,slot}$ value.

The UE may check validity of a PDSCH candidate to determine whether the PDSCH candidate should be included in the type-1 HARQ-ACK codebook according to the previously selected $K_{1,k}$ value. The PDSCH candidate may be included in the type-1 HARQ-ACK codebook if valid, or otherwise the PDSCH candidate may be excluded from the type-1 HARQ-ACK codebook. This process may be determined on the basis of whether a last symbol (ending time) of the PDSCH candidate is included in a specific sub-slot. If the last symbol (ending time) of the PDSCH candidate is determined to be included in a specific sub-slot, the PDSCH candidate is determined to be valid. Otherwise, the PDSCH candidate is determined not to be valid. Here, the specific sub-slot is sub-slot $n_U - K_{1,k}$.

FIG. 23 is a diagram illustrating a process of generating type-1 HARQ-ACK according to an embodiment of the present invention.

Referring to FIG. 23, when $K_{1,0}=8$ is selected, the UE should determine whether a PDSCH candidate of DL slot 1 is valid for sub-slot $n_U - K_{1,0}$=sub-slot 4. In the embodiment of FIG. 23, it is assumed that two PDSCH candidates are configured for the UE. In FIG. 23, a first PDSCH candidate is marked with 'A', and a second PDSCH candidate is marked with 'B'. The UE may determine whether a last symbol (ending time) of each PDSCH candidate is included in sub-slot $n_U - K_{1,0}$=sub-slot 4. If the last symbol of a PDSCH candidate is determined to be included, the PDSCH candidate is determined to be valid. Otherwise, the PDSCH candidate is determined not to be valid. The last symbol (ending time) of the first PDSCH candidate A is included in sub-slot 5 rather than sub-slot $n_U - K_{1,0}$=sub-slot 4. Therefore, the first PDSCH candidate A may be determined not to be valid. The last symbol (ending time) of the second PDSCH candidate B is included in sub-slot $n_U - K_{1,0}$=sub-slot 4. Therefore, the second PDSCH candidate B may be determined to be valid.

Referring to FIG. 23, when $K_{1,1}=7$ is selected, the UE should determine whether a PDSCH candidate of DL slot 1 is valid for sub-slot $n_U - K_{1,1}$=sub-slot 5. The UE may determine whether a last symbol (ending time) of each PDSCH candidate is included in sub-slot $n_U - K_{1,1}$=sub-slot 5. If the last symbol of a PDSCH candidate is determined to be included, the PDSCH candidate is determined to be valid. Otherwise, the PDSCH candidate is determined not to be valid. The last symbol (ending time) of the first PDSCH candidate A is included in sub-slot $n_U - K_{1,1}$=sub-slot 5. Therefore, the first PDSCH candidate A may be determined to be valid. The last symbol (ending time) of the second PDSCH candidate B is included in sub-slot 4 rather than sub-slot $n_U - K_{1,1}$=sub-slot 5. Therefore, the second PDSCH candidate B may be determined not to be valid.

Referring to FIG. 23, when $K_{1,2}=4$ is selected, the UE should determine whether a PDSCH candidate of DL slot 2 is valid for sub-slot $n_U - K_{1,2}$=sub-slot 8. The UE may determine whether a last symbol (ending time) of each PDSCH candidate is included in sub-slot $n_U - K_{1,2}$=sub-slot 8. If the last symbol of a PDSCH candidate is determined to be included, the PDSCH candidate is determined to be valid. Otherwise, the PDSCH candidate is determined not to be valid. The last symbol (ending time) of the first PDSCH candidate A is included in sub-slot $n_U - K_{1,2}$=sub-slot 8. Therefore, the first PDSCH candidate A may be determined to be valid. The last symbol (ending time) of the second PDSCH candidate B is included in sub-slot $n_U - K_{1,2}$=sub-slot 8. Therefore, the second PDSCH candidate B may be determined to be valid.

Referring to FIG. 23, when $K_{1,3}=3$ is selected, the UE should determine whether a PDSCH candidate of DL slot 2 is valid for sub-slot $n_U$-$K_{1,3}$=sub-slot 9. The UE may determine whether a last symbol (ending time) of each PDSCH candidate is included in sub-slot $n_U$-$K_{1,3}$=sub-slot 9. If the last symbol of a PDSCH candidate is determined to be included, the PDSCH candidate is determined to be valid. Otherwise, the PDSCH candidate is determined not to be valid. The last symbol (ending time) of the first PDSCH candidate A is included in sub-slot 8 rather than sub-slot $n_U$-$K_{1,3}$=sub-slot 9. Therefore, the first PDSCH candidate A may be determined not to be valid. The last symbol (ending time) of the second PDSCH candidate B is included in sub-slot 8 rather than sub-slot $n_U$-$K_{1,3}$=sub-slot 9. Therefore, the second PDSCH candidate B may be determined not to be valid.

In more detail, validity is established when the following is satisfied.

<Validity Condition> if subslotLengthForPUCCH-r16 is provided and sub-slot $n_U$-$K_{1,K}$ is the last UL sub-slot overlapping with the DL slot of the PDSCH time resource derived by row r in slot $\lfloor(n_{U,slot}-K_{1,k,slot})\cdot 2^{\mu DL-\mu UL}\rfloor+n_D$ Here, $n_{U,slot}$ is an index of a slot corresponding to sub-slot $n_U$, and may be obtained as $n_{U,slot}=\lfloor n_U/N\rfloor$.

Validity is not established when the following is satisfied.

<Nonvalidity Condition> if subslotLengthForPUCCH-r16 is provided and sub-slot $n_U$-$K_{1,K}$ is not the last UL sub-slot overlapping with the DL slot of the PDSCH time resource derived by row r in slot $\lfloor(n_{U,slot}-K_{1,k,slot})\cdot 2^{\mu DL-\mu UL}\rfloor+n_D$ Through this correction, pseudo-code for generating type-1 HARQ-ACK of existing Rel-15/16 may be minimally corrected and applied to a sub-slot configuration. More specific first pseudo-code is as below. For reference, here, 3GPP standard document TS38.213 may be referenced with regard to all variables.

<First Pseudo-Code>

TABLE 5

Set j = 0-index of occasion for candidate PDSCH reception or SPS PDSCH release
Set B = Ø
Set $M_{A,c}$ = Ø
Set $\ell(K_1)$ to the cardinality of set $K_1$
Set k = 0-index of slot timing values $K_{1,k}$, in descending order of the slot timing values, in set $K_1$ for serving cell $c$
Set N to # of sub-slots in a slot if subslotLengthForPUCCH-r16h provided. Otherwise N = 1.
Set $n_{U,slot}$ = $\lfloor n_U/N\rfloor$
If a UE is not provided ca-SlotOffset for any serving cell of PDSCH receptions and for the serving cell of corresponding PUCCH transmission with HARQ-ACK information
while k < $\ell(K_1)$
   $K_{1,k,slot}$ = $\lfloor n_U/N\rfloor$ - $\lfloor n_U-K_{1,k})/N\rfloor$, (Note: change from sub-slot K1 value to slot K1 value)
   if mod($n_{U,slot}$ - $K_{1,k,slot}$ + 1, max($2^{\mu UL-\mu DL}$, 1)) = 0
     Set $n_D$ = 0-index of a DL slot within an UL slot
     while $n_D$ < max($2^{\mu DL-\mu UL}$,1)
       Set R to the set of rows
       Set $\ell(R)$ to the cardinality of R
       Set r = 0-index of row in set R
       if slot $n_U$ starts at a same time as or after a slot for an active DL BWP change on serving cell
       $c$ or an active UL BWP change on the PCell and slot $\lfloor n_{U,slot}$ - $K_{1,k,slot}\rfloor$ · $2^{\mu DL-\mu UL}$ is before the
       slot for the active DL BWP change on serving cell $c$ or the active UL BWP change on the PCell
          $n_D$ = $n_D$ + 1;
       else
         while r < $\ell(R)$
           if subslotLengthForPUCCH-r16 is provided and sub-slot $n_U$ -$K_{1,k}$ is not the last UL sub-
           slot overlapping with the DL slot of the PDSCH time resource derived by row r in slot
           $\lfloor n_{U,slot}$ - $K_{1,k,slot})$ · $2^{\mu DL-\mu UL}\rfloor$ + $n_D$
             R = R\r;
         elseif the UE is provided tdd-UL-DL-ConfigurationCommon, or tdd-UL-DL-
         ConfigurationDedicated and, for each slot from slot $\lfloor n_{U,slot}$ -$K_{1,k,slot})$ · $2^{\mu DL-\mu UL}\rfloor$ + $n_D$ -
         $N_{PDSCH}^{repeat,max}$ + 1 to slot $\lfloor n_{U,slot}$ - $K_{1,k,slot})$ · $2^{\mu DL-\mu UL}\rfloor$ + $n_D$, at least one symbol of the PDSCH
         time resource derived by row r is configured as UL,
           R = R\r;
         else
           r = r + 1;
         end if
       end while
       if the UE does not indicate a capability to receive more than one unicast PDSCH per slot and
       R ≠ Ø,
         $M_{A,c}$ = $M_{A,c}$ ∪ j;
         j = j + 1;
       else
         Set $\ell(R)$ to the cardinality of R
         Set m to the smallest last OFDM symbol index, as determined by the SLIV, among all
           rows of R
         while R ≠ Ø
           Set r = 0
           while r < $\ell(R)$
             if S ≤ m for start OFDM symbol index S for row r
               $b_{r,k,n_D}$ = j;-index of occasion for candidate PDSCH reception or SPS PDSCH
                 release associated with row r
               R = R\r;
               B = B∪$b_{r,k,n_D}$;
             else
               r = r + 1;

TABLE 5-continued

```
                end if
              end while
              M_{A,c} = M_{A,c} ∪ j;
              j = j + 1;
              Set m to the smallest last OFDM symbol index among all rows of R ;
            end while
          end if
          n_D = n_D + 1;
        end if
      end while
    end if
    k = k + 1;
  end while
  else
    while k < ℓ(K_1)
```

$K_{1,k,slot} = \lfloor n_U/N \rfloor - \lfloor n_U - K_{1,k} \rfloor/N \rfloor$, (Note: change from sub-slot K1 value to slot K1 value)

if $\mod\left(n_{U,slot} - K_{1,k,slot} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0$ Set $n_D = 0$-index of a DL slot within an UL slot
while $n_D < \max(2^{\mu_{DL}-\mu_{UL}}, 1)$
  Set R to the set of rows
  Set $\ell(R)$ to the cardinality of R
  Set $r = 0$-index of row in set R
if slot $n_U$ starts at a same time as or after a slot for an active DL BWP change on serving cell $c$ or an active UL BWP change on the PCell and slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$ is before the slot for the active DL BWP change on serving cell $c$ or the active UL BWP change on the PCell
      $n_D = n_D + 1$;
    else
      while $r < \ell(R)$
        if subslotLengthForPUCCH-r16 is provided and sub-slot $n_U - K_{1,k}$ is not the last UL sub-slot overlapping with the DL slot of the PDSCH time resource derived by row r in slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$ R=R\r;
        elseif the UE is provided tdd-UL-DL-ConfiguratlonCommon, or tdd-UL-DL-ConfigurationDedicated and, for each slot from slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D - N^{repeat,max}_{PDSCH} + 1$ to slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$, at least one symbol of the PDSCH time resource derived by row r is configured as UL,
          R=R\r;
        else
          r = r + 1;
        end if
      end while
      if the UE does not indicate a capability to receive more than one unicast PDSCH per slot and
      $R \neq \emptyset$,
        $M_{A,c} = M_{A,c} \cup j$;
        j = j + 1;
      else
        Set $\ell(R)$ to the cardinality of R
        Set m to the smallest last OFDM symbol index, as determined by the SLIV, among all
          rows of R
        while $R \neq \emptyset$
          Set r = 0
          while $r < \ell(R)$
            if $S \leq m$ for start OFDM symbol index S for row r
              $b_{r,k,n_D} = j$;-index of occasion for candidate PDSCH reception or SPS PDSCH
                release associated with row r
              R = R\r;
              $B = B \cup b_{r,k,n_D}$;
            else TABLE 5-continued

```
                    r = r + 1;
                end if
            end while
            M_{A,c} = M_{A,c} ∪ j;
            j = j + 1;
            Set m to the smallest last OFDM symbol index among all rows of R ;
        end while
    end if
    n_D = n_D + 1;
  end if
end while
end if
k = k + 1;
end while
end if
```

The above pseudo code may be summarized as the following steps according to one $K_{1,k}$ value.

As a first step, the UE converts the above one $K_{1,k}$ value expressed in sub-slot granularity into $K_{1,k,slot}$ expressed in slot-granularity. The above step is given as $K_{1,k,slot} = \lfloor n_U/N \rfloor - \lfloor (n_U - K_{1,k})/N \rfloor$ in the above pseudo-code.

As a second step, the UE may check validity on the basis of a last symbol of each PDSCH candidate belonging to a SLIV table. Here, if the last symbol of the PDSCH candidate is included in corresponding sub-slot $n_U - K_{1,k}$, the PDSCH candidate may be determined to be valid. If the PDSCH candidate is determined not to be valid, the PDSCH candidate is excluded during a process of generating a type-1 HARQ-ACK codebook. The above step is given as below in the above pseudo-code.

if subslotLengthForPUCCH-r16 is provided and sub-slot $n_U - K_{1,K}$ is not the last UL sub-slot overlapping with the DL slot of the PDSCH time resource derived by row r in slot $\lfloor (n_{U,slot} - K_{1,k,slot}) \cdot 2^{\mu_{DL} - \mu_{UL}} \rfloor + n_D$ =R\r;

According to the above two steps, valid PDSCH candidates may be included in the set R. Thereafter, a type-1 HARQ-ACK codebook may be generated using the valid PDSCH candidates of the set R.

When a type-1 HARQ-ACK codebook is generated in this manner, the following problem may occur.

The UE may have various capabilities. When the UE has a specific capability, the UE may notify this capability to the base station. This is referred to as a capability report. The base station may determine transmission and reception methods to be used for the UE according to the capability report obtained from the UE.

If the UE has no specific capability, the UE may receive one PDSCH in one DL slot. In other words, the UE does not expect that reception of two or more PDSCHs will be indicated or configured for one DL slot. Accordingly, a type-1 HARQ-ACK codebook generated by the UE includes, for one DL slot, only HARQ-ACK of one PDSCH received in one DL slot.

The UE may have a capability to receive two or more PDSCHs in one DL slot. In this case, a type-1 HARQ-ACK codebook generated by the UE includes, for one DL slot, HARQ-ACK of at least one PDSCH received in one DL slot.

As described above, a type-1 HARQ-ACK codebook generation method may vary according to the capability. This is described in pseudo-code as below.

if the UE does not indicate a capability to receive mare than one unicast PDSCH per slot and R≠∅,
   $M_{A,c} = M_{A,c} ∪ j$;
   j=j+1;
else
   [ . . . ]

It is assumed that two or more values are given to the UE as $K_{1,k}$ values. When transmitting a PUCCH including a type-1 HARQ-ACK codebook in sub-slot $n_U$, a type-1 HARQ-ACK codebook is generated as below. Sub-slot $n_U - K_{1,k1}$ may be obtained according to one $K_{1,k}$ value (here referred to as $K_{1,k1}$), and a DL slot corresponding to this sub-slot $n_U - K_{1,k1}$ may be obtained. This DL slot is referred to as a first DL slot. Sub-slot $K_{1,k2}$ may be obtained according to another $K_{1,k}$ value (here referred to as $K_{1,k2}$), and a DL slot corresponding to this sub-slot $n_U - K_{1,k2}$ may be obtained. This DL slot is referred to as a second DL. The first DL slot and the second DL slot may be the same or different from each other. Here, it is assumed that the first DL slot and the second DL slot are the same. For reference, here, the DL slot corresponding to sub-slot $n_U - K_{1,k1}$ may be a DL slot overlapping with the sub-slot $n_U - K_{1,k1}$. Here, the DL slot corresponding to sub-slot $n_U - K_{1,k2}$ may be a DL slot overlapping with the sub-slot $n_U - K_{1,k2}$.

It is assumed that the UE has no specific capability. According to first pseudo-code, if there is at least one valid PDSCH candidate in a first DL slot corresponding to one $K_{1,k}$ value (here referred to as $K_{1,k1}$) in this example, the UE includes, in a type-1 HARQ-ACK codebook, one HARQ-ACK for PDSCH candidates of the first DL slot. As mentioned above, since the UE may only receive up to one PDSCH even if there are multiple PDSCH candidates in a first DL slot, one HARQ-ACK is included in a type-1 HARQ-ACK codebook. If there is at least one valid PDSCH candidate in a second DL slot corresponding to another $K_{1,k}$ value (here referred to as $K_{1,k2}$), one HARQ-ACK for PDSCH candidates of the second DL slot is included in a type-1 HARQ-ACK codebook. A problem is that the first DL slot and the second DL slot may be the same DL slot as in the above example. In this case, according to first pseudo-code, the UE includes two HARQ-ACKs in one DL slot (either first DL slot or second DL slot) in a type-1 HARQ-ACK codebook. As described above, the UE may include only one HARQ-ACK on the assumption that the UE can only receive up to one PDSCH in one DL slot; however, since more HARQ-ACKs, i.e., two HARQ-ACKs, are included, a problem of an increase in the size of a type-1 HARQ-ACK codebook occurs.

Referring to FIG. 23, a DL slot corresponding to $K_{1,0}$ is DL slot 1. In DL slot 1, the second PDSCH candidate B is a valid PDSCH candidate. Therefore, the type-1 HARQ-ACK codebook includes one HARQ-ACK for the above DL slot. Next, a DL slot corresponding to $K_{1,1}$ is DL slot 1. In DL slot 1, the first PDSCH candidate A is a valid PDSCH candidate. Therefore, the type-1 HARQ-ACK codebook includes one HARQ-ACK for the above DL slot. Accordingly, the type-1 HARQ-ACK codebook includes at least two HARQ-ACKs for DL slot 1.

The present invention proposes a method for solving this issue.

According to an embodiment of the present invention, if there is at least one valid PDSCH candidate in a DL slot corresponding to one $K_{1,k}$ value, the UE includes one HARQ-ACK for PDSCH candidates of the DL slot in a type-1 HARQ-ACK codebook. Here, the UE may check whether HARQ-ACK for a DL slot is included in the type-1 HARQ-ACK codebook so as to determine whether or not to include the HARQ-ACK. That is, if the HARQ-ACK for a DL slot is already included in the type-1 HARQ-ACK codebook, the UE does not include the HARQ-ACK in the type-1 HARQ-ACK codebook since additional HARQ-ACK for the DL slot is not necessary. On the contrary, if the HARQ-ACK for a DL slot is not included in the type-1 HARQ-ACK codebook, the UE includes the HARQ-ACK in the type-1 HARQ-ACK codebook since HARQ-ACK for the DL slot is necessary.

In this manner, the UE may include only one HARQ-ACK in the type-1 HARQ-ACK codebook for one DL slot. When the UE receives a PDSCH in a DL slot, HARQ-ACK of the PDSCH may be transmitted at a bit position corresponding to a received DL slot in the type-1 HARQ-ACK codebook.

Referring to FIG. 23, a DL slot corresponding to $K_{1,0}$ is DL slot 1. In DL slot 1, the second PDSCH candidate B is a valid PDSCH candidate. Therefore, the type-1 HARQ-ACK codebook includes one HARQ-ACK for DL slot 1. Next, a DL slot corresponding to $K_{1,1}$ is DL slot 1. In DL slot 1, the first PDSCH candidate A is a valid PDSCH candidate. Here, although a valid PDSCH candidate is present, HARQ-ACK for the corresponding DL slot is already included and is thus not additionally included. If the UE receives the first PDSCH candidate A in DL slot 1, the UE may transmit HARQ-ACK of the first PDSCH candidate A at a position of HARQ-ACK included for DL slot 1. Furthermore, if the UE receives the second PDSCH candidate B in DL slot 1, the UE may transmit HARQ-ACK of the first PDSCH candidate A at a position of HARQ-ACK included for DL slot 1.

According to the above first pseudo-code, one K1 value is taken from one K1 set, a valid PDSCH candidate is determined according to the K1 value, and HARQ-ACK bit positions are determined between valid PDSCH candidates. Here, the granularity of the K1 value is sub-slot. That is, a valid PDSCH candidate is determined within one sub-slot, and HARQ-ACK bit positions are determined between valid PDSCH candidates. However, since a PDSCH is scheduled in units of slots rather than sub-slot, it is inefficient to generate a type-1 HARQ-ACK codebook for each sub-slot. In order to resolve this issue, it is necessary to generate a type-1 HARQ-ACK codebook for each slot.

For example, referring to FIG. 23, the UE obtains corresponding DL slot 1 for $K_{1,0}=8$, and checks validity of the two PDSCH candidates A and B of DL slot 1. Thereafter, the UE obtains corresponding DL slot 1 for $K_{1,1}=7$, and checks validity of the two PDSCH candidates A and B of DL slot 1. That is, an operation performed for $K_{1,0}$ is redundantly performed for $K_{1,1}$.

In order to avoid such a redundant operation, it is desirable for the UE to determine validity of a PDSCH candidate by converting $K_{1,k}$ into $K_{1,k,slot}$ and obtaining a DL slot according to the $K_{1,k,slot}$ value rather than to determine validity of a PDSCH candidate by obtaining a DL slot for each sub-slot corresponding to $K_{1,k}$.

According to an embodiment of the present invention, the UE includes a process of converting a $K_1$ value (hereinafter $K_{1,k}$) configured in sub-slot granularity into $K_1$ value (hereinafter $K_{1,k,slot}$) of slot-level. In more detail, the $K_1$ value of slot-level may be determined as below.

$$K_{1,k,slot} = \lfloor n_U/N \rfloor - \lfloor (n_U - K_{1,k})/N \rfloor$$

A set of the $K_{1,k,slot}$ values is referred to as $K_{1,slot}$. For reference, two or more $K_{1,k}$ may have the same $K_{1,k,slot}$ value. In other words, a plurality of $K_{1,k,slot}$ values may correspond to one $K_{1,k,slot}$ value of the $K_{1,slot}$ set.

Referring back to FIG. 22, $K_{1,k,slot}$ may be obtained as below.

$$K_{1,0,slot} = \left\lfloor \frac{n_U}{N} \right\rfloor - \left\lceil \frac{n_U - K_{1,0}}{N} \right\rceil = \left\lfloor \frac{12}{7} \right\rfloor - \left\lceil \frac{12-8}{7} \right\rceil = 1$$

$$K_{1,1,slot} = \left\lfloor \frac{n_U}{N} \right\rfloor - \left\lceil \frac{n_U - K_{1,1}}{N} \right\rceil = \left\lfloor \frac{12}{7} \right\rfloor - \left\lceil \frac{12-7}{7} \right\rceil = 1$$

$$K_{1,2,slot} = \left\lfloor \frac{n_U}{N} \right\rfloor - \left\lceil \frac{n_U - K_{1,2}}{N} \right\rceil = \left\lfloor \frac{12}{7} \right\rfloor - \left\lceil \frac{12-4}{7} \right\rceil = 0$$

$$K_{1,3,slot} = \left\lfloor \frac{n_U}{N} \right\rfloor - \left\lceil \frac{n_U - K_{1,3}}{N} \right\rceil = \left\lfloor \frac{12}{7} \right\rfloor - \left\lceil \frac{12-3}{7} \right\rceil = 0$$

Therefore, $K_{1,slot}$ is determined such that $K_{1,slot}=\{1, 0\}$.

The UE may generate a type-1 HARQ-ACK codebook according to a descending order of $K_{1,k,slot}$ values of the $K_{1,slot}$ set. That is, a largest $K_{1,k,slot}$ value may be taken from the $K_{1,slot}$ set to determine a valid PDSCH candidate of a DL slot corresponding to the $K_{1,k,slot}$. Next, a second largest $K_{1,k,slot}$ value may be taken from the $K_{1,slot}$ set to determine a valid PDSCH candidate of a DL slot corresponding to the $K_{1,k,slot}$. This operation may be repeated until a valid PDSCH candidate of a DL slot corresponding to the $K_{1,k,slot}$ is determined by taking a smallest $K_{1,k}$ slot value from the $K_{1,slot}$ set.

The UE may check validity of a PDSCH candidate to determine whether the PDSCH candidate should be included in the type-1 HARQ-ACK codebook according to the previously selected $K_{1,k,slot}$ value. The PDSCH candidate may be included if valid, or otherwise the PDSCH candidate may be excluded. This process may be determined on the basis of whether a last symbol (ending time) of the PDSCH candidate is included in specific sub-slots. Here, specific slots are described below. Sub-slot $n_U - K_{1,k1}$, sub-slot $n_U - K_{1,k2}$, . . . , when $K_{1,k}$ values corresponding to a $K_{1,k,slot}$ value are defined as $K_{1,k1}$, $K_{1,k2}$, . . . .

Referring to FIG. 23, when $K_{1,0,slot}=1$ is selected, the UE should determine whether a PDSCH candidate of DL slot 1 is valid for sub-slot $n_U - K_{1,0}$=sub-slot 4 and sub-slot $n_U - K_{1,1}$=sub-slot 5. For reference, $K_{1,0,slot}=1$ corresponds to $K_{1,0}=8$ and $K_{1,1}=7$. In the embodiment of FIG. 23, it is assumed that two PDSCH candidates are configured for the UE. In FIG. 23, a first PDSCH candidate is marked with 'A', and a second PDSCH candidate is marked with 'B'. The UE may determine whether a last symbol (ending time) of each PDSCH candidate is included in sub-slot $n_U - K_{1,0}$=sub-slot 4 or sub-slot $n_U - K_{1,1}$=sub-slot 5. If the last symbol of a PDSCH candidate is determined to be included, the PDSCH candidate is determined to be valid. Otherwise, the PDSCH candidate is determined not to be valid. The last symbol (ending time) of the first PDSCH candidate A is included in sub-slot $n_U-K_{1,1}$=sub-slot 5. Therefore, the first PDSCH candidate A may be determined to be valid. The last symbol (ending time) of the second PDSCH candidate B is included in sub-slot $n_U-K_{1,0}$=sub-slot 4. Therefore, the second PDSCH candidate B may be determined to be valid.

Referring to FIG. 23, when $K_{1,1,slot}$=0 is selected, the UE should determine whether a PDSCH candidate of DL slot 2 is valid for sub-slot $n_U-K_{1,2}$=sub-slot 8 and sub-slot $n_U-K_{1,3}$=sub-slot 9. For reference, $K_{1,1,slot}$=0 corresponds to $K_{1,2}$=4 and $K_{1,3}$=3. The UE may determine whether a last symbol (ending time) of each PDSCH candidate is included in sub-slot $n_U-K_{1,2}$=sub-slot 8 or sub-slot $n_U-K_{1,3}$=sub-slot 9. If the last symbol of a PDSCH candidate is determined to be included, the PDSCH candidate is determined to be valid. Otherwise, the PDSCH candidate is determined not to be valid. The last symbol (ending time) of the first PDSCH candidate A is included in sub-slot $n_U-K_{1,2}$=sub-slot 8. Therefore, the first PDSCH candidate A may be determined to be valid. The last symbol (ending time) of the second PDSCH candidate B is included in sub-slot $n_U-K_{1,2}$=sub-slot 8. Therefore, the second PDSCH candidate B may be determined to be valid.

In more detail, validity is established when the following is satisfied.
<Validity Condition>
if subslotLengthForPUCCH-r16 is provided and at least one of sub-slot $n_U-K_{1,K}$ is the last UL sub-slot overlapping with the DL slot of the PDSCH time resource derived by row r in slot $\lfloor(n_{U,slot}-K_{1,k,slot})\cdot 2^{\mu DL-\mu UL}\rfloor+n_D$, where $K_{1,k}$ are associated to $K_{1,K,slot}$.

Here, $n_{U,slot}$ is an index of a slot corresponding to sub-slot $n_U$, and may be obtained as $n_{U,slot}=\lfloor n_U/N\rfloor$.

Validity is not established when the following is satisfied.
<Nonvalidity Condition>
if subslotLengthForPUCCH-r16 is provided and all of sub-slot $n_U-K_{1,K}$ is not the last UL sub-slot overlapping with the DL slot of the PDSCH time resource derived by row r in slot $\lfloor(n_{U,slot}-K_{1,k,slot})\cdot 2^{\mu DL-\mu UL}\rfloor+n_D$, where $K_{1,k}$ are associated to $K_{1,K,slot}$.

If the last symbol of a PDSCH candidate is not included in all sub-slots, this is not valid.

Through this correction, pseudo-code for generating type-1 HARQ-ACK of existing Rel-15/16 may be minimally corrected and applied to a sub-slot configuration. More specific pseudo-code is as below. For reference, here, 3GPP standard document TS38.213 may be referenced with regard to all variables.
<Second Pseudo-Code>

TABLE 6

Set j = 0-index of occasion for candidate PDSCH reception or SPS PDSCH release
Set B = Ø
Set $M_{A,c}$ = Ø
Set $\ell(K_1)$ to the cardinality of set $K_1$
Set k = 0-index of slot timing values $K_{1,k}$, in descending order of the slot timing values, in set $K_1$ for serving cell $c$
Set N to # of sub-slots in a slot if subslotLengthForPUCCH-r16h provided. Otherwise N = 1.
Set $K_{1,slot}$ = ø
while k < $\ell(K_1)$
   $K_{1,k,slot} = \lfloor n_U/N\rfloor - \lfloor n_U - K_{1,k})/N\rfloor$, (Note: change from sub-slot K1 value to slot K1 value)
   $K_{1,k,slot} = K_{1,k,slot} \cup \{K_{1,k,slot}\}$
end while
Set $\mathcal{C}(K_{1,k,slot})$ to the cardinality of set $K_{1,k,slot}$
If a UE is not provided ca-SlotOffset for any serving cell of PDSCH receptions and for the serving cell of corresponding PUCCH transmission with HARQ-ACK information
while k < $\mathcal{C}(K_{1,k,slot})$ (Note: slot-level loop, not duplicated sub-slots)
   if mod($n_{U,slot} - K_{1,k,slot} + 1$, max($2^{\mu DL-\mu UL}$, 1)) = 0
     Set $n_D$ = 0-index of a DL slot within an UL slot
     while $n_D$ < max($2^{\mu UL-\mu DL}$,1)
       Set R to the set of rows
        Set $\ell(R)$ to the cardinality of R
        Set r = 0-index of row in set R
        if slot $n_U$ starts at a same time as or after a slot for an active DL BWP change on serving cell
        c or an active UL BWP change on the PCell and slot $\lfloor n_{U,slot} - K_{1,k,slot}\rfloor \cdot 2^{\mu DL-\mu UL}\rfloor$ is before the
        slot for the active DL BWP change on serving cell c or the active UL BWP change on the PCell
           $n_D$ = np + 1;
        else
           while r < $\mathcal{C}(R)$
              if subslotLengthForPUCCH-r16 is provided and sub-slot $n_U - K_{1,k}$ is not the last UL sub-
              slot overlapping with the DL slot of the PDSCH time resource derived by row r in slot
              $\lfloor n_{U,slot} - K_{1,k,slot}\rfloor \cdot 2^{\mu UL-\mu DL}\rfloor + n_D$, where $K_{1,k}$ are associated to $K_{1,k,slot}$.
              R = R\r;
            elseif the UE is provided tdd-UL-DL-ConfigurationCommon, or tdd-UL-DL-
            ConfigurationDedicated and, for each slot from slot $\lfloor n_{U,slot} - K_{1,k,slot}\rfloor \cdot 2^{\mu UL-\mu DL}\rfloor + n_D -$
            $N_{PDSCH}^{repeat,max}$ + 1 to slot $\lfloor n_{U,slot} - K_{1,k,slot}\rfloor \cdot 2^{\mu DL-\mu UL}\rfloor + n_D$, at least one symbol of the PDSCH
            time resource derived by row r is configured as UL,
              R = R\r ;
            else
              r = r + 1 ;
            end if
           end while
        if the UE does not indicate a capability to receive more than one unicast PDSCH per slot and
        R ≠ Ø,
           $M_{A,c} = M_{A,c} \cup j$;
        j = j + 1

TABLE 6-continued

```
      else
        Set C(R) to the cardinality of R
        Set m to the smallest last OFDM symbol index, as determined by the SLIV, among all
          rows of R
        while R ≠ ∅
          Set r = 0
          while r < C(R)
            if S ≤ m for start OFDM symbol index S for row r
              b_{r,k,n_D} = j;-index of occasion for candidate PDSCH reception or SPS PDSCH
                release associated with row r
              R = R\r ;
                B = B∪b_{r,k,n_D} ;
              else
                r = r + 1 ;
              end if
            end while
            M_{A,c} = M_{A,c} ∪ j;
            j = j + 1;
            Set m to the smallest last OFDM symbol index among all rows of R ;
          end while
        end if
        n_D = n_D + 1;
      end if
    end while
  end if
  k = k + 1 ;
end while
else
while k < C(K_1)
``` if $\mathrm{mod}\left(n_{U,slot} - K_{1,k,slot} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0$

```
  Set n_D = 0-index of a DL slot within an UL slot
  while n_D < max(2^{μDL−μUL},1)
    Set R to the set of rows
    Set C(R) to the cardinality of R
    Set r = 0-index of row in set R
if slot n_U starts at a same time as or after a slot for an active DL BWP change on serving cell c or
an active UL BWP change on the PCell and slot
```

$\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$ is before the slot for the active DL BWP change on serving cell $c$ or the active UL BWP
change on the PCell
    $n_D = n_D + 1$;
else
  while r < C(R)
    if subslotLengthForPUCCH-r16 is provided and sub-slot $n_U - K_{1,k}$ is not the last UL sub-
    slot overlapping with the DL slot of the PDSCH time resource derived by row r in slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$, where $K_{1,k}$ are associated to $K_{1,k,slot}$.
    R = R\r;
elseif the UE is provided tdd-UL-DL-ConfiguratlonCommon, or tdd-UL-DL-
ConfigurationDedicated and, for each slot from slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D - N^{repeat,max}_{PDSCH} + 1$ to slot $\lfloor (n_{U,slot} - K_{1,k,slot}) \cdot 2^{\mu_{DL}-\mu_{UL}} \rfloor + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{DL}} \right\rfloor + n_D$, at least one symbol of the PDSCH time resource derived by row r is configured as UL,
    R=R\r ;
  else
    r = r + 1 ;
  end if
end while
if the UE does not indicate a capability to receive more than one unicast PDSCH per slot and
R ≠ ∅,
  $M_{A,c} = M_{A,c} ∪ j$;

TABLE 6-continued

```
            j = j + 1;
        else
            Set C(R) to the cardinality of R
            Set m to the smallest last OFDM symbol index, as determined by the SLIV, among all
                rows of R
            while R ≠ Ø
                Set r = 0
                while r < C(R)
                    if S ≤ m for start OFDM symbol index S for row r
                        b_{r,k,n_D} = j ;-index of occasion for candidate PDSCH reception or SPS PDSCH
                            release associated with row r
                        R = R\r;
                        B = B∪b_{r,k,n_D} ;
                    else
                        r = r + 1 ;
                    end if
                end while
                M_{A,c} = M_{A,c} ∪ j;
                j = j + 1;
                Set m to the smallest last OFDM symbol index among all rows of R ;
            end while
        end if
        n_D = n_D + 1;
      end if
    end while
  end if
  k = k + 1;
end while
end if
```

In an NR wireless communication system, the UE may transmit HARQ-ACK information using a semi-static HARQ-ACK codebook. When a semi-static HARQ-ACK codebook is used, the base station may use an RRC signal to configure a length of a HARQ-ACK codebook and indicate for which PDSCH each bit of the HARQ-ACK codebook indicates ACK/NACK. Therefore, it is not necessary for the base station to signal information required for transmitting a HARQ-ACK codebook each time transmission of the HARQ-ACK codebook is necessary. A set of PDSCHs of which ACK/NACK is indicated by a semi-static HARQ-ACK codebook is referred to as a PDSCH candidate set. Hereinafter, a method for a UE to determine a PDSCH candidate set will be described with reference to FIG. 24.

The UE determines a PDSCH candidate set on the basis of information signaled from the base station. Here, the information signaled from the base station may include K1. K1 indicates a difference between a last slot in which a PDSCH is received or scheduled and a slot in which a PUCCH is transmitted. Fallback DCI (DCI format 1_0) may indicate a K1 value as one of 1, 2, 3, 4, 5, 6, 7, and 8. Non-fallback DCI (DCI format 1_1 to 1_2) may indicate, as the K1 value, one of up to eight values configured by an RRC signal. Furthermore, the information signaled from the base station may include a combination of a length of PDSCH and a start symbol of PDSCH within a slot and K0. Here, K0 indicates a difference between a slot in which a PDCCH is received and a slot in which a PDSCH scheduled by the corresponding PDCCH is received. Furthermore, the combination of a start symbol of PDSCH and a length of PDSCH within a slot may be encoded in a form of start and length indicator value (SLIV) value. The base station may signal up to 16 K0 values and combinations of a start symbol and length of PDSCH. The UE may obtain one of 16 combinations from DCI scheduling a PDSCH. The UE may obtain information about a time domain in which PDSCH is received, from the K0 value indicated by DCI and the start symbol and length of PDSCH within a slot.

Furthermore, the information signaled from the base station may include a semi-static DL/UL configuration. The semi-static DL/UL configuration represents symbol configuration information of a slot configured through a cell-specific RRC signal or UE-specific RRC signal. In detail, this configuration may indicate whether each symbol included in a slot is a DL symbol, UL symbol, or flexible symbol. The UE may determine a PDSCH candidate set on the basis of whether any one of symbols to which PDSCH is allocated corresponds to a UL symbol. This is because PDSCH cannot be received on a symbol corresponding to a UL symbol. In a specific embodiment, any one of symbols to which PDSCH is allocated corresponds to a UL symbol, the UE may not include the corresponding PDSCH in a PDSCH candidate set. All of symbols to which PDSCH is allocated do not correspond to a UL symbol, the UE may include the corresponding PDSCH in a PDSCH candidate set.

Furthermore, the information signaled from the base station may include information about a configuration of CORESET and search space. The information about a configuration of CORESET and search space may indicate at which position of which slot a PDCCH can be received.

Furthermore, the information signaled from the base station may include a PDSCH repetition value. While receiving PDSCH for each slot, the base station may receive the same PDSCH a number of times indicated by the PDSCH repetition value. Here, the UE may start to receive PDSCH at the same symbol position in each slot. Furthermore, the UE may receive PDSCH using the same length in each slot. The base station may set the PDSCH repetition value to any one of 1, 2, 4, and 8 using an RRC signal. When the PDSCH repetition value is larger than 1, it may be said that slot aggregation is used. When reception of PDSCH is configured to be repeated in a plurality of slots, the UE may determine whether a condition for including a corresponding PDSCH in a PDSCH candidate set is satisfied on the basis of whether PDSCH reception is possible in all of slots in which PDSCH is received. In detail, when the UE determines that PDSCH reception is impossible in all of slots in which it is indicated that PDSCH is repeatedly received, the UE may not include the corresponding PDSCH in a PDSCH candidate set. In another embodiment, when PDSCH reception is possible in any one of slots in which it is indicated that PDSCH is received, the UE may include the corresponding PDSCH in a PDSCH candidate set.

On the basis of whether a PDSCH candidate indicated by SLIV is valid for each of a plurality of K1 values and K0, the UE includes a combination of each of K1 values, K0, and PDSCH candidate indicated by SLIV in a PDSCH candidate set. It may be determined whether a PDSCH candidate indicated by SLIV is valid for each of the plurality of K1 values and K0. When a combination of the corresponding K1 value, K0, and PDSCH candidate indicated by SLIV is valid, the UE may include a combination of the corresponding K1 value, K0, and PDSCH candidate indicated by SLIV in a PDSCH candidate set. For convenience, a slot in which PUCCH is transmitted is referred to as a n-th slot. When any one of symbols for which SLIV indicates that PDSCH is allocated corresponds to a UL symbol in a corresponding slot among all of n−K1-th slot, n−K1−1-th slot, . . . , and n−K1−($N_{rep}$−1)-th slot, the UE may determine that a PDSCH candidate indicated by the corresponding SLIV is not valid for the corresponding K1 value and K0. Here, $N_{rep}$ represents the number of slots in which PDSCH is repeatedly received. As described above, the $N_{rep}$ may be set through an RRC signal. Furthermore, when PDSCH repetition is not used, $N_{rep}$ may be such that $N_{rep}$=1. When any one of symbols for which SLIV indicates that PDSCH is allocated corresponds to a UL symbol in n−K1-th slot, the UE may determine that a PDSCH candidate indicated by the corresponding SLIV is not valid for the corresponding K1 value and K0. Furthermore, when there is no search space in n−K1−($N_{rep}$−1)−K0-th slot, the UE may determine that a PDSCH candidate indicated by the corresponding SLIV is not valid for the corresponding K1 value and K0. As described above, when PDSCH repetition is not used, the $N_{rep}$ may be such that $N_{rep}$=1. In detail, when all of symbols for which SLIV indicates that PDSCH is allocated do not correspond to a UL symbol in any one of n−K1-th slot, n−K1−1-th slot, . . . , and n−K1−($N_{rep}$−1)-th slot, and a search space is present in n−K1−($N_{rep}$−1)−K0-th slot, the UE may determine that a PDSCH candidate indicated by SLIV is valid for the corresponding K1 value and K0. When the UE determines that a PDSCH candidate indicated by SLIV value is not valid, the UE may not include a combination of the corresponding K1 value, K0, and PDSCH candidate indicated by SLIV in a PDSCH candidate set.

Figure 24:
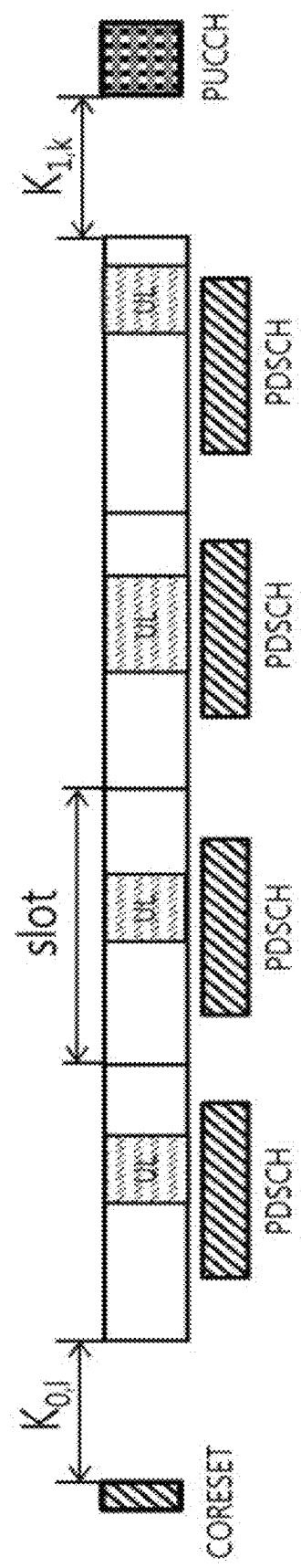
FIG. 24 is a diagram showing a method of configuring a PDSCH candidate and a DL association set (or PDSCH candidate set) when receiving a PDSCH according to an embodiment of the present invention.

FIG. 24 illustrates determination on whether to include a PDSCH candidate indicated by SLIV signaled to a UE in a PDSCH candidate set according to K1 and K0 according to an embodiment of the present invention.

In the embodiment of FIG. 24, any one of symbols for which SLIV indicates that PDSCH is allocated corresponds to a UL symbol in a corresponding slot among all of n−K1-th slot, n−K1−1-th slot, . . . , and n−K1−($N_{rep}$−1)-th slot. Therefore, the UE determines that a PDSCH candidate indicated by SLIV is not valid for the corresponding K1 value and K0. The UE does not include a combination of the corresponding K1 value, K0, and PDSCH candidate indicated by SLIV in a PDSCH candidate set.

On the basis of whether a PDSCH candidate of a combination of K1 value, K0, and SLIV included in a PDSCH candidate set overlaps, in terms of at least one symbol, with a PDSCH candidate of another combination of K1 value, K0, and SLIV included in a PDSCH candidate set in at least one slot, the UE combines the two combinations into one combination. The UE may determine whether a PDSCH candidate of a combination of K1 value, K0, and SLIV included in a PDSCH candidate set overlaps, in terms of at least one symbol, with a PDSCH candidate of another combination of K1 value, K0, and SLIV included in a PDSCH candidate set in at least one slot. When a PDSCH candidate of a combination of K1 value, K0, and SLIV included in a PDSCH candidate set overlaps, in terms of at least one symbol, with a PDSCH candidate of another combination of K1 value, K0, and SLIV in at least one slot, the UE may combine the two combinations into one combination. In a specific embodiment, when a PDSCH candidate set includes N number of combinations, the UE may determine whether a PDSCH candidate of an n-th combination overlaps with a PDSCH candidate of each of up to m=n+1, N combinations. Here, the UE may perform an operation related to overlap determination sequentially from n=0 to n=N−1.

On the basis of a position of a last symbol of PDSCH included in a PDSCH candidate set, the UE may determine the position of the corresponding PDSCH in a semi-static HARQ-ACK codebook of HARQ-ACK information. In detail, according to the position of a last symbol of PDSCH included in a PDSCH candidate set, the UE may determine the position of a bit indicating ACK/NACK of the corresponding PDSCH in a HARQ-ACK codebook. In detail, the position of HARQ-ACK information of PDSCH having a preceding last symbol may also precede. For example, when a last symbol of a first PDSCH precedes a last symbol of a second PDSCH, a bit indicating ACK/NACK of the first PDSCH may precede a bit indicating ACK/NACK of the second PDSCH in a HARQ-ACK codebook.

The UE may transmit different UCI types (HARQ-ACK, SR, or CSI (part 1 or part 2)) by multiplexing the same in a PUCCH. The UE may determine a maximum number of bits that the PUCCH can transmit. This may be configured in the base station, or may be determined using at least one piece of information among a maximum code rate set for PUCCH and the number of symbols, the number of PRBs, and the number of DM-RS symbols of PUCCH. If the number of bits of the above UCI is larger than the maximum number of bits that PUCCH can transmit, the UE is unable to transmit all DCI, and thus may not transmit some UCI types.

For example, CSI part 2 may be excluded. If the number of bits of the UCI is still larger than the maximum number of bits even when CSI part 2 is excluded, CSI part 1 may be excluded. If the number of bits of the UCI is still larger than the maximum number of bits even when CSI part 1 is excluded, SR may be excluded. If the number of bits of the UCI is still larger than the maximum number of bits even when SR is excluded, a process (bundling) may be performed to drop or combine a portion or entirety of HARQ-ACK. Thereafter, the present invention relates to a method for reducing the number of bits of HARQ-ACK.

As described above, the size (i.e., bit-size) of a semi-static HARQ-ACK codebook is determined according to signaling from the base station. Since this size does not change according to the number of PDSCHs actually received by the UE, the size of a semi-static HARQ-ACK codebook transmitted by the UE is the same even when the UE fails to receive a certain PDSCH.

The UE may be unable to transmit a given semi-static HARQ-ACK codebook in a specific situation. In this case, the UE may transmit only HARQ-ACK bits of some PDSCHs in a semi-static HARQ-ACK codebook, or may combine and transmit information of HARQ-ACK bits of some or all PDSCHs in a semi-static HARQ-ACK codebook. Here, transmitting only HARQ-ACK bits of some PDSCHs is referred to as dropping, and combining and transmitting information of some or all bits is referred to as bundling.

The dropping transmits only HARQ-ACK bits of some PDSCHs in a semi-static HARQ-ACK codebook without transmitting HARQ-ACK bits of other PDSCHs. Through this process, the UE may reduce the size (i.e., bit-size) of a semi-static HARQ-ACK codebook. For example, it is assumed that the size of a semi-static HARQ-ACK codebook is A bits. If the bit-size that can be transmitted by the UE is B bits (B<A), the UE should select and transmit only B bits from a semi-static HARQ-ACK codebook. For reference, the UE may select bits smaller than B. Furthermore, although descriptions have been provided with respect to bits, this may be replaced with the number of PDSCHs.

A problem to be solved by the present invention relates to a method for determining a PDSCH of which HARQ-ACK bits are to be transmitted when performing dropping.

The bundling is a scheme of combining and transmitting information of HARQ-ACK bits of some or all PDSCHs in a semi-static HARQ-ACK codebook, and a combining scheme may be as below. If HARQ-ACK bits to be combined are all ACK, combined HARQ-ACK bit is ACK. Otherwise, combined HARQ-ACK bit is NACK. In another expression, ACK is referred to as binary number 1 (or 'true'), and NACK is referred to as 0 (or 'false'). Combined HARQ-ACK bit may be determined as a binary product of HARQ-ACK bits to be combined.

A problem to be solved by the present invention relates to a method for determining a PDSCH of which HARQ-ACK information is to be combined when performing bundling.

A first embodiment to a fourth embodiment are embodiments applicable to the case where the UE receives a PDSCH in one cell. The first embodiment is applicable to the case where a PDSCH is received in a plurality of cells (i.e., the case of carrier aggregation (CA)).

As the first embodiment, when the number (here A bits) of HARQ-ACK bits included in a semi-static HARQ-ACK codebook is larger than the number (here B bits) of bits that can be transmitted by the UE, the UE may not transmit an entire semi-static HARQ-ACK codebook. That is, the UE may not transmit the semi-static HARQ-ACK codebook even when the UE is short of bits by as much as 1 bit compared to the number of transmittable bits.

As the second embodiment, the UE may transmit some of bits of the semi-static HARQ-ACK codebook and may not transmit other bits. Here, selecting some bits to be transmitted may be based on the position of bits in the semi-static HARQ-ACK codebook. Preferably, some bits to be transmitted may be bits that are arranged at a preceding position in the semi-static HARQ-ACK codebook.

For example, it is assumed that the size of a semi-static HARQ-ACK codebook is A bits. If the bit-size that can be transmitted by the UE is B bits (B<A), the UE may select and transmit only first B number of bits from the semi-static HARQ-ACK codebook.

Figure 25:
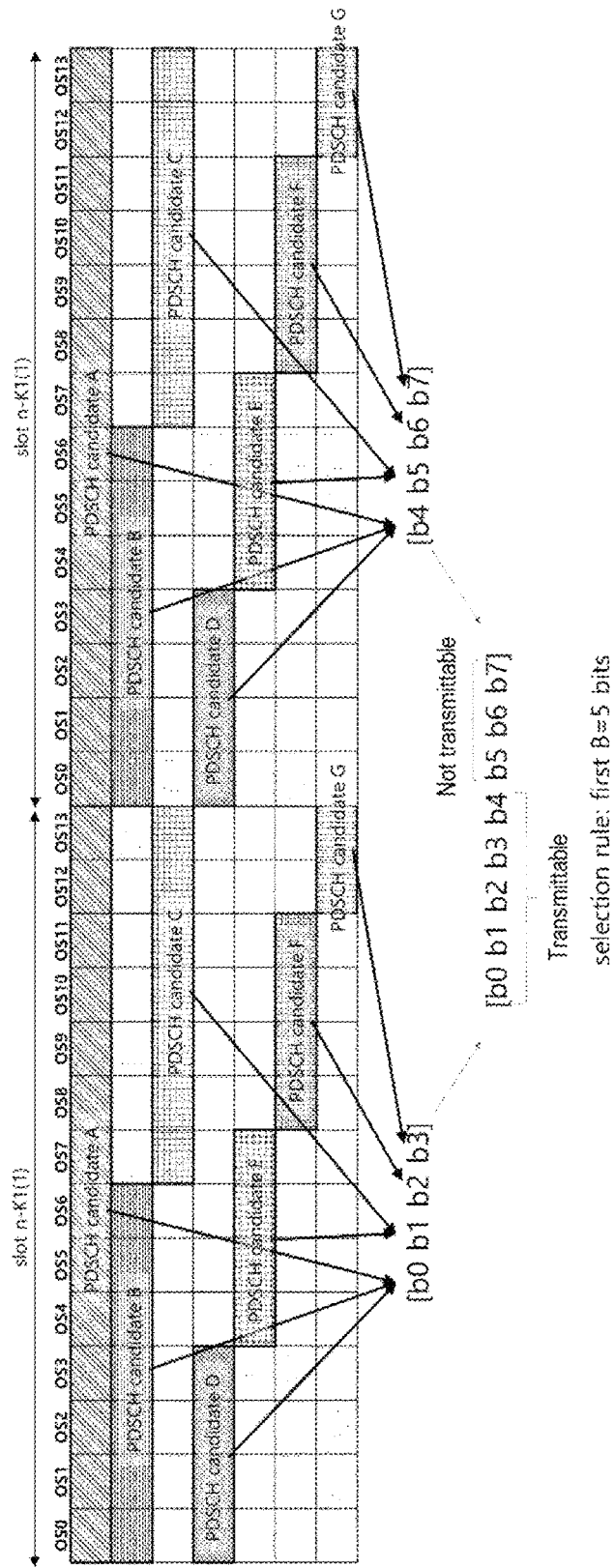
FIG. 25 is a diagram illustrating a method of reducing a HARQ-ACK size according to an embodiment of the present invention.

FIG. 25 is a diagram illustrating a method for reducing a HARQ-ACK size according to an embodiment of the present invention.

Referring to FIG. 25, K1 has two values (K1(1) and K1(2)), and the number of cells is one. According to a semi-static HARQ-ACK codebook generation scheme, HARQ-ACK bits of four PDSCHs are generated according to each K1 value. That is, [b0 b1 b2 b3] that are HARQ-ACK bits of four PDSCHs are generated according to the K1(1) value, and [b4 b5 b6 b7] that are HARQ-ACK bits of four PDSCHs are generated according to the K1(2) value. Furthermore, the UE transmits [b0 b1 b2 b3 b4 b5 b6 b7] with a semi-static HARQ-ACK codebook.

In the embodiment of FIG. 25, if the UE should select and transmit only B=5 bits, the UE should select 5 bits among the A=8 bits. According to the second embodiment, the UE may select first 5 bits from among the A=8 bits. This may be [b0 b1 b2 b3 b4].

Although a method of selecting some bits has been described in relation to the second embodiment, this may be partially replaced with PDSCH. In more detail, it is assumed that a semi-static HARQ-ACK codebook includes HARQ-ACK bits of A number of PDSCHs. The numbers of HARQ-ACK bits corresponding to respective PDSCHs may be the same or different. Furthermore, the numbers of HARQ-ACK bits corresponding to respective PDSCHs may be 1 bit or a plurality of bits. The UE may select, as bits to be transmitted, HARQ-ACK bits of PDSCHs arranged at a preceding position in a semi-static HARQ-ACK codebook. Here, when HARQ-ACK bits of a certain PDSCH are not entirely but partially included in a semi-static HARQ-ACK codebook, the HARQ-ACK bits of the PDSCH are all excluded.

For example. it is assumed that the size of a semi-static HARQ-ACK codebook is A bits. If the bit-size that can be transmitted by the UE is B bits (B<A), the UE selects first B number of bits from the semi-static HARQ-ACK codebook, wherein the UE checks whether HARQ-ACK bits of a last PDSCH among PDSCHs corresponding to B number of HARQ-ACKs are included in the above B bits. If these HARQ-ACK bits are included, the semi-static HARQ-ACK codebook configured with the above B bits may be transmitted. If these HARQ-ACK bits are not included, the HARQ-ACK bits of the last PDSCH may be excluded from the semi-static HARQ-ACK codebook configured with the above B bits.

As the third embodiment, the UE may determine bits to be transmitted in a semi-static HARQ-ACK codebook on the basis of an index of a slot. Here, the index of a slot may be determined according to a K1 value. The UE may transmit HARQ-ACK bits corresponding to slots having a lower index (preceding in time) among slots, and may not transmit HARQ-ACK bits corresponding to slots having a higher index (following in time) among slots. For reference, a larger K1 value indicates a slot preceding in time.

For example, it is assumed that the size of a semi-static HARQ-ACK codebook is A bits. If the bit-size that can be transmitted by the UE is B bits (B<A), the UE calculates a length of HARQ-ACK bits in order from preceding slots in the semi-static HARQ-ACK codebook, and, if the calculated length of HARQ-ACK bits is less than B, calculates the length of HARQ-ACK bits by including a next slot. If the length of HARQ-ACK bits including a next slot is larger than B, HARQ-ACK bits may be determined by including only HARQ-ACK bits of preceding slots excluding HARQ-ACK bits of the next slot.

Figure 26:
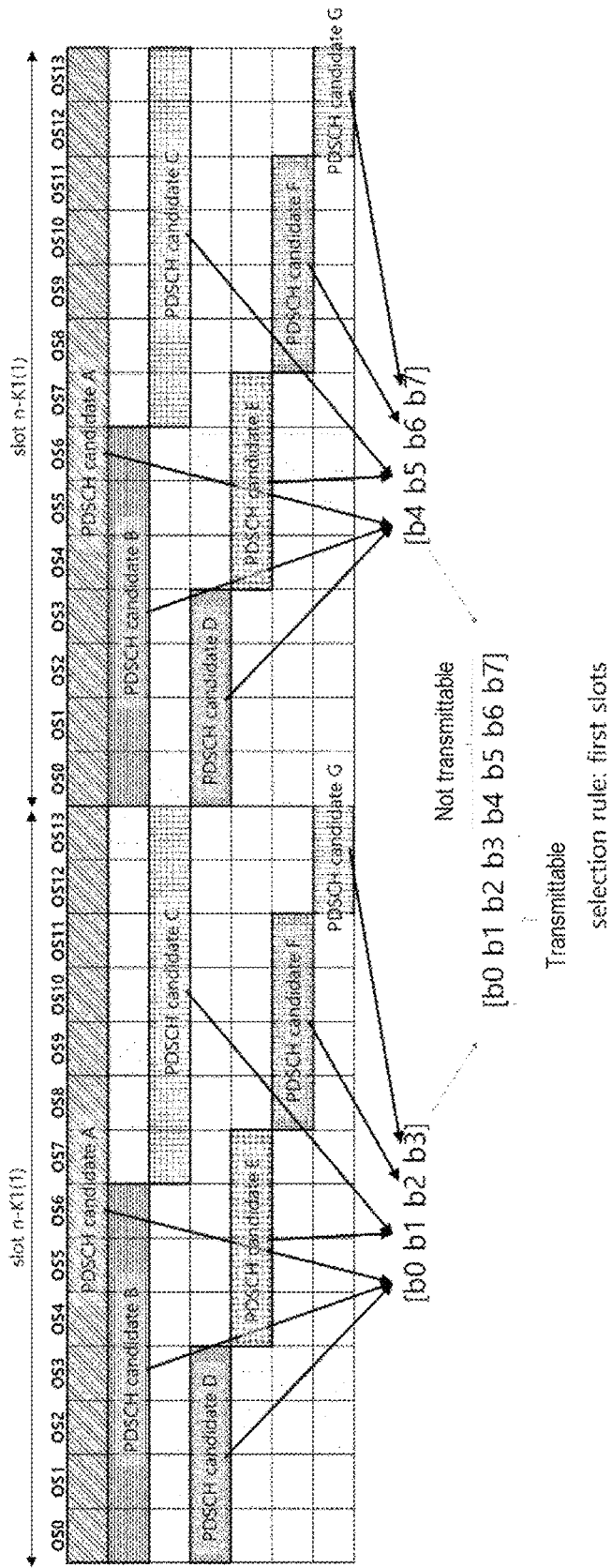
FIG. 26 is a diagram illustrating a method of reducing a HARQ-ACK size according to an embodiment of the present invention.

FIG. 26 is a diagram illustrating a method for reducing a HARQ-ACK size according to an embodiment of the present invention.

Referring to FIG. 26, if the UE should select and transmit only B=5 bits, the UE calculates HARQ-ACK bits of a foremost slot (here, slot n−K1(1)). Here, the calculated HARQ-ACK bits are [b0 b1 b2 b3], which are 4 bits. Since this is less than B=5 bits, HARQ-ACK bits of a next slot may be calculated. The HARQ-ACK bits calculated by including a next slot (here, slot n−K1(2)) are [b0 b1 b2 b3 b4 b5 b6 b7], which are 8 bits. Therefore, the UE may determine, as HARQ-ACK bits to be transmitted, [b0 b1 b2 b3] that are HARQ-ACK bits calculated in preceding slots (here, slot n−K1(1)).

In the second embodiment and third embodiment, the UE transmits only HARQ-ACK of PDSCH of a specific slot (here, slot n−K1(1)), and cannot transmit HARQ-ACK of PDSCH of another slot (here, slot n−K1(2)). Therefore, even if the base station schedules PDSCHs for different slots, HARQ-ACK of some slots may fail to be transmitted. An embodiment for resolving this issue will be disclosed.

As the fourth embodiment, the UE may distribute transmittable bits to each slot, thereby the UE can select bits to be transmitted. In more detail, transmittable bits are distributed to slots according to a K1 value in a semi-static HARQ-ACK codebook, thereby bits to be transmitted are determined.

For example, when bits that can be transmitted by the UE are A bits and the K1 value is K, the number of bits to be transmitted in each slot may be determined on the basis of A and K1 value. For example, the number may be determined on the basis of A/K. When A/K is not an integer, at least one of ceil(A/K), round(A/K), or floor(A/K) may be determined as the number of bits to be transmitted in each slot. When the number of bits that can be transmitted in each slot is determined, the UE may determine bits to be transmitted and bits not to be transmitted in each slot. Preferably, preceding bits in a slot may be determined as bits to be transmitted, and following bits may be determined as bits not to be transmitted.

Figure 27:
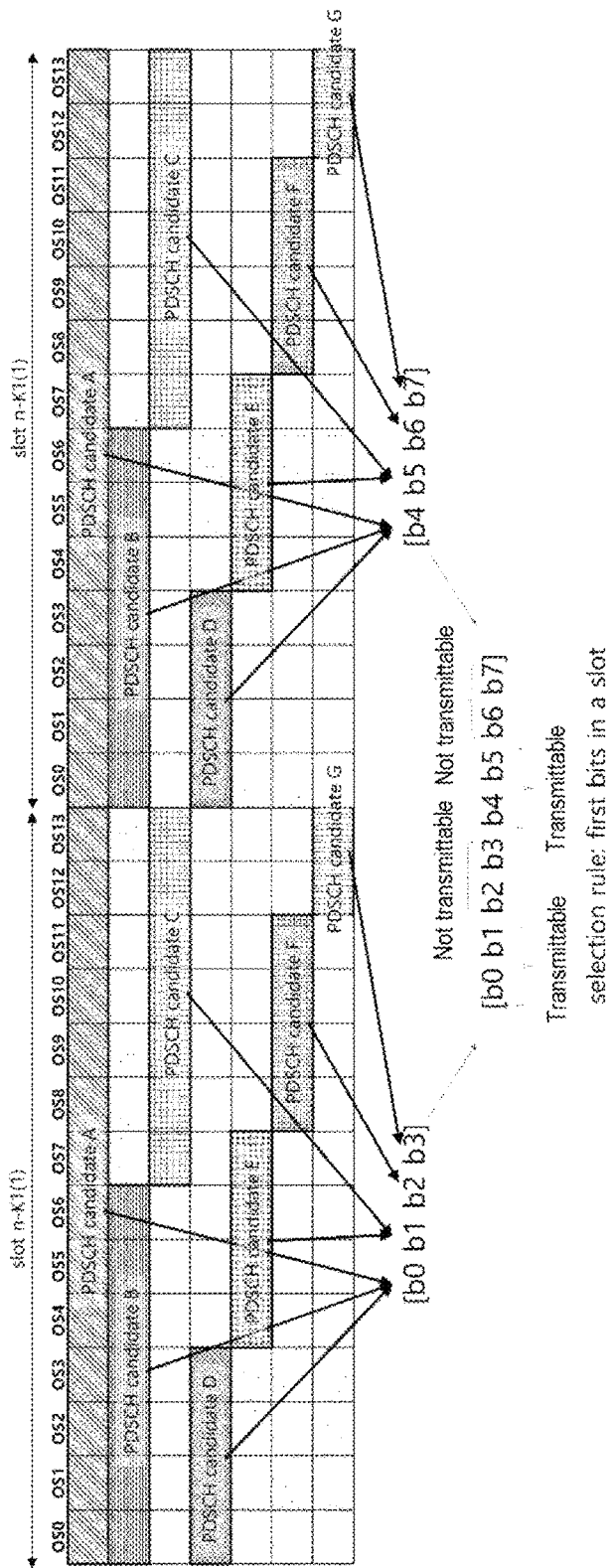
FIG. 27 is a diagram illustrating a method of reducing a HARQ-ACK size according to an embodiment of the present invention.

FIG. 27 is a diagram illustrating a method for reducing a HARQ-ACK size according to an embodiment of the present invention.

Referring to FIG. 27, if the UE should select and transmit only B=4 bits, the UE may transmit only two bits in each slot (slot n−K1(1) and slot n−K1(2)). Therefore, only two preceding bits may be selected in each slot so as to transmit [b0 b1 b4 b5].

The above embodiments have been described with regard to one cell. However, a slot may be replaced with a cell in the above embodiments, and thus the above method may be interpreted as a method in which some of HARQ-ACK bits of different cells are selected and transmitted.

When the UE is configured to receive PDSCH from two or more cells (i.e., in the case of carrier aggregation (CA)), the followings may be considered.

First, in the case of CA, the UE may be configured with a different reception method for each cell. Here, the reception method may include a TB-based PDSCH reception method, CBG-based PDSCH reception method, reception method including 1 TB per PDSCH, and reception method including 2 TB per PDSCH. If the number of bits of a semi-static HARQ-ACK codebook is larger than the number of bits that can be transmitted by the UE, the following methods are necessary considering that different cells have different reception methods.

As a first method, when CBG-based PDSCH reception is configured in a cell, the UE generates a semi-static HARQ-ACK codebook by assuming CBG-based PDSCH reception as TB-based PDSCH reception in a cell. Here, ACK/NACK of TB-based PDSCH reception is determined according to whether TB-CRC is successful. That is, 1-bit HARQ-ACK is generated per TB. Alternatively, 1 bit per TB generated by TB-based PDSCH reception may be obtained by bundling N_CBG-bit ACK/NACK generated by CBG-based PDSCH reception. When the size of a semi-static HARQ-ACK codebook generated by assuming the TB-based PDSCH reception is equal to or less than the number (here B bits) of transmittable bits, the UE may transmit the semi-static HARQ-ACK codebook. When the size of a semi-static HARQ-ACK codebook generated by assuming the TB-based PDSCH reception is larger than the number (here B bits) of transmittable bits, the UE cannot transmit the semi-static HARQ-ACK codebook. In this case, additional dropping or bundling of HARQ-ACK bits is necessary. This will be described later.

FIG. 28 is a diagram illustrating a method for reducing a HARQ-ACK size in a situation of carrier aggregation according to an embodiment of the present invention.

Referring to (a) and (b) of FIG. 28, the UE is configured to receive PDSCH from three cells CC #0, CC #1, and CC #2, and four K1 values K1(1), K1(2), K1(3), and K1(4) are set. One cell CC #0 is configured for TB-based PDSCH reception and reception of 1 TB per PDSCH, another cell CC #1 is configured for TB-based PDSCH reception and reception of 2 TBs per PDSCH, and another cell CC #2 is configured for CBG-based PDSCH reception and reception of 1 TB per PDSCH. According to a first method, the UE generates a semi-static HARQ-ACK codebook by assuming TB-based HARQ-ACK in order to reduce the number of HARQ-ACK bits ($M_{21}$, $M_{22}$, $M_{23}$, and $M_{34}$) generated according to CBG-based PDSCH reception of CC #2. The number of HARQ-ACK bits ($N_{21}$, $N_{22}$, $N_{23}$, and $N_{24}$) generated as a result is 1 bit per PDSCH.

As a second method, the UE may generate a semi-static HARQ-ACK codebook by assuming TB-based PDSCH reception for cells in which CBG-based PDSCH reception is configured, sequentially one by one, and may determine whether transmission is possible. The UE generates a semi-static HARQ-ACK codebook by assuming TB-based PDSCH reception for one of cells in which CBG-based PDSCH reception is configured, and, if the semi-static HARQ-ACK codebook is equal to or less than the number of bits that can be transmitted by the UE, transmits the semi-static HARQ-ACK codebook. If the semi-static HARQ-ACK codebook is larger than the number of bits that can be transmitted by the UE, the UE generates a semi-static HARQ-ACK codebook by assuming TB-based PDSCH reception for other one of cells in which CBG-based PDSCH reception is configured, and, if the semi-static HARQ-ACK codebook is equal to or less than the number of bits that can be transmitted by the UE, transmits the semi-static HARQ-ACK codebook. If the size of the semi-static HARQ-ACK codebook is still larger than the number of bits that can be transmitted by the UE after this process is performed for all of cells in which CBG-based PDSCH reception is configured, the semi-static HARQ-ACK codebook cannot be transmitted. In this case, additional dropping or bundling of HARQ-ACK bits is necessary. This will be described later.

As a third method, when reception of 2 TBs per PDSCH is configured in a cell, the UE generates one bit by bundling HARQ-ACK bits of two TBs in a cell (this bundling is referred to as spatial bundling), and generates a semi-static HARQ-ACK codebook on the basis of the above bit. If the size of the semi-static HARQ-ACK codebook generated on the basis of the spatial bundled bit is equal to or less than the number (here B bits) of transmittable bits, the UE may transmit the semi-static HARQ-ACK codebook. If the size of the semi-static HARQ-ACK codebook generated on the basis of the spatial bundled bit is larger than the number (here B bits) of transmittable bits, the UE cannot transmit the semi-static HARQ-ACK codebook. In this case, additional dropping or bundling of HARQ-ACK bits is necessary. This will be described later.

Referring to (a) and (c) of FIG. 28, according to the third method, the UE may spatial bundle ACK/NACK of 2 TBs of one PDSCH in order to reduce the number of HARQ-ACK bits ($L_{21}$, $L_{22}$, $L_{23}$, and $L_{34}$) generated according to a configuration of reception of 2 TBs per PDSCH of CC #1. The number of HARQ-ACK bits ($N_{21}$, $N_{22}$, $N_{23}$, and $N_{24}$) generated as a result is 1 bit per PDSCH.

As a fourth method, similarly to the second method, the UE may generate a semi-static HARQ-ACK codebook by spatial bundling cells in which 2-TB reception per PDSCH is configured, sequentially one by one, and may determine whether transmission is possible.

The following preferable embodiment may be configured by combining the first method and the third method. In this preferred embodiment, the UE generates a semi-static HARQ-ACK codebook by assuming TB-based PDSCH reception in a cell in which CBG-based PDSCH reception is configured, and checks whether the semi-static HARQ-ACK codebook can be transmitted. If the transmission is impossible, it is checked whether a semi-static HARQ-ACK codebook generated by additionally performing spatial bundling can be transmitted.

A detailed operation is described as below. When CBG-based PDSCH reception and reception of 2 TBs per PDSCH are configured in a cell, the UE generates a semi-static HARQ-ACK codebook by assuming CBG-based PDSCH reception as TB-based PDSCH reception in a cell When the size of a semi-static HARQ-ACK codebook generated by assuming the TB-based PDSCH reception is equal to or less than the number (here B bits) of transmittable bits, the UE may transmit the semi-static HARQ-ACK codebook. Otherwise, the UE performs additional spatial bundling to generate one bit by bundling HARQ-ACK bits of two TBs in a cell, and generates a semi-static HARQ-ACK codebook on the basis of the above bit. If the size of the semi-static HARQ-ACK codebook generated on the basis of the spatial bundled bit is equal to or less than the number (here B bits) of transmittable bits, the UE may transmit the semi-static HARQ-ACK codebook. If the size of the semi-static HARQ-ACK codebook generated on the basis of the spatial bundled bit is larger than the number (here B bits) of transmittable bits, the UE cannot transmit the semi-static HARQ-ACK codebook. In this case, additional dropping or bundling of HARQ-ACK bits is necessary. This will be described later.

Referring to (a), (b), and (d) of FIG. 28, first, according to a first method, the UE generates a semi-static HARQ-ACK codebook by assuming TB-based HARQ-ACK in order to reduce the number of HARQ-ACK bits ($M_{21}$, $M_{22}$, $M_{23}$, and $M_{34}$) generated according to CBG-based PDSCH reception of CC #2. The number of HARQ-ACK bits ($N_{21}$, $N_{22}$, $N_{23}$, and $N_{24}$) generated as a result is 1 bit per PDSCH. If the number of bits of the semi-static HARQ-ACK codebook is larger than the number of bits that can be transmitted by the UE, the third method is additionally performed. According to the third method, the UE may spatial bundle ACK/NACK of 2 TBs of one PDSCH in order to reduce the number of HARQ-ACK bits ($L_{21}$, $L_{22}$, $L_{23}$, and $L_{34}$) generated according to a configuration of reception of 2 TBs per PDSCH of CC #1. The number of HARQ-ACK bits ($N_{21}$, $N_{22}$, $N_{23}$, and $N_{24}$) generated as a result is 1 bit per PDSCH. A semi-static HARQ-ACK codebook generated due to the first method and the third method includes 1-bit HARQ-ACK per PDSCH.

Through the first method to the fourth method, the UE may have HARQ-ACK bits of 1 bit per PDSCH equally for each cell. If the size of the semi-static HARQ-ACK codebook is larger than the number of bits that can be transmitted by the UE after performing the first method to the fourth method, additional dropping or bundling of HARQ-ACK bits is necessary. For reference, dropping or bundling of HARQ-ACK bits that will be described later may be additionally applied to the first method to the fourth method. Unless otherwise mentioned, dropping or bundling of HARQ-ACK bits that will be described later may be used even when the first method to the fourth method are not used (i.e., when a HARQ-ACK codebook includes a plurality of HARH-ACK bits per PDSCH).

As a fifth embodiment, the UE may generate a semi-static HARQ-ACK codebook including HARQ-ACK bits of some cells, and may transmit the semi-static HARQ-ACK codebook. Here, some cells may be selected on the basis of a cell index.

Figure 29:
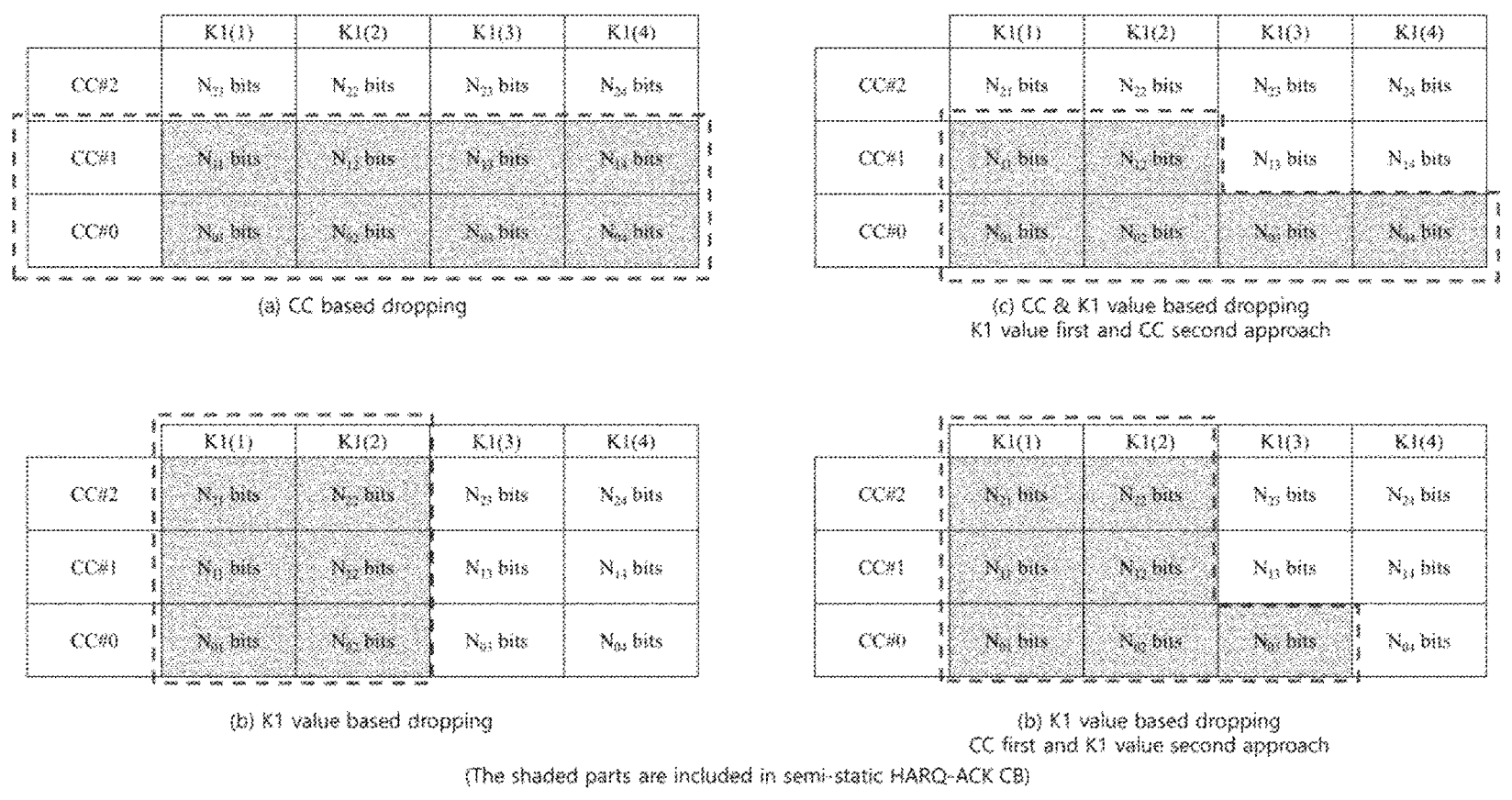

FIG. 29 is a diagram illustrating a method for reducing a HARQ-ACK size in a situation of carrier aggregation according to an embodiment of the present invention.

Referring to (a) of FIG. 29, if the UE is configured to receive PDSCH from three cells CC #0, CC #1, and CC #2, the UE may generate a semi-static HARQ-ACK codebook including HARQ-ACK bits of CC #0. However, if the number of bits ($N_{01}+N_{02}+N_{03}+N_{04}$) of a semi-static HARQ-ACK codebook is larger than the number of bits that can be transmitted by the UE, the UE cannot transmit the semi-static HARQ-ACK codebook. In this case, additional dropping or bundling should be performed within one cell. The methods of above embodiments 1 to 4 may be applied here. Furthermore, if the number of bits ($N_{01}+N_{02}+N_{03}+N_{04}$) of a semi-static HARQ-ACK codebook is equal to or less than the number of bits that can be transmitted by the UE, the UE may transmit the semi-static HARQ-ACK codebook. In addition, the UE may generate a semi-static HARQ-ACK codebook including HARQ-ACK bits of the cell CC #1 having a next index. If the number of bits ($N_{01}+N_{02}+N_{03}+N_{04}+N_{11}+N_{12}+N_{13}+N_{14}$) of a semi-static HARQ-ACK codebook is equal to less than the number of bits that can be transmitted by the UE, the UE may transmit the semi-static HARQ-ACK codebook If the number of bits ($N_{01}+N_{02}+N_{03}+N_{04}+N_{11}+N_{12}+N_{13}+N_{14}$) of a semi-static HARQ-ACK codebook is larger than the number of bits that can be transmitted by the UE, the UE may generate a semi-static HARQ-ACK codebook generated with cells of up to a previous index except for the cell CC #1.

As a sixth embodiment, the UE may generate a semi-static HARQ-ACK codebook including HARQ-ACK bits corresponding to some slots, and may transmit the semi-static HARQ-ACK codebook. Here, some slots may be selected on the basis of a K1 value.

Referring to (b) of FIG. 29, if the UE is configured to receive PDSCH in four slots n−K1(1), n−K1(2), n−K1(3), and n−K1(4) determined according to four K1 values K1(1), K1(2), K1(3), and K1(4), the UE may generate a semi-static HARQ-ACK codebook including HARQ-ACK bits of the first slot n−K1 (1). However, if the number of bits ($N_{01}+N_{11}+N_{21}$) of a semi-static HARQ-ACK codebook is larger than the number of bits that can be transmitted by the UE, the UE cannot transmit the semi-static HARQ-ACK codebook. Furthermore, if the number of bits ($N_{01}+N_{11}+N_{21}$) of a semi-static HARQ-ACK codebook is equal to or less than the number of bits that can be transmitted by the UE, the UE may transmit the semi-static HARQ-ACK codebook. In addition, the UE may generate a semi-static HARQ-ACK codebook including HARQ-ACK bits of the next slot n−K1 (2). If the number of bits ($N_{01}+N_{11}+N_{21}+N_{02}+N_{12}+N_{22}$) of a semi-static HARQ-ACK codebook is equal to less than the number of bits that can be transmitted by the UE, the UE may transmit the semi-static HARQ-ACK codebook. If the number of bits ($N_{01}+N_{11}+N_{21}+N_{02}+N_{12}+N_{22}$) of a semi-static HARQ-ACK codebook is larger than the number of bits that can be transmitted by the UE, the UE may generate a semi-static HARQ-ACK codebook generated with previous slots except for the slot n−K1(2).

In the fifth embodiment and sixth embodiment, the UE excludes HARQ-ACK bits of a specific cell or HARQ-ACK bits of a specific slot. However, when excluding HARQ-ACK bits of a specific cell, HARQ-ACK bits of all slots of the cell may not be excluded. Furthermore, when excluding HARQ-ACK bits of a specific slot, HARQ-ACK bits of all cells of the slot may not be excluded.

The UE may generate a semi-static HARQ-ACK codebook configured with HARQ-ACK bits of some cells as in the fifth embodiment. Here, when adding HARQ-ACK bits of a specific cell to a semi-static HARQ-ACK codebook, the UE may sequentially add HARQ-ACK bits of each slot of the specific cell. This addition process may be performed until the number of bits that can be transmitted by the UE is exceeded when all of HARQ-ACK bits of all slots of the specific cell are added or HARQ-ACK bits of a certain slot are added. If the number of bits that can be transmitted by the UE is exceeded when HARQ-ACK bits of a certain slot are added, a semi-static HARQ-ACK codebook in which up to HARQ-ACK bits of up to a previous slot of the slot are added may be transmitted. This scheme may be referred to as K1 value first, CC second scheme.

Referring to (c) of FIG. 29, the UE may generate a semi-static HARQ-ACK codebook configured with HARQ-ACK bits of CC #0. This semi-static HARQ-ACK codebook includes $N_{01}+N_{02}+N_{03}+N_{04}$ bits. HARQ-ACK bits of CC #1 that is the next cell may be added to the semi-static HARQ-ACK codebook in order of slots of the cell CC #1. First, it may be determined whether to add HARQ-ACK bits ($N_{11}$ bits) of the slot n−K1(1) corresponding to the K1(1) value to the semi-static HARQ-ACK codebook. If the number of bits of the semi-static HARQ-ACK codebook to which the above HARQ-ACK bits are added is equal to or less than the number of bits that can be transmitted by the UE, the above HARQ-ACK bits may be added to the semi-static HARQ-ACK codebook. Next, it may be determined whether to add HARQ-ACK bits of the next slot n−K1(2). If the number of bits of the semi-static HARQ-ACK codebook to which the above HARQ-ACK bits are added is larger than the number of bits that can be transmitted by the UE, the above HARQ-ACK bits are not added to the semi-static HARQ-ACK codebook. In this manner, it may be determined whether to add HARQ-ACK bits of the last slot n−K1(4).

The UE may generate a semi-static HARQ-ACK codebook configured with HARQ-ACK bits of some slots as in the sixth embodiment. Here, when adding HARQ-ACK bits of a specific slot to a semi-static HARQ-ACK codebook, the UE may sequentially add HARQ-ACK bits of each cell of the specific slot. This addition process may be performed until the number of bits that can be transmitted by the UE is exceeded when all of HARQ-ACK bits of all cells of the specific slot are added or HARQ-ACK bits of a certain cell are added. If the number of bits that can be transmitted by the UE is exceeded when HARQ-ACK bits of a certain cell are added, a semi-static HARQ-ACK codebook in which up to HARQ-ACK bits of up to a previous cell of the cell are added may be transmitted. This scheme may be referred to as CC first, K1 value second scheme.

Referring to (d) of FIG. 29, the UE may generate a semi-static HARQ-ACK codebook configured with HARQ-ACK bits of the slot n−K1(2). This semi-static HARQ-ACK codebook includes $N_{01}+N_{11}+N_{21}+N_{02}+N_{12}+N_{22}$ bits. HARQ-ACK bits of slot n−K1(3) that is the next slot may be added to the semi-static HARQ-ACK codebook in order of cells of the slot n−K1(3). First, it may be determined whether to add HARQ-ACK bits ($N_{03}$ bits) of the cell CC #0 having a lowest index to the semi-static HARQ-ACK codebook. If the number of bits of the semi-static HARQ-ACK codebook to which the above HARQ-ACK bits are added is equal to or less than the number of bits that can be transmitted by the UE, the above HARQ-ACK bits may be added to the semi-static HARQ-ACK codebook. Next, it may be determined whether to add HARQ-ACK bits of the cell CC #1 of the next index. If the number of bits of the semi-static HARQ-ACK codebook to which the above HARQ-ACK bits are added is larger than the number of bits that can be transmitted by the UE, the above HARQ-ACK bits are not added to the semi-static HARQ-ACK codebook. In this manner, it may be determined whether to add HARQ-ACK bits of the cell of the last index.

When the UE generates a semi-static HARQ-ACK codebook, a plurality of bits may correspond to one slot. Another method proposed in the present invention is a method for reducing a plurality of bits when the plurality of bits correspond to one slot. With regard to the above first to fourth embodiments, a dropping scheme has been described, in which the UE transmits some of HARQ-ACK bits and do not transmit the others. Hereinafter, a bundling scheme rather than the dropping scheme will be described.

Figure 30:
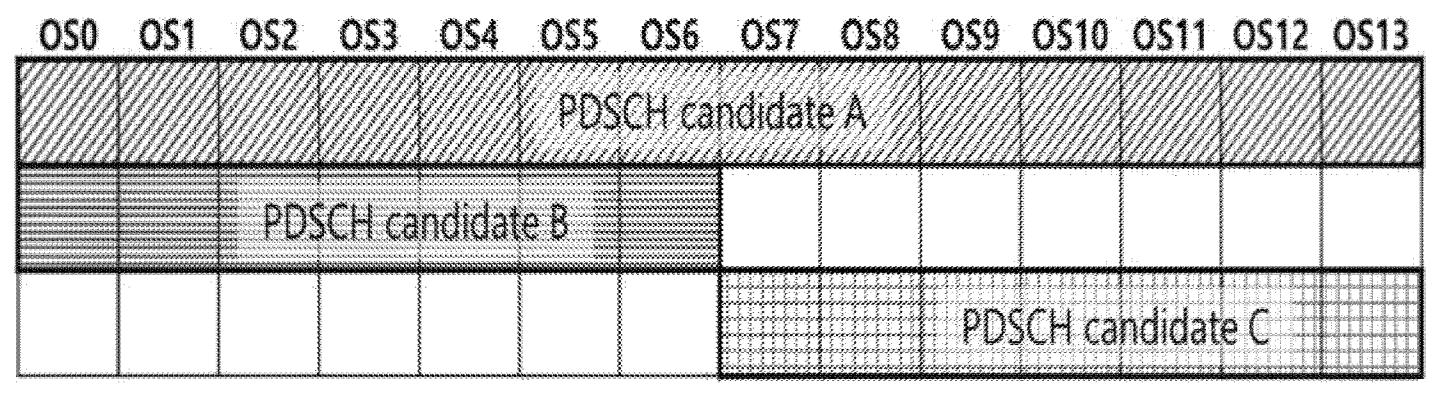

FIG. 30 is a diagram illustrating a method for reducing a HARQ-ACK size within one slot according to an embodiment of the present invention. In particular, FIG. 30 illustrates that three PDSCH candidates are configured in one slot.

PDSCH candidate A occupies symbol 0 to symbol 13,
PDSCH candidate B occupies symbol 0 to symbol 6,
PDSCH candidate C occupies symbol 7 to symbol 13.

The UE can receive only one PDSCH on one symbol, and thus PDSCH candidate A and PDSCH candidate B cannot be simultaneously scheduled for reception since the PDSCH candidates overlap in symbol 0 to symbol 6. Furthermore, PDSCH candidate A and PDSCH candidate C overlap in symbol 7 to symbol 13 and thus cannot be simultaneously scheduled for reception. Therefore, the UE may be scheduled to receive only PDSCH candidate A or one or both of PDSCH candidate B and PDSCH candidate C. This may be simply expressed as below.

{A}, {B}, {C}
{B, C}

Referring to FIG. 30, a type-1 HARQ-ACK codebook may be configured with HARQ-ACK bits of up to two PDSCHs per slot according to a definition. For convenience, HARQ-ACK of PDSCHs is assumed to be 1 bit. That is, the type-1 HARQ-ACK codebook is configured with 2 bits for HARQ-ACK information of up to two PDSCHs per slot. This is referred to as [b0 b1]. Here, b0 may transmit HARQ-ACK information of PDSCH candidate A and PDSCH candidate B.
b1 may transmit HARQ-ACK information of PDSCH candidate C.

It is assumed that the UE has received PDSCH candidate A. This may include the case where a PDCCH scheduling PDSCH candidate A has been received or SPS PDSCH is configured in PDSCH candidate A. As mentioned above, if PDSCH candidate A is scheduled, other PDSCH candidates cannot be scheduled. That is, since PDSCH candidate C corresponding to b1 cannot be scheduled, b1 should always transmit NACK. In other words, if PDSCH candidate A is scheduled, the type-1 HARQ-ACK codebook includes [b0 NACK]. Here, a HARQ-ACK bit of a PDSCH received in PDSCH candidate A may be mapped to b0.

The UE may perform bundling in order to reduce HARQ-ACK information of PDSCHs received in one slot of the type-1 HARQ-ACK codebook. In the above example, [b0 b1] may be bundled as one bit. Here, the bundling may be defined as below.

If HARQ-ACKs of all bits (b0 and b1) are all ACK, ACK
Otherwise, (if HARQ-ACK of at least one of all bits (b0 and b1) is NACK) NACK In the above example, when it is assumed that PDSCH candidate A has been received, [b0 b1] is given such that [b0 b1]=[b0 NACK]. Therefore, when two bits (b0 and b1) are bundled, a result is always NACK. This result is achieved regardless of whether PDSCH candidate A has been successfully received. Therefore, the type-1 HARQ-ACK codebook generated as a result of the above bundling process cannot deliver information about whether PDSCH has been successfully received. The present invention proposes a method for solving this issue.

A method for bundling type-1 HARQ-ACK codebook according to an embodiment of the present invention is described as below.

For a bit position in type-1 HARQ-ACK code, if a PDSCH is received and all of the corresponding PDSCH candidates associated with the bit position overlaps with the received PDSCH, the bit position is considered as "X (3rd state)" for bundling Rule A) 'X' is treated as "ACK" when bundling and the bundling of bits containing "X" only is NACK.

Rule B) 'X' is removed first, and the remaining state are bundled. After bundling, if the bit-size is less than the intended size then add NACKs Referring to FIG. 30, bundling according to the above embodiment is described as below.

From [b0 b1], the UE may recognize that PDSCH candidate B and PDSCH candidate C cannot be scheduled upon receiving scheduling information of PDSCH candidate A. Therefore, ACK/NACK indicating whether PDSCH candidate A has been successfully received may be mapped to the b0 bit, and 'X (3rd state)' may be mapped to the b1 bit since PDSCH candidate C cannot be scheduled. That is, this may be expressed as [b0 b1]=[b0 X].

According to Rule A, 'X' is regarded as ACK when performing bundling Therefore, if b0 and X are bundled as 1 bit, the bundled 1 bit is b0.

According to Rule B, 'X' is excluded. If it is excluded, a result is [b0]. Therefore, when bundled as 1 bit, bundled 1 bit is b0.

Upon receiving the bundled 1 bit, the base station may recognize that the bundled 1 bit is HARQ-ACK of PDSCH candidate A by using information that has scheduled PDSCH candidate A.

Figure 31:
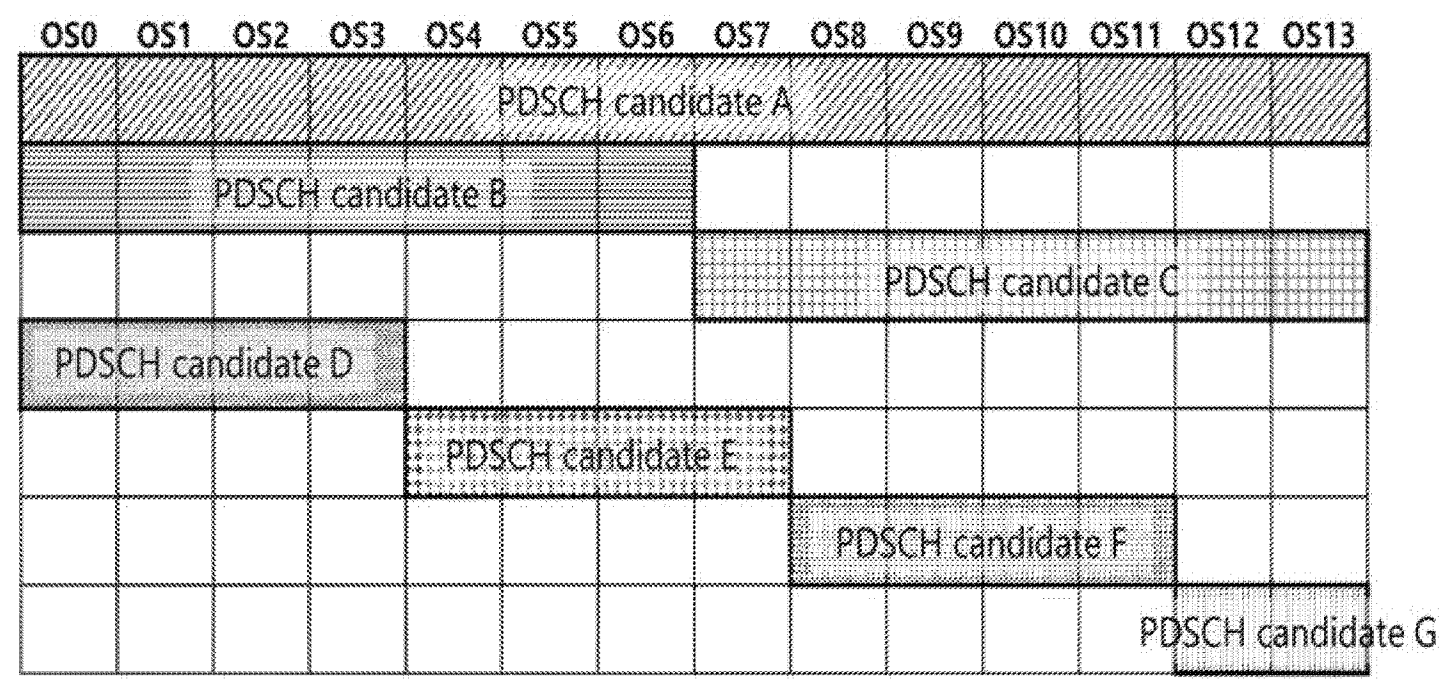

FIG. 31 is a diagram illustrating a method for reducing a HARQ-ACK size within one slot according to an embodiment of the present invention. In particular, FIG. 31 illustrates that seven PDSCH candidates are configured in one slot.

PDSCH candidate A occupies symbol 0 to symbol 13,
PDSCH candidate B occupies symbol 0 to symbol 6,
PDSCH candidate C occupies symbol 7 to symbol 13.
PDSCH candidate D occupies symbol 0 to symbol 3,
PDSCH candidate E occupies symbol 4 to symbol 7,
PDSCH candidate F occupies symbol 8 to symbol 11,
PDSCH candidate G occupies symbol 12 and symbol 13.

According to a type-1 HARQ-ACK codebook generation method, 4 bits HARQ-ACK bits may be generated for PDSCH candidate for this slot. This is referred to as [b0 b1 b2 b3]. Here, b0 may transmit HARQ-ACK information of PDSCH candidate A, PDSCH candidate B, or PDSCH candidate D.

b1 may transmit HARQ-ACK information of PDSCH candidate C or PDSCH candidate E.

b2 may transmit HARQ-ACK information of PDSCH candidate F.

b3 may transmit HARQ-ACK information of PDSCH candidate G.

A combination that allows the UE to be simultaneously scheduled in one slot may be expressed as below.

{A}, {B}, {C}, {D}, {E}, {F}, {G}
{B,C}, {B,F}, {B,G}, {C,D}, {D,E}, {D,F}, {D,G}, {E,F}, {E,G}, {F,G}
{B,F,G}, {D,E,F}, {D,E,G}, {D,F,G}, {E,F,G}
{D,E,F,G}

The UE may bundle 4 bits into 2 bits or 1 bit in order to reduce the number of bits of a semi-static HARQ-ACK codebook. Table 7 shows 2-bit bundling and 1-bit bundling. Here, bundling is obtained through a binary AND operation on adjacent ACK/NACK. (ACK=1, NACK=0). That is, in the case of 2-bit bundling, a first bit is obtained by performing a binary AND operation on first 2 bits among 4 bits, and a second bit is obtained by performing a binary AND operation on following 2 bits. In the case of 1-bit bundling, one bit is obtained by performing a binary AND operation on 4 bits.

In Table 7, b01 is a result of performing a binary AND operation on b0 and b1, b23 is a result of performing a binary AND operation on b2 and b3, and b0123 is a result of performing a binary AND operation on b0, b1, b2, and b3. N denotes NACK.

As shown in Table 7, in the case of 1-bit bundling, the UE always transmits NACK except for the case where PDSCH candidates {D, E, F, G} are scheduled. Therefore, information that can be transmitted by 1-bit bundling is limited. In the case of 2-bit bundling, the UE always transmits [NACK NACK] except for the case where {B,C}, {C,D}, {D,E}, {F,G}, {B,F,G}, {D,E,F}, {D,E,G}, {D,F,G}, {E,F,G}, and {D,E,F,G} are scheduled.

TABLE 7

| | | | Bundling (binary AND) | |
| index | Received PDSCHs | HARQ-ACK | 2-bit bundling | 1-bit bundling |
| --- | --- | --- | --- | --- |
| 1 | {A} | [b0 N N N] | [N N] | [N] |
| 2 | {B} | [b0 N N N] | [N N] | [N] |
| 3 | {C} | [N b1 N N] | [N N] | [N] |
| 4 | {D} | [b0 N N N] | [N N] | [N] |
| 5 | {E} | [N b1 N N] | [N N] | [N] |
| 6 | {F} | [N N b2 N] | [N N] | [N] |
| 7 | {G} | [N N N b3] | [N N] | [N] |
| 8 | {B, C} | [b0 b1 N N] | [b01 N] | [N] |
| 9 | {B, F} | [b0 N b2 N] | [N N] | [N] |
| 10 | {B, G} | [b0 N N b3] | [N N] | [N] |
| 11 | {C, D} | [b0 b1 N N] | [b01 N] | [N] |
| 12 | {D, E} | [b0 b1 N N] | [b01 N] | [N] |
| 13 | {D, F} | [b0 N b2 N] | [N N] | [N] |
| 14 | {D, G} | [b0 N N b3] | [N N] | [N] |
| 15 | {E, F} | [N b1 b2 N] | [N N] | [N] |
| 16 | {E, G} | [N b1 N b3] | [N N] | [N] |
| 17 | {F, G} | [N N b2 b3] | [N b23] | [N] |
| 18 | {B, F, G} | [b0 N b2 b3] | [N b23] | [N] |
| 19 | {D, E, F} | [b0 b1 b2 N] | [b01 N] | [N] |

TABLE 7-continued

| index | Received PDSCHs | HARQ-ACK | Bundling (binary AND) 2-bit bundling | 1-bit bundling |
|---|---|---|---|---|
| 20 | {D, E, G} | [b0 b1 N b3] | [b01 N] | [N] |
| 21 | {D, F, G} | [b0 N b2 b3] | [N b23] | [N] |
| 22 | {E, F, G} | [N b1 b2 b3] | [N b23] | [N] |
| 23 | {D, E, F, G} | [b0 b1 b2 b3] | [b01 b23] | [b0123] |

Table 8 and Table 9 show HARQ-ACK bundling according to an embodiment of the present invention. Rule A is used in Table 8, and Rule B is used in Table 9.

Referring to Table 8 and Table 9, the UE may determine 'X($3^{rd}$ state)' for bundling on the basis of received scheduling information. This is indicated in the column of HARQ-ACK including X($3^{rd}$ state) for bundling. For example, when the UE receives scheduling information corresponding to PDSCH candidate A, the UE may determine b1, b2, and b3 as X($3^{rd}$ state) since PDSCH candidates of which HARQ-ACK is mapped to b1, b2, and b3 cannot be scheduled.

Referring to Table 8, the UE, on the basis of Rule A, may bundle 4 bits HARQ-ACK including X($3^{rd}$ state) for bundling into 1 bit. According to Rule A, X($3^{rd}$ state) is regarded as ACK when bundling with other ACK/NACK. Furthermore, X($3^{rd}$ state) is regarded as NACK when bundling between X($3^{rd}$ state). In Table 8, b023 is a result of performing a binary AND operation on b0, b2, and b3.

As shown in Table 8, in the case of 1-bit bundling, the UE transmits NACK except for the case where PDSCH candidates {A}, {B,C}, {C,D}, {B,F,G}, and {D,E,F,G} are scheduled. Compared to Table 7, meaningful ACK/NACK may be transmitted when PDSCH candidates {A}, {B,C}, {C,D}, and {B,F,G} are scheduled. In the case of 2-bit bundling, the UE transmits NACK except for the case where PDSCH candidates {A}, {B,C}, {B,F}, {C,D}, {D,E}, {F,G}, {B,F,G}, {D,E,F}, {D,E,G}, {D,F,G}, {E,F,G}, and {D,E,F,G} are scheduled. Compared to Table 7, meaningful ACK/NACK may be transmitted when PDSCH candidates {A}, {B,F}, and {B,F,G} are scheduled.

TABLE 8

| | | | Proposed bundling (Rule A) | | |
|---|---|---|---|---|---|
| index | Received PDSCHs | HARQ-ACK | HARQ-ACK including X (3rd state) for bundling | 2-bit bunding | 1-bit bunding |
| 1 | {A} | [b0 N N N] | [b0 X X X] | [b0 N] | [b0] |
| 2 | {B} | [b0 N N N] | [b0 N N N] | [N N] | [N] |
| 3 | {C} | [N b1 N N] | [N b1 X X] | [N N] | [N] |
| 4 | {D} | [b0 N N N] | [b0 N N N] | [N N] | [N] |
| 5 | {E} | [N b1 N N] | [N b1 N N] | [N N] | [N] |
| 6 | {F} | [N N b2 N] | [N N b2 N] | [N N] | [N] |
| 7 | {G} | [N N N b3] | [N N N b3] | [N N] | [N] |
| 8 | {B, C} | [b0 b1 N N] | [b0 b1 X X] | [b01 N] | [b01] |
| 9 | {B, F} | [b0 N b2 N] | [b0 X b2 N] | [b0 N] | [N] |
| 10 | {B, G} | [b0 N N b3] | [b0 N N b3] | [N N] | [N] |
| 11 | {C, D} | [b0 b1 N N] | [b0 b1 X X] | [b01 N] | [b01] |
| 12 | {D, E} | [b0 b1 N N] | [b0 b1 N N] | [b01 N] | [N] |
| 13 | {D, F} | [b0 N b2 N] | [b0 N b2 N] | [N N] | [N] |
| 14 | {D, G} | [b0 N N b3] | [b0 N N b3] | [N N] | [N] |
| 15 | {E, F} | [N b1 b2 N] | [N b1 b2 N] | [N N] | [N] |
| 16 | {E, G} | [N b1 N b3] | [N b1 N b3] | [N N] | [N] |
| 17 | {F, G} | [N N b2 b3] | [N N b2 b3] | [N b23] | [N] |
| 18 | {B, F, G} | [b0 N b2 b3] | [b0 X b2 b3] | [b0 b23] | [b023] |
| 19 | {D, E, F} | [b0 b1 b2 N] | [b0 b1 b2 N] | [b01 N] | [N] |
| 20 | {D, E, G} | [b0 b1 N b3] | [b0 b1 N b3] | [b01 N] | [N] |
| 21 | {D, F, G} | [b0 N b2 b3] | [b0 N b2 b3] | [N b23] | [N] |
| 22 | {E, F, G} | [N b1 b2 b3] | [N b1 b2 b3] | [N b23] | [N] |
| 23 | {D, E, F, G} | [b0 b1 b2 b3] | [b0 b1 b2 b3] | [b01 b23] | [b0123] |

Referring to Table 8, the UE, on the basis of Rule B, may generate HARQ-ACK removing X($3^{rd}$ state) for bundling by excluding 'X($3^{rd}$ state)' from 4 bits HARQ-ACK including X($3^{rd}$ state) for bundling. Furthermore, if HARQ-ACK removing X($3^{rd}$ state) for bundling is larger than the number of bits after bundling, bundling may be performed by performing a binary AND operation on some bits. If HARQ-ACK removing X($3^{rd}$ state) for bundling is less than the number of bits after bundling, NACK may be padded thereafter. For example, in the case of 2-bit bundling, if HARQ-ACK removing X($3^{rd}$ state) for bundling is 1 bit, this HARQ-ACK is made to be 2 bits by padding NACK after the 1 bit. In the case of 2-bit bundling, if HARQ-ACK removing X($3^{rd}$ state) for bundling is 2 bits, the 2 bits are a result of bundling. In the case of 2-bit bundling, if HARQ-ACK removing X($3^{rd}$ state) for bundling is 3 bits, 1 bit is obtained by performing a binary AND operation on the first 2 bits, and this bit is added to the last 1 bit of HARQ-ACK removing X($3^{rd}$ state) for bundling so as to obtain 2 bits as a result of bundling. In Table 9, b023 is a result of performing a binary AND operation on b0, b2, and b3, and b02 is a result of performing a binary AND operation on b0 and b2.

As shown in Table 9, in the case of 1-bit bundling, the UE transmits NACK except for the case where PDSCH candidates {A}, {B,C}, {C,D}, {B,F,G}, and {D,E,F,G} are scheduled. Compared to Table 7, meaningful ACK/NACK may be transmitted when PDSCH candidates {A}, {B,C}, {C,D}, and {B,F,G} are scheduled. In the case of 2-bit bundling, the UE transmits NACK except for the case where PDSCH candidates {A}, {C}, {B,C}, {B,F}, {C,D}, {D,E}, {F,G}, {B,F,G}, {D,E,F}, {D,E,G}, {D,F,G}, {E,F,G}, and {D,E,F,G} are scheduled. Compared to Table 7, meaningful ACK/NACK may be transmitted when PDSCH candidates {A}, {B,F}, and {B,F,G} are scheduled. Compared to Table 8, meaningful ACK/NACK may be transmitted when PDSCH candidate {C} is scheduled.

In the base of 1-bit bundling, the following operation may be considered. In the case of 1-bit bundling, when the UE receives scheduling information of one PDSCH in a slot, the UE may use success/failure of reception of the PDSCH as a result value of 1-bit bundling.

Referring to Table 10, when the UE receives scheduled PDSCH candidates {A}, {B}, {C}, {D}, {E}, {F}, and {G}, the UE may use HARQ-ACK of the PDSCHs as a result value of 1-bit bundling since one PDSCH is scheduled in a slot. If two or more PDSCH candidates are scheduled, NACK may be used as a result value of 1-bit bundling. For another example, if two or more PDSCH candidates are scheduled, 1-bit bundling may be obtained using the schemes of Table 8 and Table 9.

TABLE 10

| index | Received PDSCHs | HARQ-ACK | Proposed bundling (1-bit bundling) |
|---|---|---|---|
| 1 | {A} | [b0 N N N] | [b0] |
| 2 | {B} | [b0 N N N] | [b0] |
| 3 | {C} | [N b1 N N] | [b1] |
| 4 | {D} | [b0 N N N] | [b0] |
| 5 | {E} | [N b1 N N] | [b1] |
| 6 | {F} | [N N b2 N] | [b2] |
| 7 | {G} | [N N N b3] | [b3] |
| 8 | {B, C} | [b0 b1 N N] | [N] |
| 9 | {B, F} | [b0 N b2 N] | [N] |
| 10 | {B, G} | [b0 N N b3] | [N] |
| 11 | {C, D} | [b0 b1 N N] | [N] |
| 12 | {D, E} | [b0 b1 N N] | [N] |
| 13 | {D, F} | [b0 N b2 N] | [N] |
| 14 | {D, G} | [b0 N N b3] | [N] |
| 15 | {E, F} | [N b1 b2 N] | [N] |
| 16 | {E, G} | [N b1 N b3] | [N] |
| 17 | {F, G} | [N N b2 b3] | [N] |

TABLE 9

| index | Received PDSCHs | HARQ-ACK | Proposed bundling (Rule B) | | | |
|---|---|---|---|---|---|---|
| | | | HARQ-ACK including X ($3^{rd}$ state) for bundling | HARQ-ACK removing X ($3^{rd}$ state) for bundling | 2-bit bunding | 1-bit bunding |
| 1 | {A} | [b0 N N N] | [b0 X X X] | [b0] | [b0 N] | [b0] |
| 2 | {B} | [b0 N N N] | [b0 N N N] | [b0 N N N] | [N N] | [N] |
| 3 | {C} | [N b1 N N] | [N b1 X X] | [N b1] | [N b1] | [N] |
| 4 | {D} | [b0 N N N] | [b0 N N N] | [b0 N N N] | [N N] | [N] |
| 5 | {E} | [N b1 N N] | [N b1 N N] | [N b1 N N] | [N N] | [N] |
| 6 | {F} | [N N b2 N] | [N N b2 N] | [N N b2 N] | [N N] | [N] |
| 7 | {G} | [N N N b3] | [N N N b3] | [N N N b3] | [N N] | [N] |
| 8 | {B, C} | [b0 b1 N N] | [b0 b1 X X] | [b0 b1] | [b0 b1] | [b01] |
| 9 | {B, F} | [b0 N b2 N] | [b0 X b2 N] | [b0 b2 N] | [b02 N] | [N] |
| 10 | {B, G} | [b0 N N b3] | [b0 N N b3] | [b0 N N b3] | [N N] | [N] |
| 11 | {C, D} | [b0 b1 N N] | [b0 b1 X X] | [b0 b1] | [b0 b1] | [b01] |
| 12 | {D, E} | [b0 b1 N N] | [b0 b1 N N] | [b0 b1 N N] | [b01 N] | [N] |
| 13 | {D, F} | [b0 N b2 N] | [b0 N b2 N] | [b0 N b2 N] | [N N] | [N] |
| 14 | {D, G} | [b0 N N b3] | [b0 N N b3] | [b0 N N b3] | [N N] | [N] |
| 15 | {E, F} | [N b1 b2 N] | [N b1 b2 N] | [N b1 b2 N] | [N N] | [N] |
| 16 | {E, G} | [N b1 N b3] | [N b1 N b3] | [N b1 N b3] | [N N] | [N] |
| 17 | {F, G} | [N N b2 b3] | [N N b2 b3] | [N N b2 b3] | [N b23] | [N] |
| 18 | {B, F, G} | [b0 N b2 b3] | [b0 X b2 b3] | [b0 b2 b3] | [b02 b3] | [b023] |
| 19 | {D, E, F} | [b0 b1 b2 N] | [b0 b1 b2 N] | [b0 b1 b2 N] | [b01 N] | [N] |
| 20 | {D, E, G} | [b0 b1 N b3] | [b0 b1 N b3] | [b0 b1 N b3] | [b01 N] | [N] |
| 21 | {D, F, G} | [b0 N b2 b3] | [b0 N b2 b3] | [b0 N b2 b3] | [N b23] | [N] |
| 22 | {E, F, G} | [N b1 b2 b3] | [N b1 b2 b3] | [N b1 b2 b3] | [N b23] | [N] |
| 23 | {D, E, F, G} | [b0 b1 b2 b3] | [b0 b1 b2 b3] | [b0 b1 b2 b3] | [b01 b23] | [b0123] |

TABLE 10-continued

| index | Received PDSCHs | HARQ-ACK | Proposed bundling (1-bit bundling) |
|---|---|---|---|
| 18 | {B, F, G} | [b0 N b2 b3] | [N] |
| 19 | {D, E, F} | [b0 b1 b2 N] | [N] |
| 20 | {D, E, G} | [b0 b1 N b3] | [N] |
| 21 | {D, F, G} | [b0 N b2 b3] | [N] |
| 22 | {E, F, G} | [N b1 b2 b3] | [N] |
| 23 | {D, E, F, G} | [b0 b1 b2 b3] | [N] |

It is assumed that the number of bits of a HARQ-ACK codebook of the UE is given as A bits. Furthermore, it is assumed that the number of bits that can be transmitted by the UE is given as B bits. The UE may bundle A bits so as to make the bits B bits or less than B bits. Here, a specific bundling scheme will be described.

As a first method, the UE bundles every X bits from first bits of a HARQ-ACK codebook. Here, X is preferably ceil(A/B). The number of bundles is ceil(A/ceil(A/B)). For reference, all bundles are ceil(A/B) bits if A is a multiple of ceil(A/B), but the last bundle is A mod ceil(A/B) bits if A is not a multiple of ceil(A/B). 1 bit is generated for each bundle by performing a binary AND operation on bits included in each bundle.

For example, it is assumed that the HARQ-ACK codebook is A=10 bits (hereinafter [b0 b1 b2 b3 b4 b5 b6 b7 b8 b9]), and the number of bits that can be transmitted by the UE is given as B=3 bits. According to the first method, the UE bundles every ceil(10/3)=4 bits from first bits of the HARQ-ACK codebook. A first bundle is [b0 b1 b2 b3], a second bundle is [b4 b5 b6 b7], and a third bundle is [b8 b9]. Therefore, after bundling, a first bit is a value obtained by performing a binary AND operation on [b0 b1 b2 b3], a second bit is a value obtained by performing a binary AND operation on [b4 b5 b6 b7], and a third bit is a value obtained by performing a binary AND operation on [b8 b9].

As another example of the first method, the UE bundles every X bits from first bits of a HARQ-ACK codebook. Here, X is one of powers of 2 and is equal to or larger than ceil(A/B).

As a second method, the UE bundles ceil(A/B) bits and floor(AB) bits of a HARQ-ACK codebook. The number of bundles of ceil(A/B) bits is A mod B, and the number of bundles of floor(AB) bits is B−(A mod B). 1 bit is generated for each bundle by performing a binary AND operation on bits included in each bundle.

For example, it is assumed that the HARQ-ACK codebook is A=10 bits (hereinafter [b0 b1 b2 b3 b4 b5 b6 b7 b8 b9]), and the number of bits that can be transmitted by the UE is given as B=3 bits. According to the second method, the UE may configure the HARQ-ACK codebook as one bundle including ceil(10/3)=4 bits and two bundles each including floor(10/3)=3 bits. A first bundle is [b0 b1 b2 b3], a second bundle is [b4 b5 b6], and a third bundle is [b7 b8 b9]. Therefore, after bundling, a first bit is a value obtained by performing a binary AND operation on [b0 b1 b2 b3], a second bit is a value obtained by performing a binary AND operation on [b4 b5 b6], and a third bit is a value obtained by performing a binary AND operation on [b7 b8 b9].

As a third method, the UE divides a HARQ-ACK codebook into B−1 bits and A−(B−1) bits. Furthermore, 1 bit is generated by performing a binary AND operation on A−(B−1) bits. With regard to the HARQ-ACK codebook, the UE generates B bits by combining B−1 bits and the above generated 1 bit.

For example, it is assumed that the HARQ-ACK codebook is A=10 bits (hereinafter [b0 b1 b2 b3 b4 b5 b6 b7 b8 b9]), and the number of bits that can be transmitted by the UE is given as B=3 bits. According to the third method, the UE may divide the HARQ-ACK codebook into 2 bits and 8 bits. The 2 bits are [b0 b1], and the 8 bits are [b2 b3 b4 b5 b6 b7 b8 b9]. The UE may generate 1 bit by performing a binary AND operation on the 8 bits, and may generate B=3 bits by combining the 1 bit and [b0 b1].

For reference, all bundles are ceil(A/B) bits if A is a multiple of ceil(A/B), but the last bundle is A mod ceil(A/B) bits if A is not a multiple of ceil(A/B). 1 bit is generated for each bundle by performing a binary AND operation on bits included in each bundle.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

What is claimed is:

1. A user equipment (UE) for use in a wireless communication system, the UE comprising:
   a processor; and
   a communication module,
   wherein the processor is configured to:
   receive downlink control information (DCI) for downlink scheduling, wherein the DCI includes a sub-slot offset k, and k is an element of a set K: $\{k_0, k_1, \ldots, k_{m-1}\}$ (m>0);
   for each element $k_i$ ($k_i$>0) of the set K, perform one of:
      if a first downlink (DL) slot corresponding to UL sub-slot #($n_u$-$k_i$) is different from a second DL slot corresponding to UL sub-slot #($n_u$-$k_{i-1}$), including hybrid automatic repeat request acknowledgement (HARQ-ACK) information for the first DL slot in a semi-static HARQ-ACK codebook, and
      if the first DL slot is same as the second DL slot, skipping to include the HARQ-ACK information for the first DL slot in the semi-static HARQ-ACK codebook; and
   transmit the semi-static HARQ-ACK codebook in UL sub-slot #$n_u$,
   wherein a generation of the HARQ-ACK information includes:
      determining a set of valid physical downlink shared channel (PDSCH) candidates for the first DL slot, based on whether an end of a corresponding PDSCH candidate in the first DL slot is within any UL sub-slot #($n_u$-$k_o$), where $k_o$ is at least part of the set K.

2. The UE of claim 1, wherein an DL slot includes 14 symbols, and an UL sub-slot includes X symbols, where X is less than 14.

3. The UE of claim 1, wherein $k_o$ has a plurality of values corresponding to UL sub-slots overlapping with the first DL slot.

4. The UE of claim 1, wherein, if the UE does not have a capability to receive more than one PDSCH per DL slot, the HARQ-ACK information for the first DL slot includes HARQ-ACK information for one PDSCH reception only, when at least one valid PDSCH candidate is present in the first DL slot.

5. The UE of claim 1, wherein, if the UE has a capability to receive more than one PDSCH per DL slot, the HARQ-ACK information for the first DL slot includes HARQ-ACK information for one or more PDSCH receptions, based on the set of valid PDSCH candidates.

6. The UE of claim 5, wherein, if the UE has the capability to receive more than one PDSCH per DL slot, a same HARQ-ACK bit position is assigned to both (i) a first valid PDSCH candidate with a smallest last symbol index and (ii) zero or more second valid PDSCH candidates overlapped in time with the first valid PDSCH candidate, and then the first and the zero or more second valid PDSCH candidates are removed from the set of valid PDSCH candidates.

7. The UE of claim 1, wherein if a plurality of DL slots corresponds to UL sub-slot #$(n_u-k_i)$, the first DL slot corresponds to each of the plurality of DL slots, starting from a DL slot with smallest index of the plurality of DL slots.

8. The UE of claim 1, wherein the end of the corresponding PDSCH candidate is determined based on a start and length indicator value (SLIV) for the first DL slot.

9. The UE of claim 1, wherein the DCI is received via a physical downlink control channel (PDCCH).

10. The UE of claim 1, wherein the semi-static HARQ-ACK codebook is transmitted via a physical uplink control channel (PUCCH).

11. A method for use by a user equipment (UE) in a wireless communication system, the method comprising:
receiving downlink control information (DCI) for downlink scheduling, wherein the DCI includes a sub-slot offset k, and k is an element of a set K: $\{k_0, k_1, k_{m-1}\}$ (m>0);
for each element $k_i$ ($k_i$>0) of the set K, performing one of:
if a first downlink (DL) slot corresponding to UL sub-slot #$(n_u-k_i)$ is different from a second DL slot corresponding to UL sub-slot #$(n_u-k_{i-1})$, including hybrid automatic repeat request acknowledgement (HARQ-ACK) information for the first DL slot in a semi-static HARQ-ACK codebook, and
if the first DL slot is same as the second DL slot, skipping to include the HARQ-ACK information for the first DL slot in the semi-static HARQ-ACK codebook; and
transmitting the semi-static HARQ-ACK codebook in UL sub-slot #$n_u$,
wherein a generation of the HARQ-ACK information includes:
determining a set of valid physical downlink shared channel (PDSCH) candidates for the first DL slot, based on whether an end of a corresponding PDSCH candidate in the first DL slot is within any UL sub-slot #$(n_u-k_o)$, where $k_o$ is at least part of the set K.

12. The method of claim 11, wherein an DL slot includes 14 symbols, and an UL sub-slot includes X symbols, where X is less than 14.

13. The method of claim 11, wherein $k_o$ has a plurality of values corresponding to UL sub-slots overlapping with the first DL slot.

14. The method of claim 11, wherein, if the UE does not have a capability to receive more than one PDSCH per DL slot, the HARQ-ACK information for the first DL slot includes HARQ-ACK information for one PDSCH reception only, when at least one valid PDSCH candidate is present in the first DL slot.

15. The method of claim 11, wherein, if the UE has a capability to receive more than one PDSCH per DL slot, the HARQ-ACK information for the first DL slot includes HARQ-ACK information for one or more PDSCH receptions, based on the set of valid PDSCH candidates.

16. The method of claim 15, wherein, if the UE has the capability to receive more than one PDSCH per DL slot, a same HARQ-ACK bit position is assigned to both (i) a first valid PDSCH candidate with a smallest last symbol index and (ii) zero or more second valid PDSCH candidates overlapped in time with the first valid PDSCH candidate, and then the first and the zero or more second valid PDSCH candidates are removed from the set of valid PDSCH candidates.

17. The method of claim 11, wherein if a plurality of DL slots corresponds to UL sub-slot #$(n_u-k_i)$, the first DL slot corresponds to each of the plurality of DL slots, starting from a DL slot with smallest index of the plurality of DL slots.

18. The method of claim 11, wherein the end of the corresponding PDSCH candidate is determined based on a start and length indicator value (SLIV) for the first DL slot.

19. The method of claim 11, wherein the DCI is received via a physical downlink control channel (PDCCH).

20. The method of claim 11, wherein the semi-static HARQ-ACK codebook is transmitted via a physical uplink control channel (PUCCH).

* * * * *